US010755861B2

(12) United States Patent
Onodera et al.

(10) Patent No.: US 10,755,861 B2
(45) Date of Patent: Aug. 25, 2020

(54) ELECTRONIC COMPONENT

(71) Applicant: TDK CORPORATION, Tokyo (JP)

(72) Inventors: Shinya Onodera, Nikaho (JP); Koki Ito, Tokyo (JP); Hideki Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/695,645

(22) Filed: Sep. 5, 2017

(65) Prior Publication Data

US 2018/0075972 A1  Mar. 15, 2018

(30) Foreign Application Priority Data

Sep. 9, 2016  (JP) .................................. 2016-176695

(51) Int. Cl.
| | |
|---|---|
| *H01G 4/018* | (2006.01) |
| *H01G 4/005* | (2006.01) |
| *H01G 4/232* | (2006.01) |
| *H01G 4/30* | (2006.01) |
| *H01G 2/06* | (2006.01) |
| H01G 4/12 | (2006.01) |

(52) U.S. Cl.
CPC .............. *H01G 4/306* (2013.01); *H01G 2/06* (2013.01); *H01G 4/005* (2013.01); *H01G 4/018* (2013.01); *H01G 4/232* (2013.01); *H01G 4/30* (2013.01); *H01G 4/12* (2013.01)

(58) Field of Classification Search
CPC .......... H01G 4/30; H01G 4/232; H01G 4/224; H01G 4/018; H01G 4/005; H01G 4/036

USPC ......... 361/301.4, 321.1, 321.2, 306.1, 321.3, 361/306.3
See application file for complete search history.

(56) References Cited

U.S. PATENT DOCUMENTS

| 2014/0085767 A1* | 3/2014 | Kang | ........................ H01G 4/12 361/301.4 |
|---|---|---|---|
| 2015/0124370 A1* | 5/2015 | Ahn | ........................ H01G 4/224 361/272 |

FOREIGN PATENT DOCUMENTS

| JP | H06-069063 A | | 3/1994 |
|---|---|---|---|
| JP | 08162357 A | * | 6/1996 |
| JP | H9-180957 A | | 7/1997 |
| JP | 2000-200731 A | | 7/2000 |
| JP | 2015-029009 A | | 2/2015 |

* cited by examiner

*Primary Examiner* — Arun Ramaswamy
(74) *Attorney, Agent, or Firm* — Oliff PLC

(57) ABSTRACT

An electronic component includes an element body of a rectangular parallelepiped shape, an external electrode, and an insulating film. The element body includes a first principal surface as a mounting surface, and a first side surface adjacent to the first principal surface. The external electrode includes a first electrode part and a second electrode part. The first electrode part is disposed on the first principal surface. The second electrode part is disposed on the first side surface and connected to the first electrode part. The insulating film continuously covers an end edge of the first electrode part and at least a part of an end edge of the second electrode part.

19 Claims, 43 Drawing Sheets

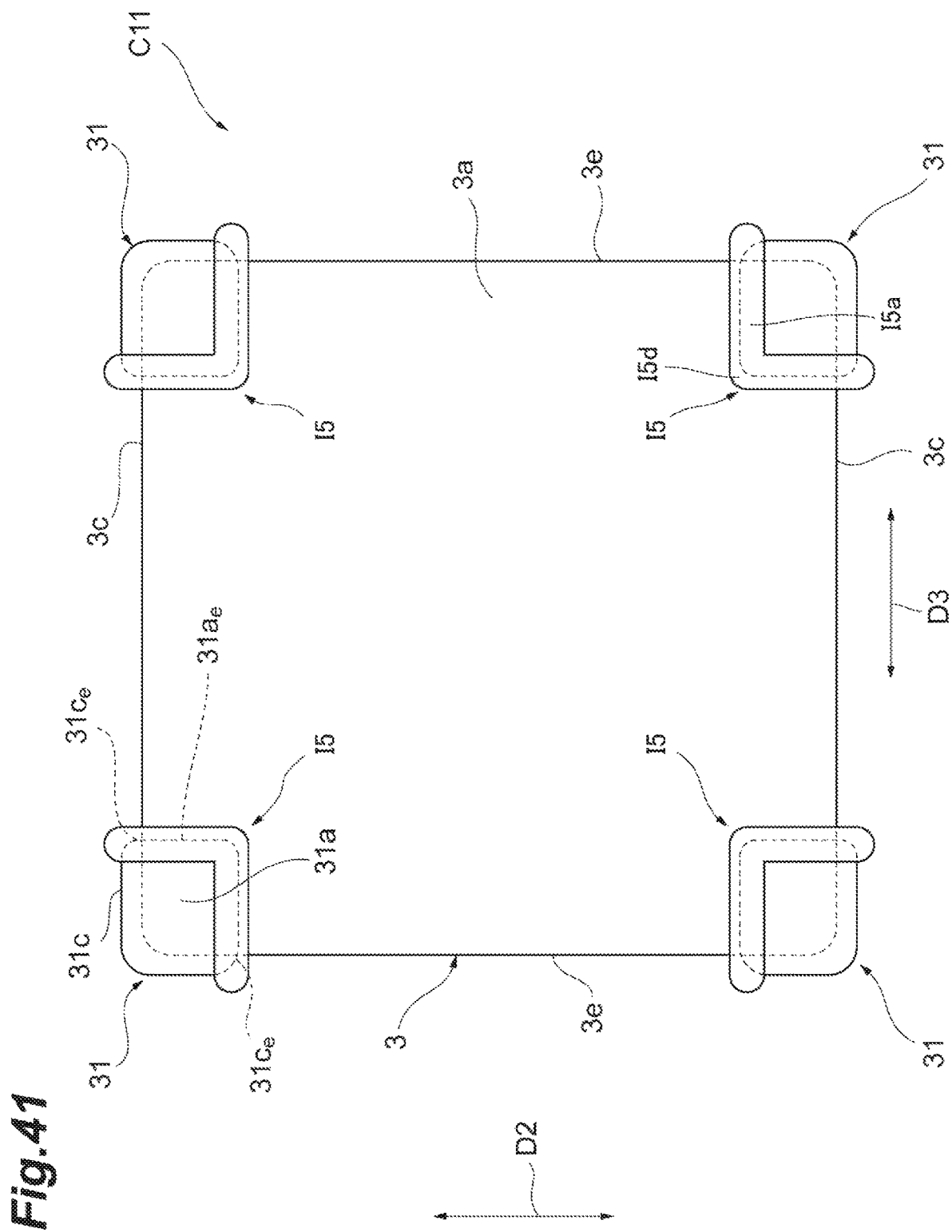

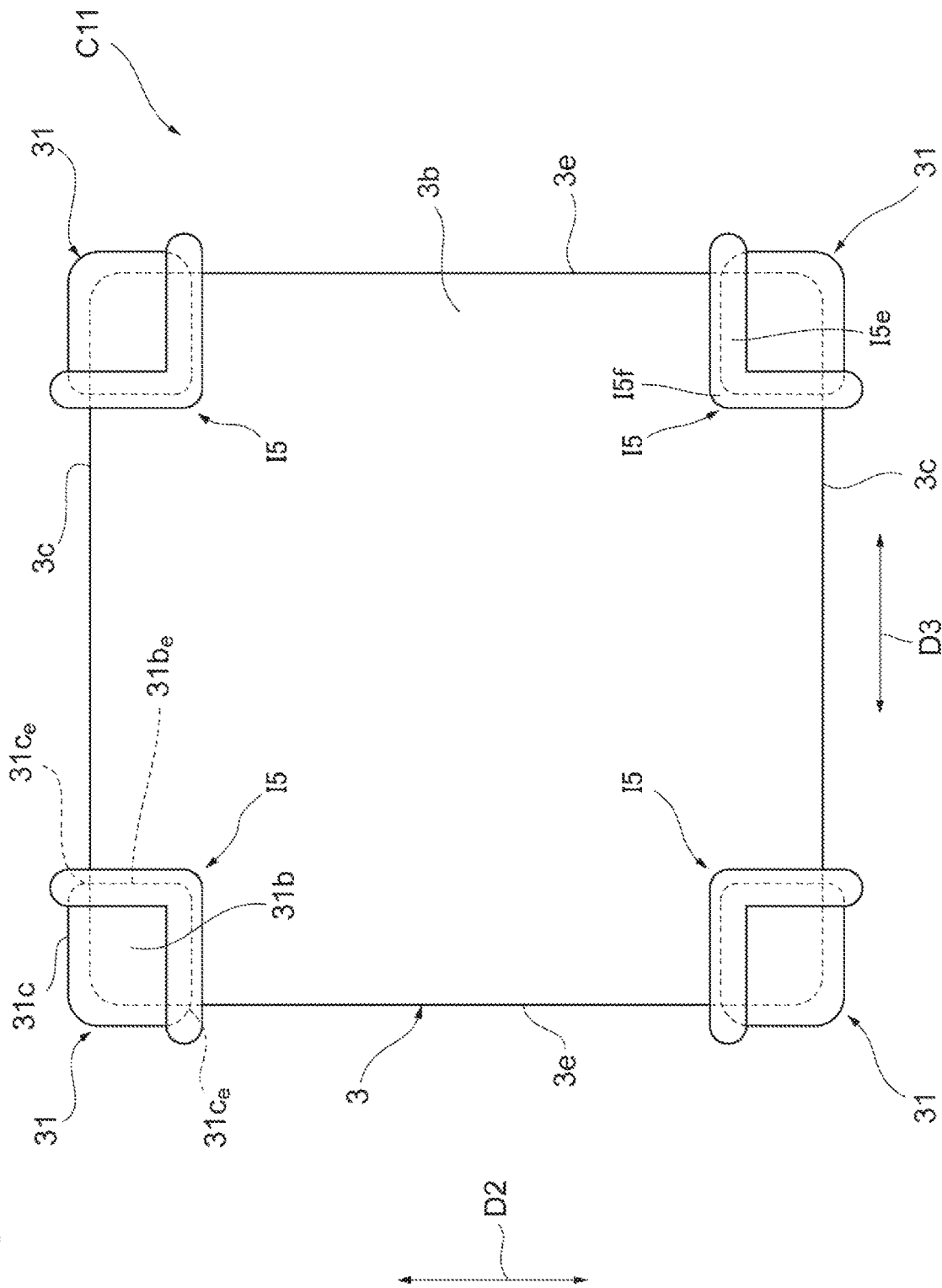

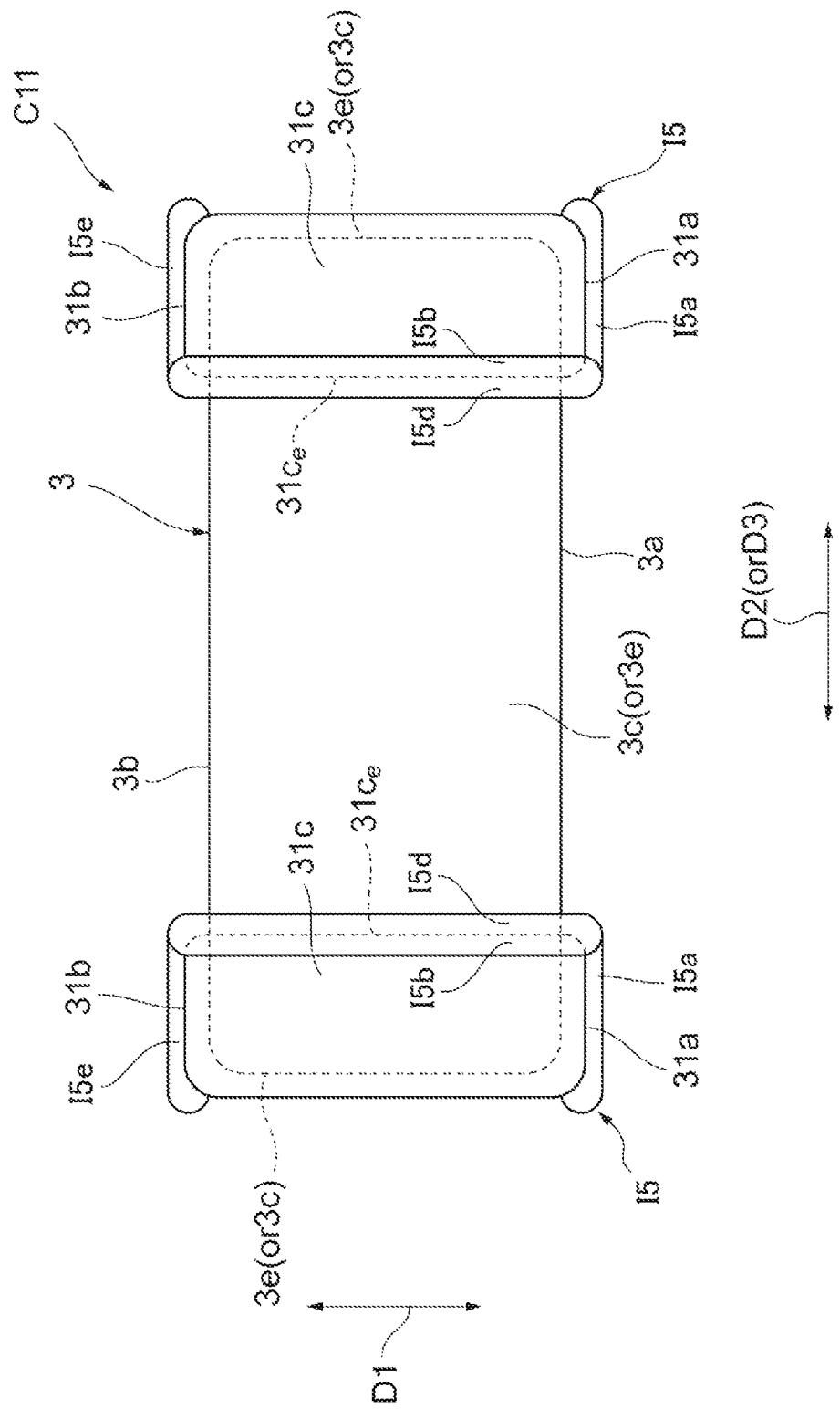

ELECTRONIC COMPONENT

BACKGROUND OF THE INVENTION

1. Field of the Invention

The present invention relates to an electronic component.

2. Description of Related Art

Known electronic components include an element body and an external electrode disposed on the element body (e.g., see Japanese Unexamined Patent Publication No. H6-069063). The element body includes a first principal surface and a first side surface adjacent to the first principal surface. The external electrode includes a first electrode part and a second electrode part. The first electrode part is disposed on the first principal surface. The second electrode part is disposed on the first side surface and connected to the first electrode part. The first principal surface is a mounting surface opposing an electronic device (e.g., a circuit board or an electronic component) to which an electronic component is soldered.

SUMMARY OF THE INVENTION

An object of one aspect of the present invention is to provide an electronic component in which occurrence of cracks in an element body is suppressed.

As a result of investigation and research by the inventors, the following facts have been found out. When an electronic component is soldered to an electronic device, an external force acting on the electronic component from the electronic device may act as a stress on an element body. The external force acts on the element body through an external electrode from a solder fillet formed at a time of solder-mounting. The stress tends to concentrate on an end edge of the external electrode, for example, an end edge of the first electrode part located on the first principal surface as a mounting surface, and an end edge of a portion located near the first principal surface, in the second electrode part. Therefore, cracks may be generated in the element body with these end edges as a starting point.

An electronic component according to one aspect of the present invention includes an element body of a rectangular parallelepiped shape, an external electrode, and an insulating film. The element body includes a first principal surface as a mounting surface, and a first side surface adjacent to the first principal surface. The external electrode includes a first electrode part and a second electrode part. The first electrode part is disposed on the first principal surface. The second electrode part is disposed on the first side surface and connected to the first electrode part. The insulating film continuously covers an end edge of the first electrode part and at least a part of an end edge of the second electrode part.

In the one aspect, when the electronic component is soldered to the electronic device, the insulating film functions as a solder resist. Since the insulating film continuously covers the end edge of the first electrode part and at least the part of the end edge of the second electrode part, a solder fillet does not reach the end edge of the first electrode part located on the first principal surface, and the end edge of a portion located near the first principal surface, in the second electrode part. Therefore, even when an external force acts on the electronic component through the solder fillet, a stress tends not to concentrate on these end edges, and these end edges tend not to become a starting point of cracks. This suppresses occurrence of cracks in the element body.

In the electronic component according to the one aspect, along the end edge of the first electrode part and the at least the part of the end edge of the second electrode part, the insulating film may further continuously cover the first principal surface and the first side surface. In which case, the end edge of the first electrode part and the at least the part of the end edge of the second electrode part are surely covered with the insulating film. Therefore, these end edges further tend not to become the starting point of cracks.

In the electronic component according to the one aspect, the element body may further include a second principal surface opposing the first principal surface, and a second side surface opposing the first side surface. The external electrode may further include a third electrode part and a fourth electrode part. In which case, the third electrode part is disposed on the second principal surface and connected to the second electrode part. The fourth electrode part is disposed on the second side surface and connected to the first electrode part and the third electrode part. The insulating film may continuously cover each of end edges of the first electrode part, the second electrode part, the third electrode part, and the fourth electrode part. In this configuration, even when the external electrode includes the first electrode part, the second electrode part, the third electrode part, and the fourth electrode part, occurrence of cracks in the element body is surely suppressed.

In the electronic component according to the one aspect, along each of the end edges of the first electrode part, the second electrode part, the third electrode part, and the fourth electrode part, the insulating film may further continuously cover the first principal surface, the first side surface, the second principal surface, and the second side surface. In which case, each of the end edges of the first electrode part, the second electrode part, the third electrode part, and the fourth electrode part are surely covered with the insulating film. Therefore, these end edges further tend not to become the starting point of cracks.

In the electronic component according to the one aspect, the element body may further include a second principal surface opposing the first principal surface. The external electrode may further include a third electrode part. In which case, the third electrode part is disposed on the second principal surface and connected to the second electrode part. The insulating film may continuously cover each of the end edges of the first electrode part, the second electrode part, and the third electrode part. In this configuration, even when the external electrode includes the first electrode part, the second electrode part, and the third electrode part, occurrence of cracks in the element body is surely suppressed.

In the electronic component according to the one aspect, along each of the end edges of the first electrode part, the second electrode part, and the third electrode part, the insulating film may further continuously cover the first principal surface, the first side surface, and the second principal surface. In which case, each of the end edges of the first electrode part, the second electrode part, and the third electrode part are surely covered with the insulating film. Therefore, these end edges further tend not to become the starting point of cracks.

In the electronic component according to the one aspect, the element body may further include a second side surface opposing the first side surface. The external electrode may further include a third electrode part. In which case, the third electrode part is disposed on the second side surface and connected to the first electrode part. The insulating film may continuously cover the end edge of the first electrode part and only a part of each of end edges of the second electrode part and the third electrode part. In this configuration, even when the external electrode includes the first electrode part, the second electrode part, and the third electrode part, occurrence of cracks in the element body is surely suppressed.

In the electronic component according to the one aspect, along the end edge of the first electrode part and the part of each of the end edges of the second electrode part and the third electrode part, the insulating film may further continuously cover the first principal surface, the first side surface, and the second side surface. In which case, the end edge of the first electrode part and only the part of each of the end edges of the second electrode part and the third electrode part are surely covered with the insulating film. Therefore, these end edges further tend not to become the starting point of cracks.

In the electronic component according to the one aspect, a ratio of a length, in a direction orthogonal to the first principal surface, of the insulating film that covers each of the end edges of the second electrode part and the third electrode part, to a length of the element body in the direction orthogonal to the first principal surface may be 0.1 or more to 0.4 or less. In which case, the effect of suppressing occurrence of cracks is secured, and a size of the insulating film is reduced. Therefore, a cost of the electronic component is reduced.

In the electronic component according to the one aspect, the element body may further include a first end surface adjacent to the first principal surface and the first side surface. The external electrode may further include an electrode part disposed on the first end surface and exposed from the insulating film. In which case, when the electronic component is soldered to the electronic device, a solder fillet is formed on the electrode part disposed on the first end surface. Therefore, a mounting strength of the electronic component is secured.

In the electronic component according to the one aspect, a ratio of a length of a portion located on the first electrode part, in the insulating film, in a direction parallel to the first principal surface and the first side surface, to a length of the first electrode part in the direction parallel to the first principal surface and the first side surface may be 0.3 or more. In which case, the stress further tends not to concentrate on the end edge of the first electrode part. Therefore, occurrence of cracks in the element body is further suppressed.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 41 is a plan view of a multilayer capacitor according to a modification of the fourth embodiment;

FIG. 42 is a plan view of the multilayer capacitor according to the modification; and FIG. 43 is a side view of the multilayer capacitor according to the modification.

DETAILED DESCRIPTION OF EMBODIMENTS

Figure 1:
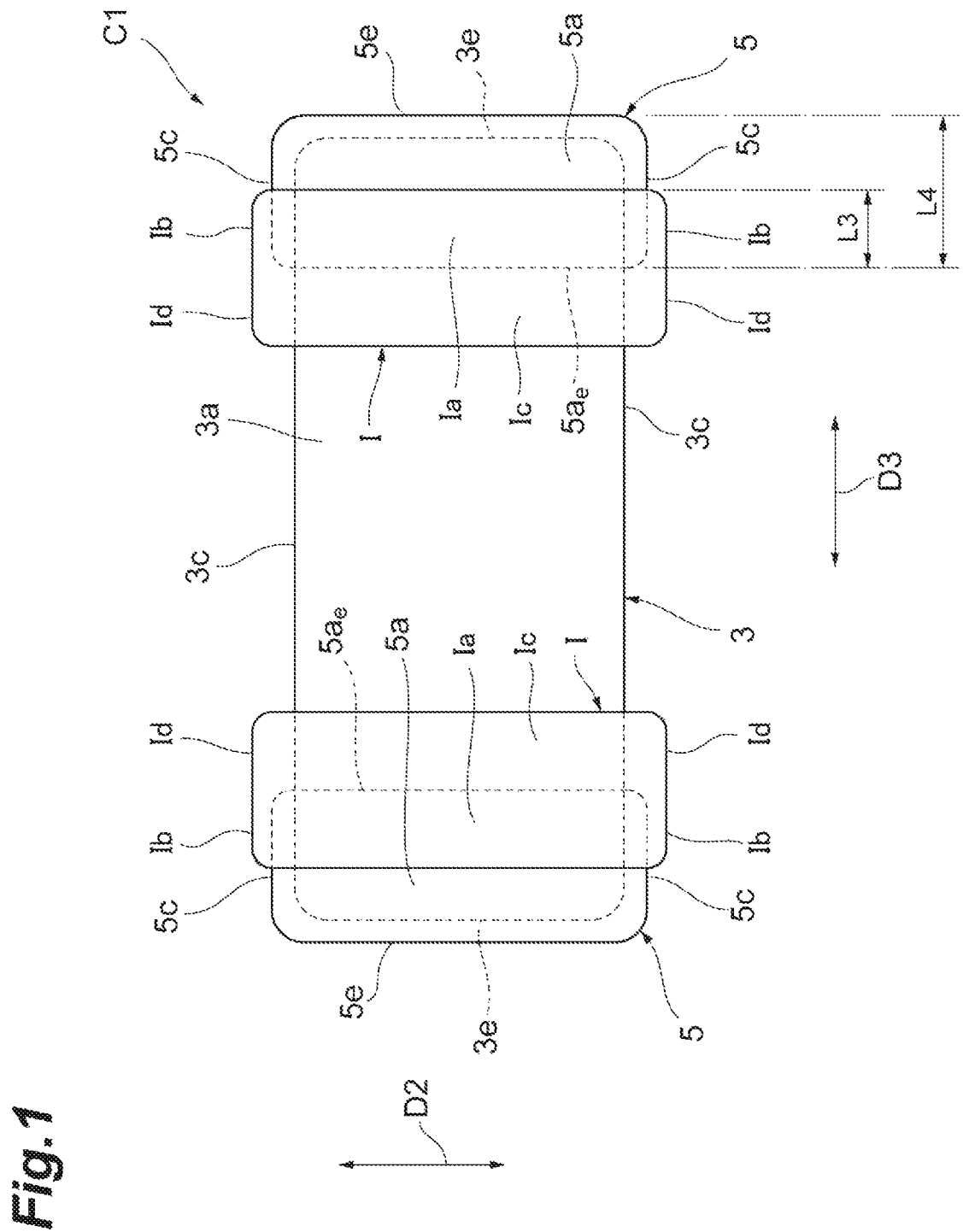
FIG. 1 is a plan view of a multilayer capacitor according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
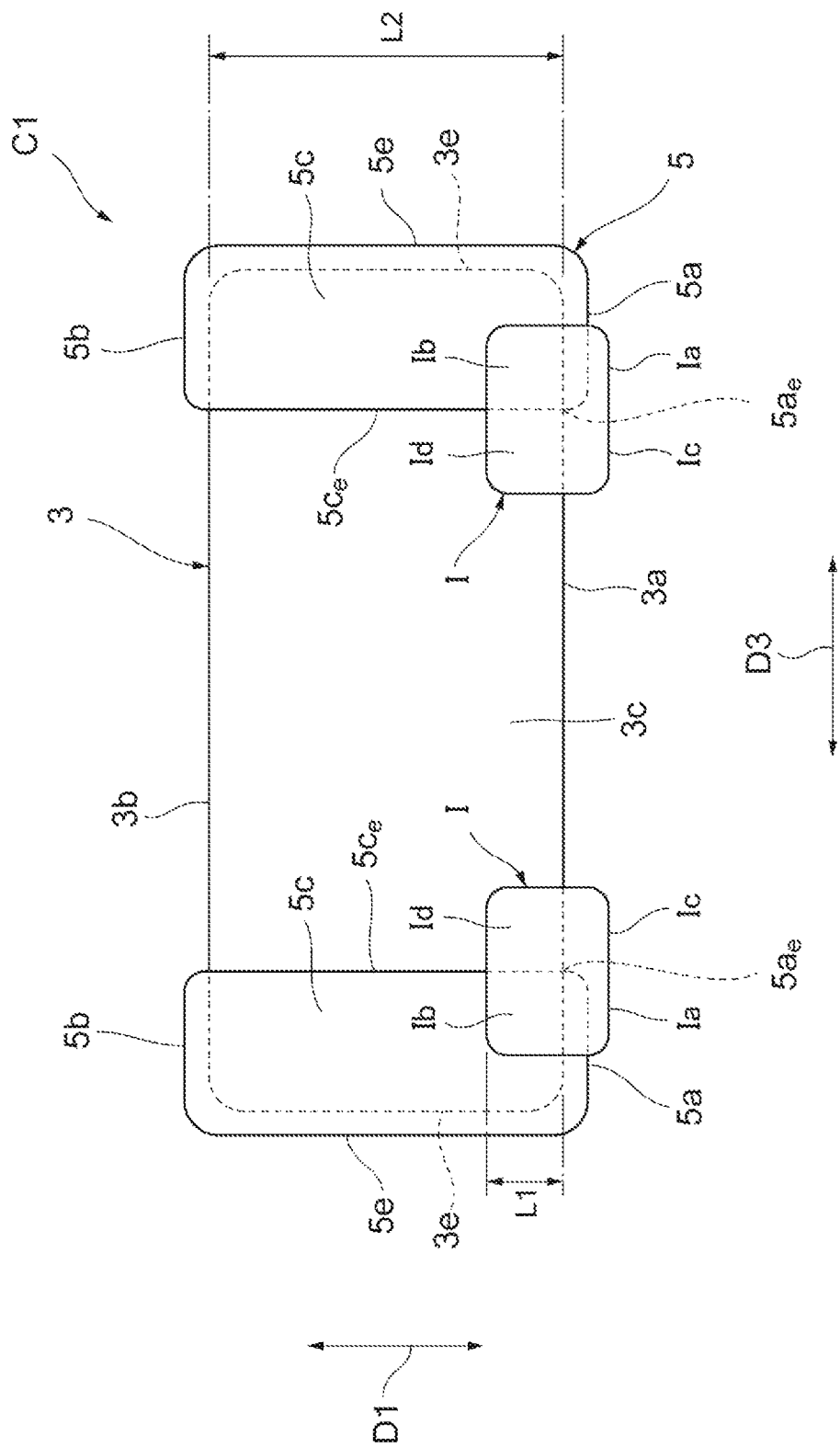
FIG. 2 is a side view of the multilayer capacitor according to the first embodiment.
Figure 3:
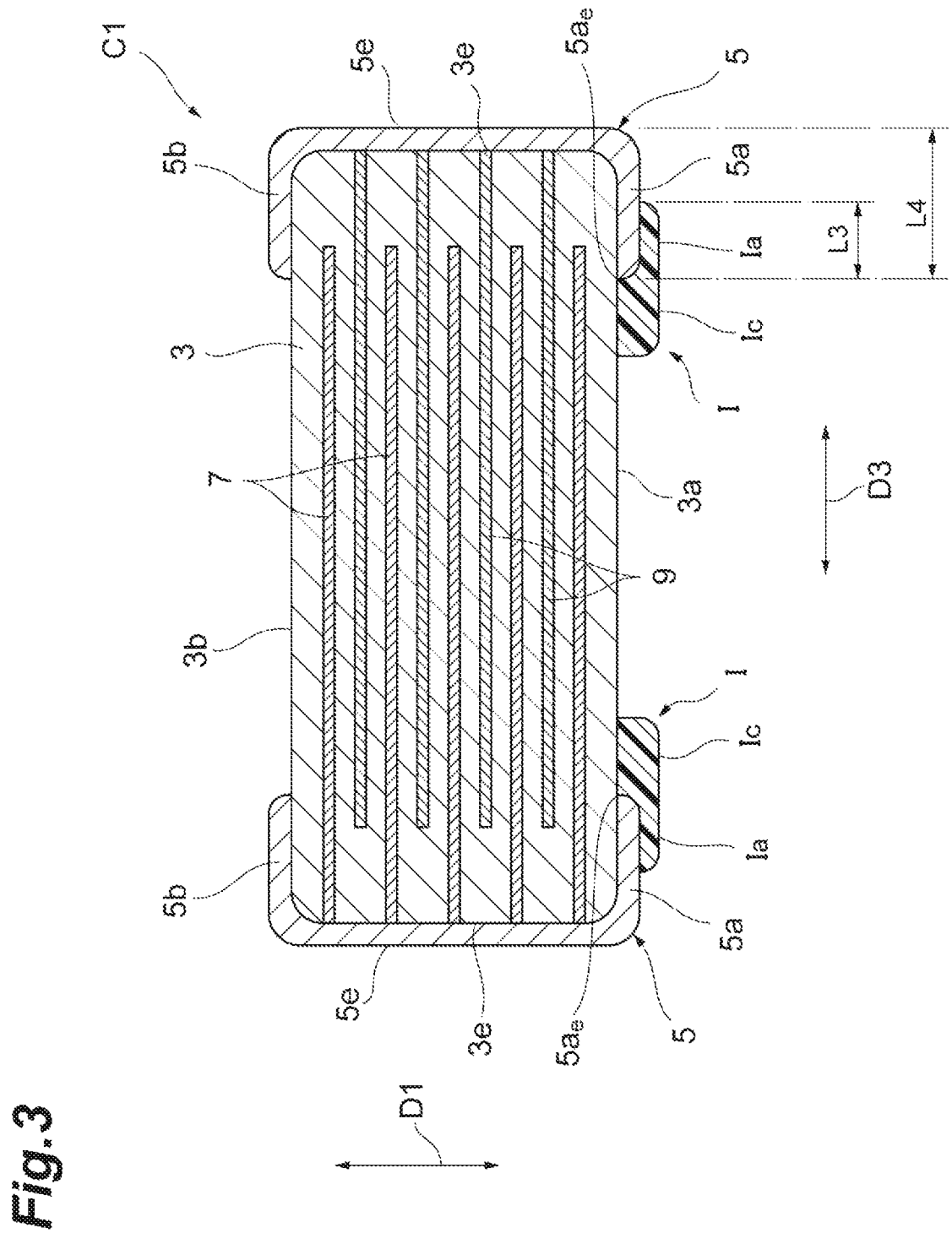
FIG. 3 is a view illustrating a cross-sectional configuration of the multilayer capacitor according to the first embodiment.
Figure 4:
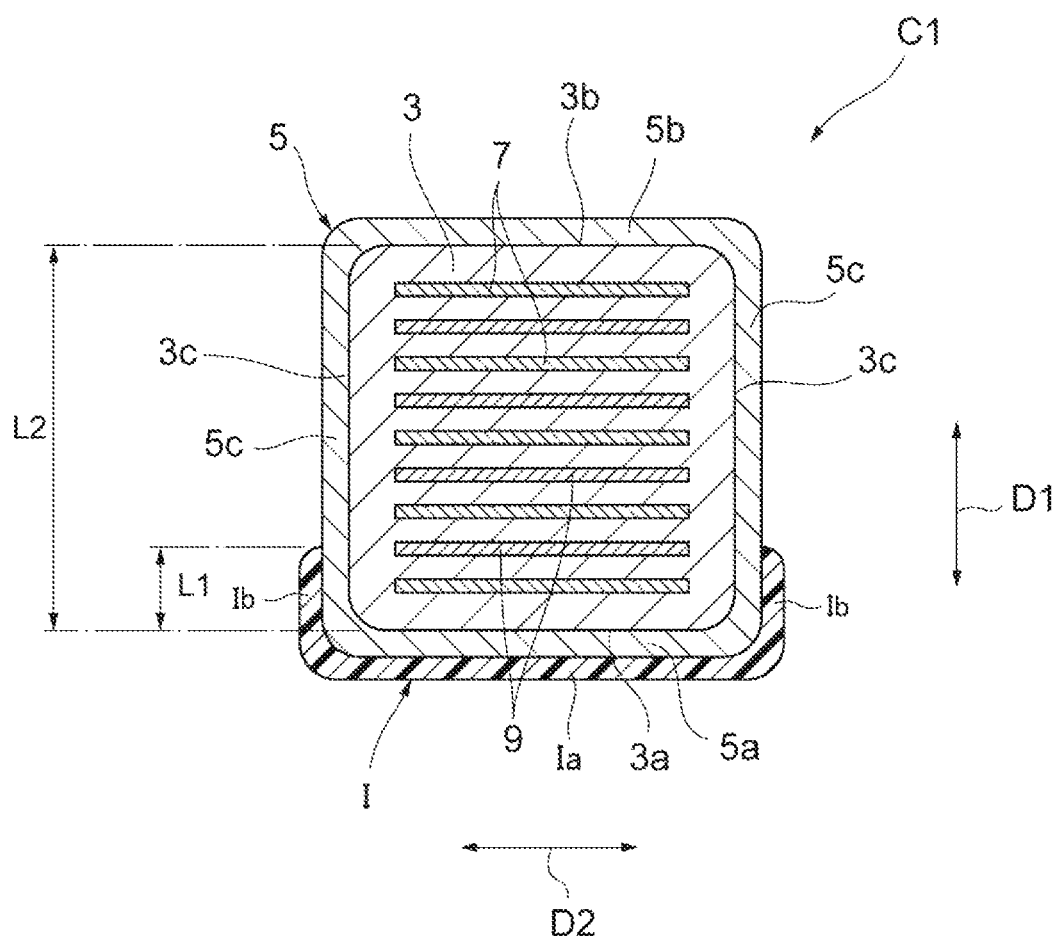
FIG. 4 is a view illustrating a cross-sectional configuration of the multilayer capacitor according to the first embodiment.

With reference to FIGS. 1 to 4, a configuration of a multilayer capacitor C1 according to a first embodiment will be described. FIG. 1 is a plan view of the multilayer capacitor according to the first embodiment. FIG. 2 is a side view of the multilayer capacitor according to the first embodiment. FIGS. 3 and 4 are views illustrating a cross-sectional configuration of the multilayer capacitor according to the first embodiment. In the first embodiment, the multilayer capacitor C1 is exemplified as an electronic component.

As illustrated in FIGS. 1 and 2, the multilayer capacitor C1 includes an element body 3 of a rectangular parallelepiped shape, and a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b and the pair of side surfaces 3c have a rectangular shape. A direction in which the pair of principal surfaces 3a and 3b opposes each other is a first direction D1. A direction in which the pair of side surfaces 3c opposes each other is a second direction D2. A direction in which the pair of end surfaces 3e opposes each other is a third direction D3.

The first direction D1 is a direction orthogonal to the principal surfaces 3a and 3b, and is orthogonal to the second direction D2. The third direction D3 is a direction parallel to each of the principal surfaces 3a and 3b and each of the side surfaces 3c, and is orthogonal to the first direction D1 and the second direction D2. In the first embodiment, a length of the element body 3 in the third direction D3 is longer than a length of the element body 3 in the first direction D1, and longer than a length of the element body 3 in the second direction D2. The third direction D3 is a longitudinal direction of the element body 3.

The pair of side surfaces 3c extend in the first direction D1 to couple the pair of principal surfaces 3a and 3b. The pair of side surfaces 3c also extend in the third direction D3. The pair of end surfaces 3e extend in the first direction D1 to couple the pair of principal surfaces 3a and 3b. The pair of end surfaces 3e also extend in the second direction D2. The principal surfaces 3a and 3b each are adjacent to the pair of side surfaces 3c and the pair of end surfaces 3e.

The element body 3 is configured by laminating a plurality of dielectric layers in the first direction D1. In the element body 3, a lamination direction of the plurality of dielectric layers coincides with the first direction D1. Each dielectric layer includes a sintered body of a ceramic green sheet containing, for example, a dielectric material (dielectric ceramic such as $BaTiO_3$-based, $Ba(Ti, Zr)O_3$-based, $(Ba, Ca)TiO_3$-based, or the like). In the actual element body 3, individual dielectric layers are integrated to such an extent that a boundary between the individual dielectric layers cannot be visually recognized. In the element body 3, the lamination direction of the plurality of dielectric layers may coincide with the second direction D2.

As illustrated in FIGS. 3 and 4, the multilayer capacitor C1 includes a plurality of internal electrodes 7 and a plurality of internal electrodes 9. Each of the internal electrodes 7 and 9 is made of a conductive material that is usually used as an internal electrode of a multilayer electronic component. As the conductive material, a base metal (e.g., Ni or Cu) is used. Each of the internal electrodes 7 and 9 includes a sintered body of a conductive paste containing the above conductive material. In the first embodiment, each of the internal electrodes 7 and 9 is made of Ni.

The internal electrode 7 and the internal electrode 9 are disposed at different positions (layers) in the first direction D1. The internal electrode 7 and the internal electrode 9 are disposed alternately in the element body 3 to oppose each other in the first direction D1 with an interval therebetween. Polarities of the internal electrode 7 and the internal electrode 9 are different from each other. When the lamination direction of the plurality of dielectric layers is the second direction D2, the internal electrode 7 and the internal electrode 9 are disposed at different positions (layers) in the second direction D2. One end of each of the internal electrodes 7 and 9 is exposed at a corresponding end surface 3e.

Each of the external electrodes 5 is disposed on the end surface 3e side in the element body 3, that is, at an end portion of the element body 3. The external electrode 5 includes an electrode part 5a disposed on the principal surface 3a, an electrode part 5b disposed on the principal surface 3b, an electrode part 5c disposed on the pair of side surfaces 3c, and an electrode part 5e disposed on the corresponding end surface 3e. The external electrode 5 is formed on five surfaces of the pair of principal surfaces 3a and 3b, the pair of side surfaces 3c, and one end surface 3e. The electrode parts 5a, 5b, 5c, and 5e adjacent to each other are connected to each other at a ridge of the element body 3, and are electrically connected to each other.

The electrode part 5e covers all the ends exposed at the end surface 3e, of the respective internal electrodes 7 and 9. The internal electrodes 7 and 9 are directly connected to a corresponding electrode part 5e. The internal electrodes 7 and 9 are electrically connected to the respective external electrodes 5.

Each of the external electrodes 5 includes a sintered metal layer. The sintered metal layer is formed, for example, by applying and baking a conductive paste on an outer surface of the element body 3. The conductive paste contains a metal powder (e.g., a powder made of Cu or Ni), a glass component, an organic binder, and an organic solvent. The sintered metal layer is a layer formed by sintering the metal powder contained in the conductive paste. Each of the external electrodes 5 may include a plating layer formed on the sintered metal layer.

The multilayer capacitor C1 is soldered to an electronic device (e.g., a circuit board or an electronic component). In the multilayer capacitor C1, the principal surface 3a is a mounting surface opposing the electronic device.

As illustrated in FIGS. 1 to 4, the multilayer capacitor C1 includes a pair of insulating films I. The insulating film I covers a part of the external electrode 5 and a part of the element body 3, along an end edge $5a_e$ of the electrode part 5a and an end edge $5c_e$ of the electrode part 5c. The electrode part 5b, the electrode part 5e, and the principal surface 3b are not covered with the insulating film I.

Along the end edge $5a_e$ and only a part of the end edge $5c_e$ (a portion close to the principal surface 3a in the first direction D1), the insulating film I continuously covers the end edge $5a_e$ and only the part of the end edge $5c_e$, and continuously covers the principal surface 3a and the side surface 3c. The insulating film I includes a film portion Ia located on the electrode part 5a, a film portion Ib located on the electrode part 5c, a film portion Ic located on the principal surface 3a, and a film portion Id located on the side surface 3c. The film portions Ia, Ib, Ic and Id each are integrally formed.

A surface of the electrode part 5a includes a region covered with the insulating film I (film portion Ia) along the end edge $5a_e$, and a region exposed from the insulating film I. The region exposed from the insulating film I is located closer to the end surface 3e than the region covered with the film portion Ia. A surface of the electrode part 5c includes a region covered with the insulating film I (film portion Ib) along the end edge $5c_e$, and a region exposed from the insulating film I.

The principal surface 3a includes a region covered with the insulating film I (film portion Ic) along the end edge $5a_e$, and a region exposed from the insulating film I. When viewed from the first direction D1, a region located between the pair of insulating films I (film portions Ic) on the principal surface 3a is exposed. The side surface 3c includes a region covered with the insulating film I (film portion Id) along the end edge $5c_e$, and a region exposed from the insulating film I.

In the first embodiment, a ratio (L1/L2) of each length L1 of the film portion Ib and the film portion Id in the first direction D1, to length L2 of the element body 3 in the first direction D1 is 0.1 or more to 0.4 or less. A ratio (L3/L4) of length L3 of the film portion Ia in the third direction D3 to length L4 of the electrode part 5a in the third direction D3 is 0.3 or more.

The insulating film I is made of a material having electrical insulation properties (e.g., an insulating resin or glass). In the first embodiment, the insulating film I is made of an insulating resin (e.g., an epoxy resin). The insulating film I is formed, for example, by applying and solidifying an insulating-resin coating agent. The insulating-resin coating agent may be applied by, for example, a screen printing method or a spray coating method. As the insulating-resin coating agent, there may be used a thermosetting insulating-resin coating agent, an ultraviolet-curing insulating-resin coating agent, or a coating agent including both of these insulating-resin coating agents.

Figure 5:
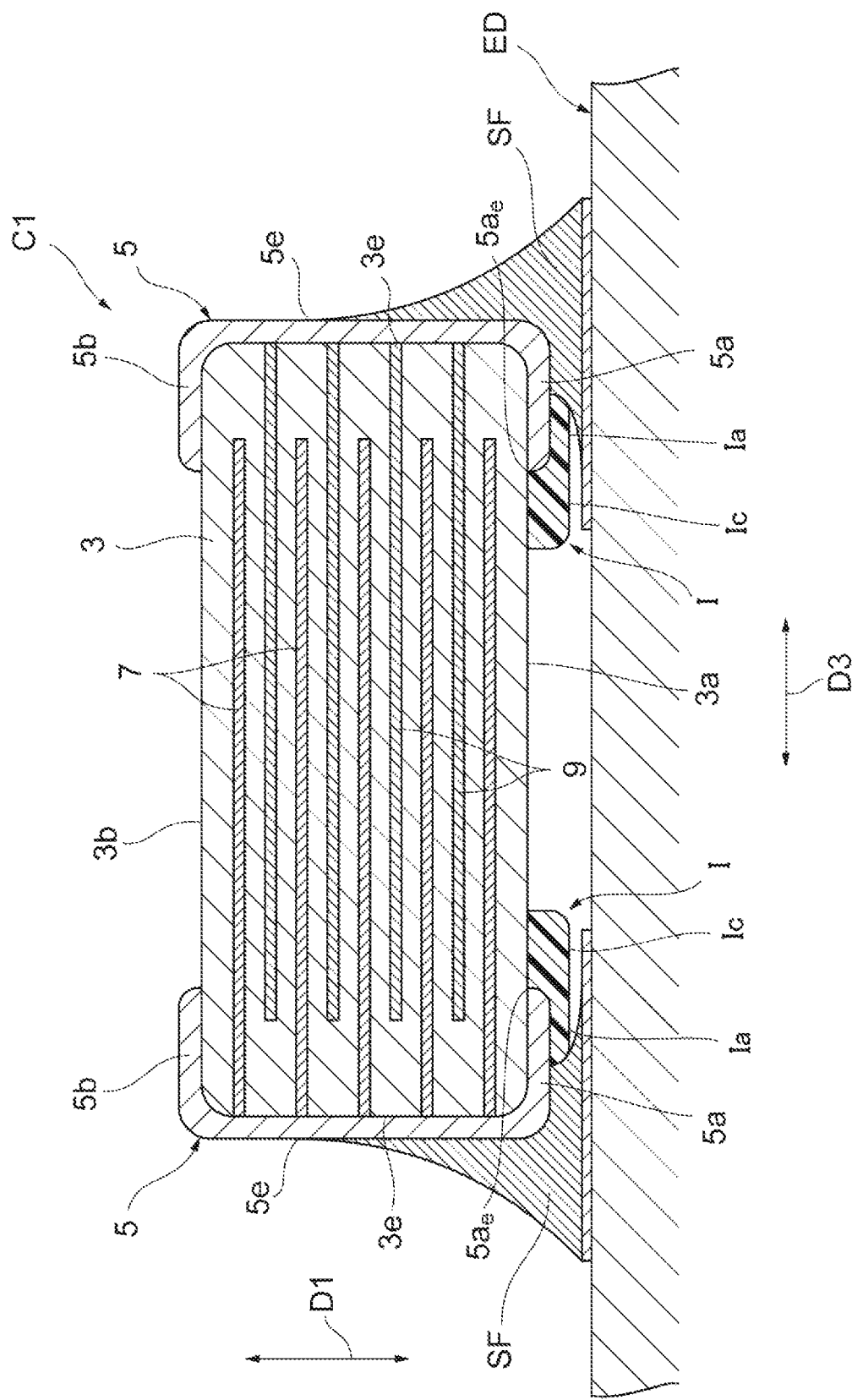
FIG. 5 is a view illustrating a mounted structure of the multilayer capacitor according to the first embodiment.

As illustrated in FIG. 5, when the multilayer capacitor C1 is soldered to an electronic device ED, the insulating film I functions as a solder resist. The electronic device ED is, for example, a circuit board or another electronic component. FIG. 5 is a view illustrating a mounted structure of the multilayer capacitor according to the first embodiment.

Since the insulating film I continuously covers the end edge $5a_e$ and only the part of the end edge $5c_e$, a solder fillet SF does not reach the end edge $5a_e$ and the part of the end edge $5c_e$ (an end edge of a portion located near the principal surface 3a, in the electrode part 5c). Therefore, even when an external force acts on the multilayer capacitor C1 through the solder fillet SF, a stress tends not to concentrate on the end edges $5a_e$ and $5c_e$, and the end edges $5a_e$ and $5c_e$ tend not to become a starting point of cracks. This suppresses occurrence of cracks in the element body 3 in the multilayer capacitor C1.

In the first embodiment, since the insulating film I continuously covers the principal surface 3a and the side surface 3c along the end edge $5a_e$ and only the part of the end edge $5c_e$, the end edge $5a_e$ and the part of the end edge $5c_e$ are surely covered with the insulating film I. Therefore, in the multilayer capacitor C1, the end edges $5a_e$ and $5c_e$ further tend not to become the starting point of cracks.

In the first embodiment, since the entire electrode part 5e is exposed from the insulating film I, the solder fillet SF is formed on the electrode part 5e as also illustrated in FIG. 5. Therefore, a mounting strength of the multilayer capacitor C1 is secured.

In the first embodiment, the ratio (L1/L2) of length L1 to length L2 is 0.1 or more to 0.4 or less. In which case, the effect of suppressing occurrence of cracks is secured, and a size of the insulating film I is reduced. Therefore, a cost of the multilayer capacitor C1 is reduced. If the ratio (L1/L2) is less than 0.1, the stress acting on the end edges $5a_e$ and $5c_e$ is large, so that the end edges $5a_e$ and $5c_e$ tend to become a starting point of cracks.

In the first embodiment, the ratio (L3/L4) of length L3 of the film portion Ia to length L4 of the electrode part 5a is 0.3 or more. In which case, the stress further tends not to concentrate on the end edge $5a_e$, further suppressing occurrence of cracks in the element body 3. If the ratio (L3/L4) is less than 0.3, the stress acting on the end edge $5a_e$ is large, so that the end edge $5a_e$ tends to become a starting point of cracks.

Figure 6:
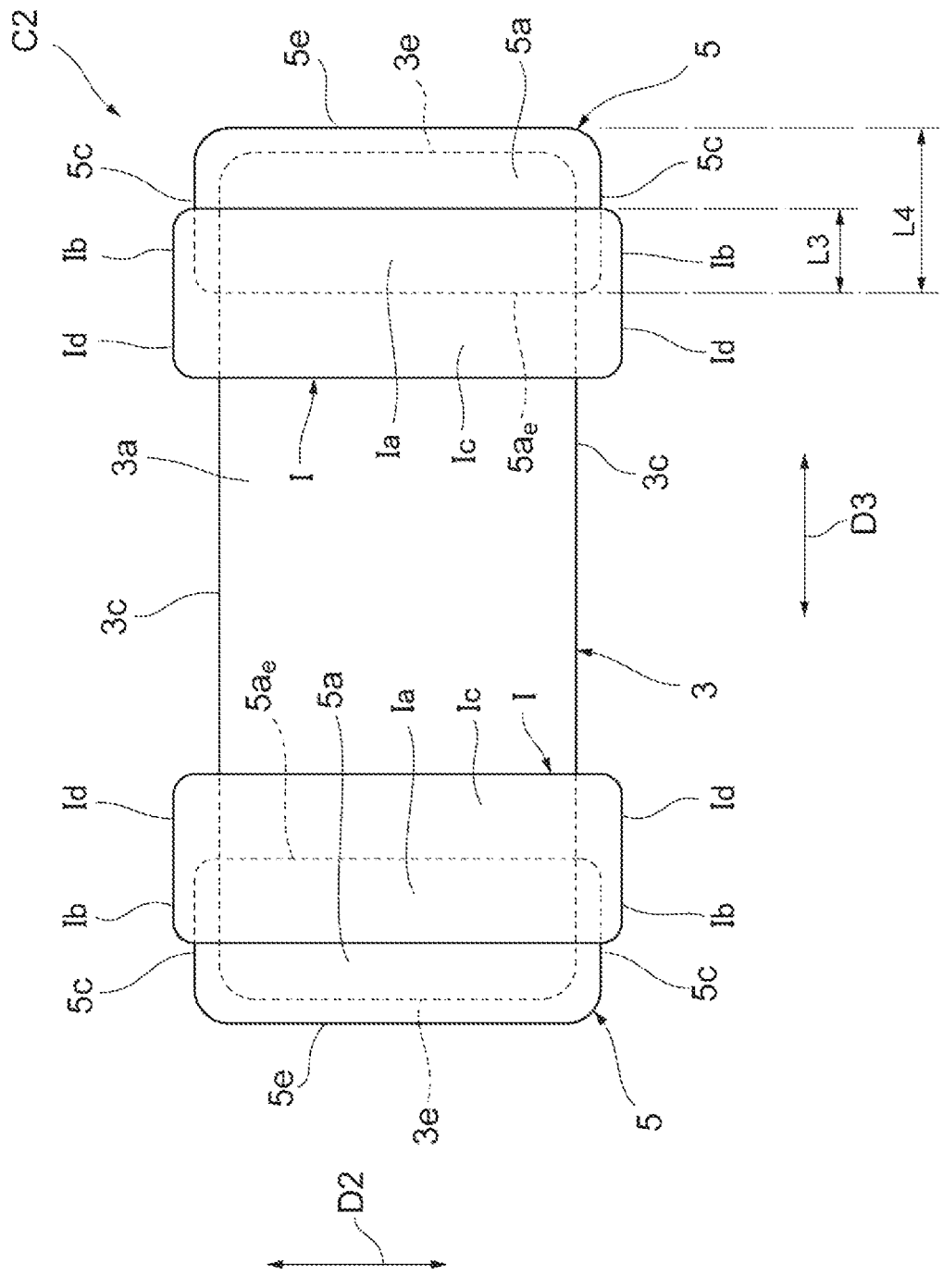
FIG. 6 is a plan view of a multilayer capacitor according to a modification of the first embodiment.
Figure 7:
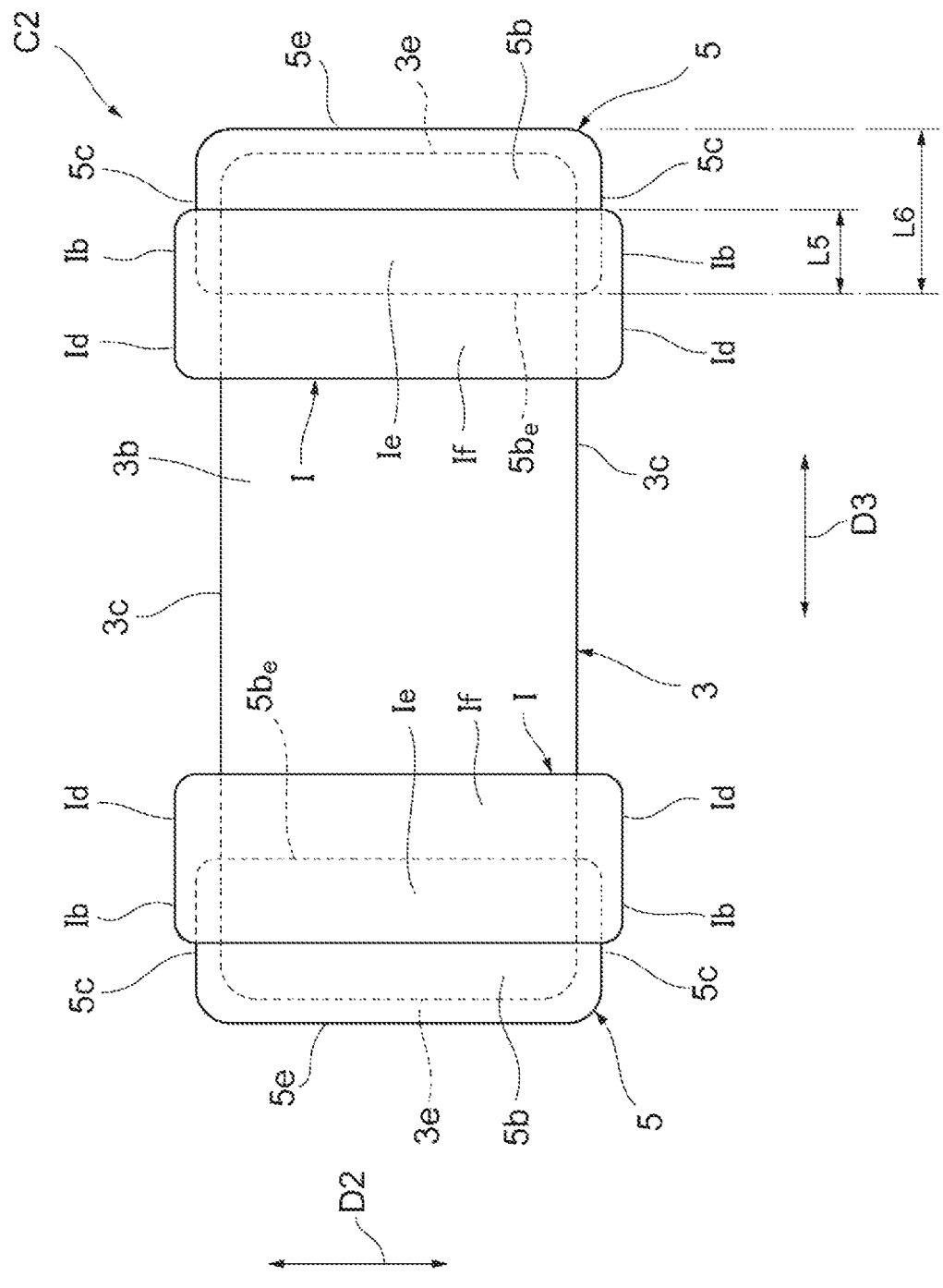
FIG. 7 is a plan view of the multilayer capacitor according to the modification.
Figure 8:
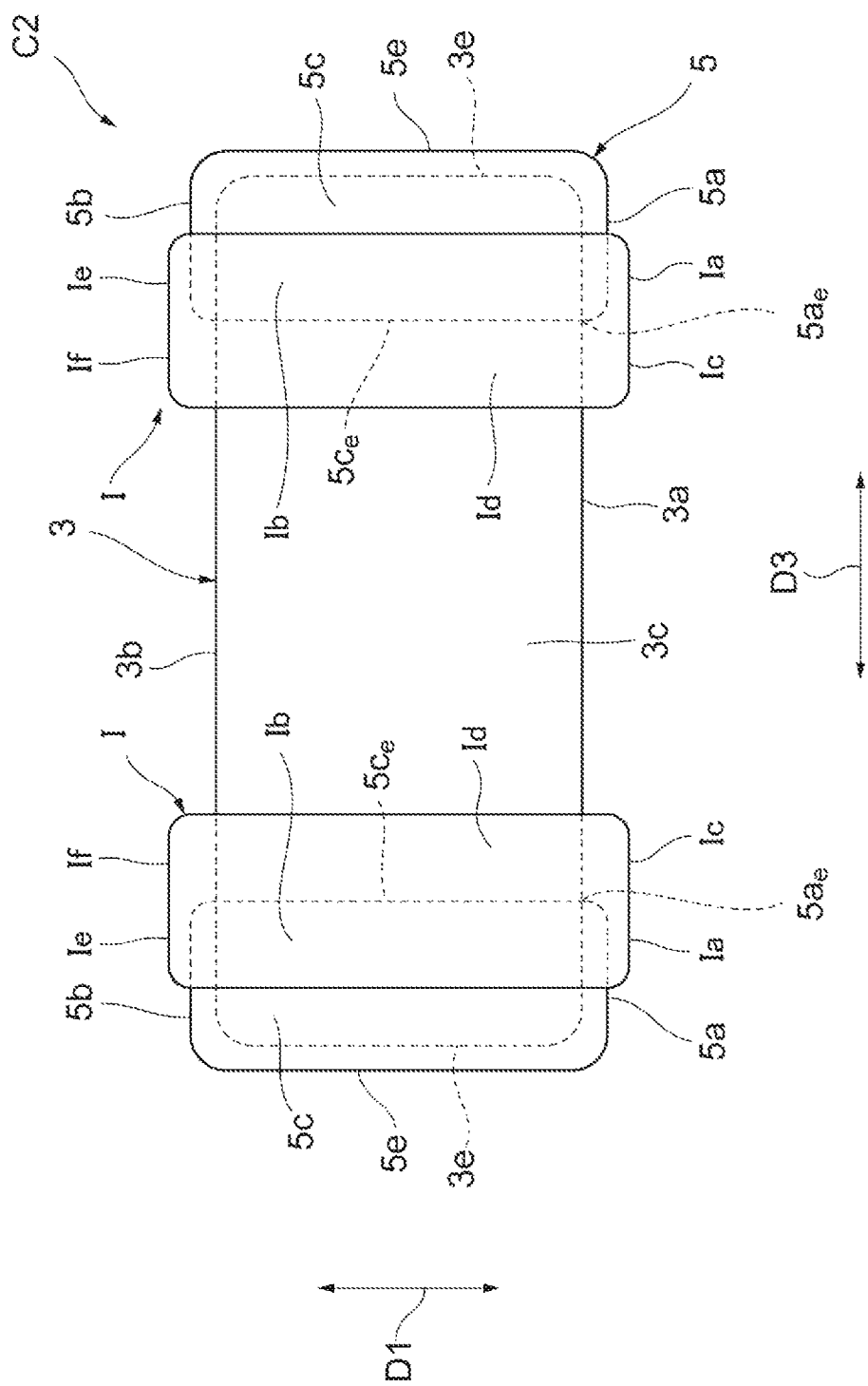
FIG. 8 is a side view of the multilayer capacitor according to the modification.

Next, with reference to FIGS. 6 to 8, a configuration of a multilayer capacitor C2 according to a modification of the first embodiment will be described. FIGS. 6 and 7 are plan views of the multilayer capacitor according to the modification. FIG. 8 is a side view of the multilayer capacitor according to the modification.

As with the multilayer capacitor C1, the multilayer capacitor C2 includes an element body 3, a pair of external electrodes 5, a plurality of internal electrodes 7 (not illustrated), and a plurality of internal electrodes 9 (not illustrated). In the multilayer capacitor C2, a shape of an insulating film I is different from that of the multilayer capacitor C1.

As illustrated in FIGS. 6 to 8, the multilayer capacitor C2 includes a pair of insulating films I. The insulating film I covers a part of the external electrode 5 and a part of the element body 3, along an end edge $5a_e$ of an electrode part 5a, an end edge $5b_e$ of the electrode part 5b, and an end edge $5c_e$ of an electrode part 5c. An electrode part 5e is not covered with the insulating film I.

Along all of the end edge $5a_e$, the end edge $5b_e$, and the end edge $5c_e$, the insulating film I continuously covers the end edge $5a_e$, the end edge $5b_e$, and the end edge $5c_e$, and continuously covers a principal surface 3a, a principal surface 3b, and a side surface 3c. The insulating film I includes a film portion Ia located on the electrode part 5a, a film portion Ib located on the electrode part 5c, a film portion Ic located on the principal surface 3a, a film portion Id located on the side surface 3c, a film portion Ie located on an electrode part 5b, and a film portion If located on the principal surface 3b. The film portions Ia, Ib, Ic, Id, Ie, and If each are integrally formed.

A surface of the electrode part 5a includes a region covered with the insulating film I (film portion Ia) along the end edge $5a_e$, and a region exposed from the insulating film I. The region exposed from the insulating film I, on the surface of the electrode part 5a, is located closer to an end surface 3e than the region covered with the film portion Ia. A surface of the electrode part 5c includes a region covered with the insulating film I (film portion Ib) along the end edge $5c_e$, and a region exposed from the insulating film I. The region exposed from the insulating film I, on the surface of the electrode part 5c, is located closer to the end surface 3e than the region covered with the film portion Ib. A surface of the electrode part 5b includes a region covered with the insulating film I (film portion Ie) along the end edge $5b_e$, and a region exposed from the insulating film I. The region exposed from the insulating film I, on the surface of the electrode part 5b, is located closer to the end surface 3e than the region covered with the film portion Ie.

The principal surface 3a includes a region covered with the insulating film I (film portion Ic) along the end edge $5a_e$, and a region exposed from the insulating film I. When viewed from the first direction D1, a region located between the pair of insulating films I (film portions Ic) on the principal surface 3a is exposed. The side surface 3c includes a region covered with the insulating film I (film portion Id) along the end edge $5c_e$, and a region exposed from the insulating film I. When viewed from a second direction D2, a region located between the pair of insulating films I (film portions Id) on the side surface 3c is exposed. The principal surface 3b includes a region covered with the insulating film I (film portion If) along the end edge $5b_e$, and a region exposed from the insulating film I. When viewed from the first direction D1, a region located between the pair of insulating films I (film portions If) on the principal surface 3b is exposed.

A ratio (L5/L6) of length L5 of the film portion Ie in a third direction D3 to length L6 of the electrode part 5b in the third direction D3 is 0.3 or more. In this modification, length L5 is equal to length L3, and length L6 is equal to length L4. Equality does not necessarily only mean that values are consistent. Even if values include a slight difference in a predetermined range, manufacturing error, or the like, the values may be defined to be equal. For example, when a plurality of values are included within a range of ±5% of an average value of the plurality of values, the plurality of values may be defined to be equal.

In this modification, since the insulating film I continuously covers all of the end edge $5a_e$, the end edge $5b_e$, and the end edge $5c_e$, occurrence of cracks in the element body 3 is surely suppressed. Since the insulating film I continuously covers the principal surface 3a, the principal surface 3b, and the side surface 3c along all of the end edge $5a_e$, the end edge $5b_e$, and the end edge $5c_e$, all of the end edge $5a_e$, the end edge $5b_e$, and the end edge $5c_e$ are surely covered with the insulating film I. Therefore, the end edges $5a_e$ and $5c_e$ further tend not to become a starting point of cracks.

The multilayer capacitor C2 can be mounted with the principal surface 3a as a mounting surface, or mounted with the principal surface 3b as a mounting surface. Therefore, in the multilayer capacitor C2, there is no directionality in mounting the multilayer capacitor C2, improving workability. When the principal surface 3b is the mounting surface, the end edges $5b_e$ and $5c_e$ tend not to become a starting point of cracks.

Figure 9:
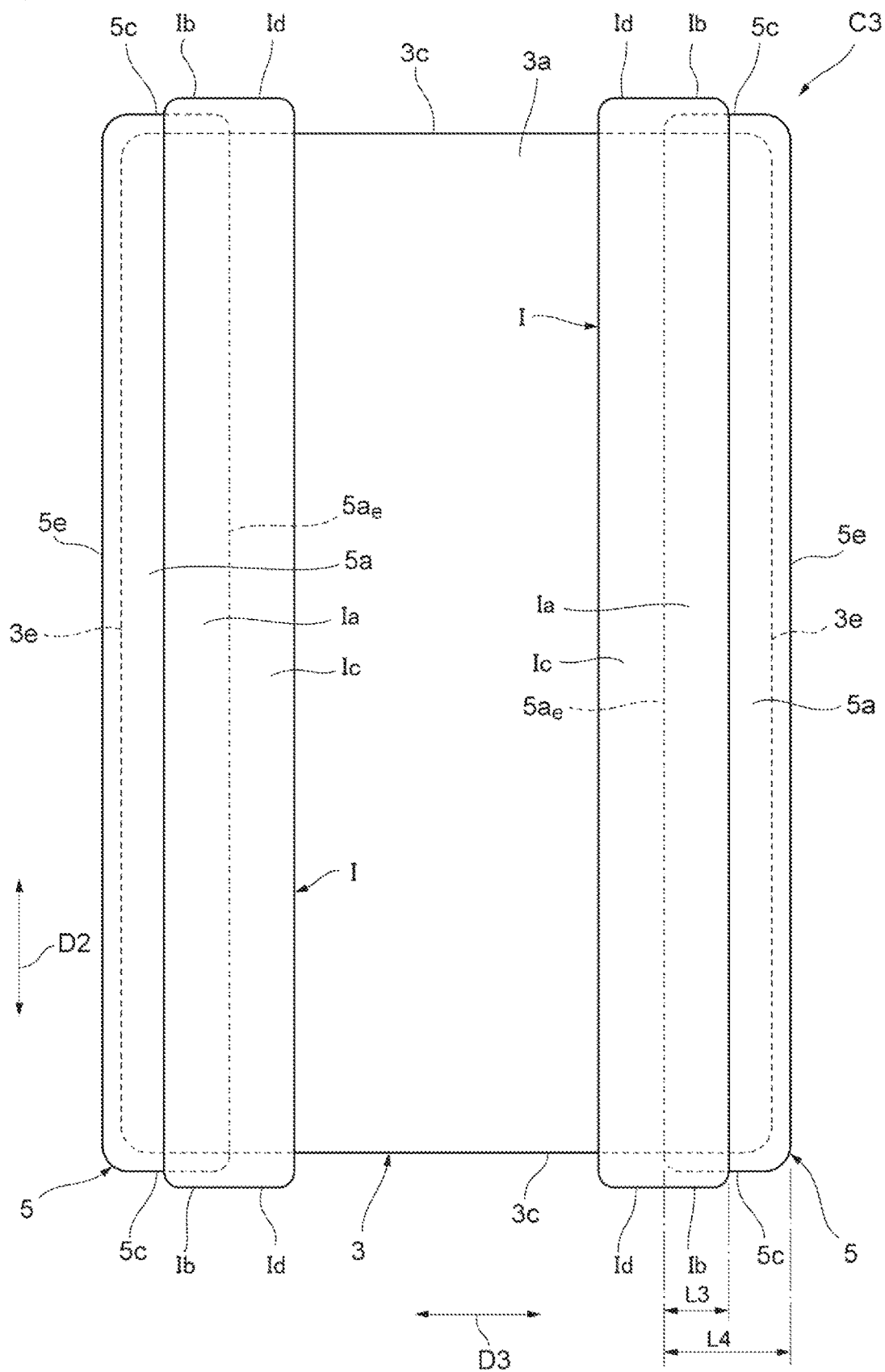
FIG. 9 is a plan view of a multilayer capacitor according to another modification of the first embodiment.
Figure 10:
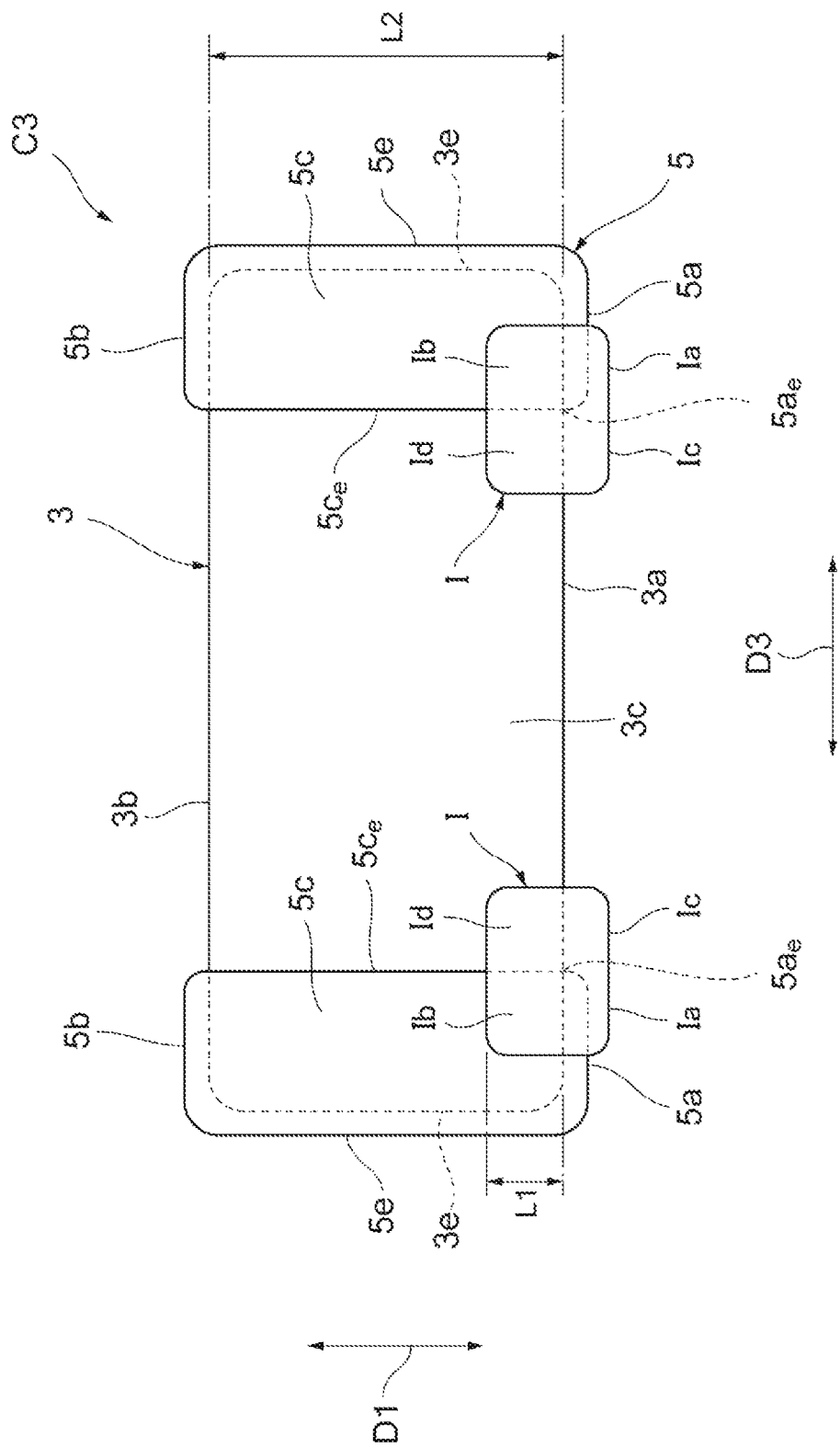
FIG. 10 is a side view of the multilayer capacitor according to the modification.
Figure 11:
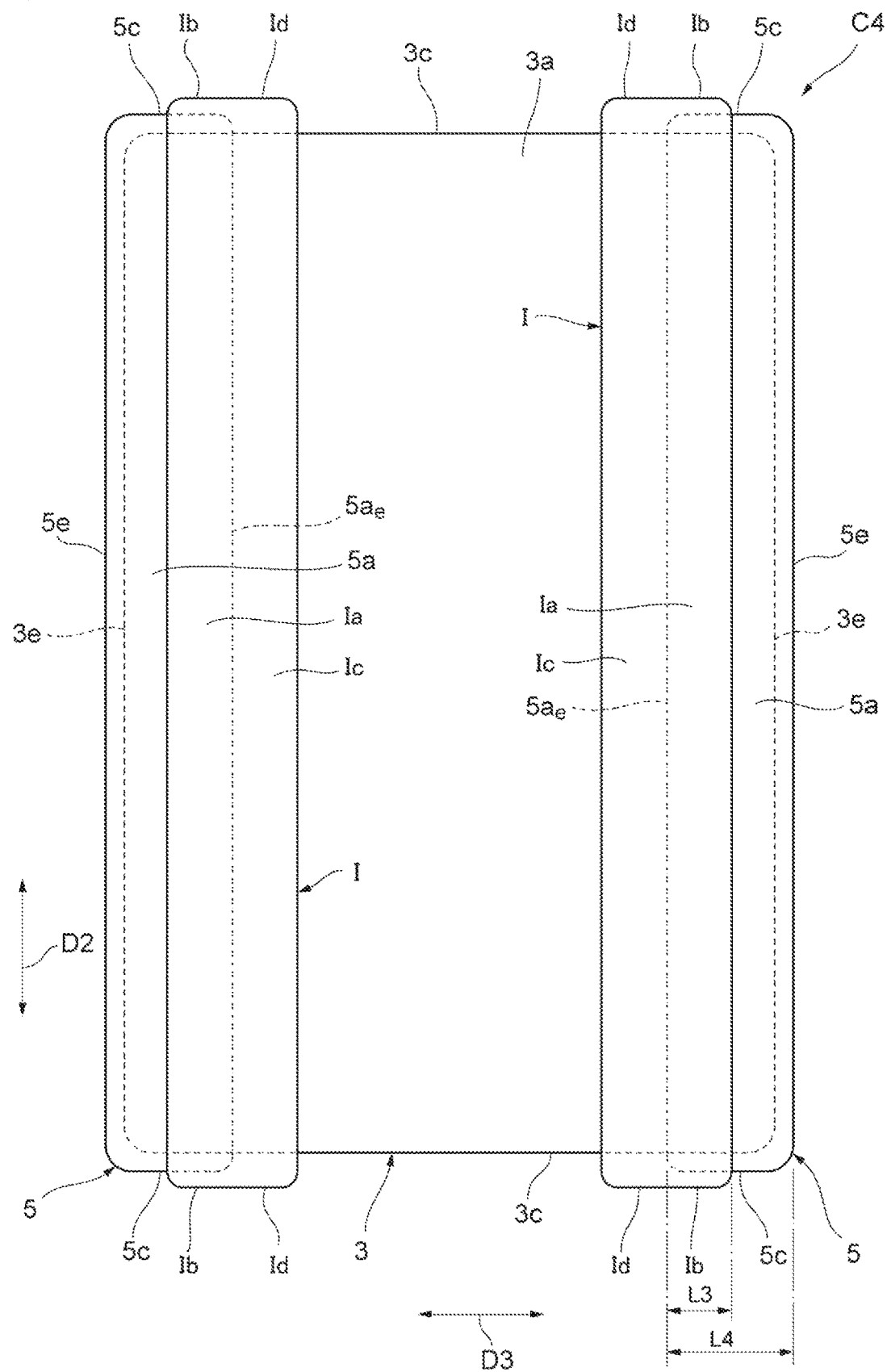
FIG. 11 is a plan view of a multilayer capacitor according to another modification of the first embodiment.
Figure 12:
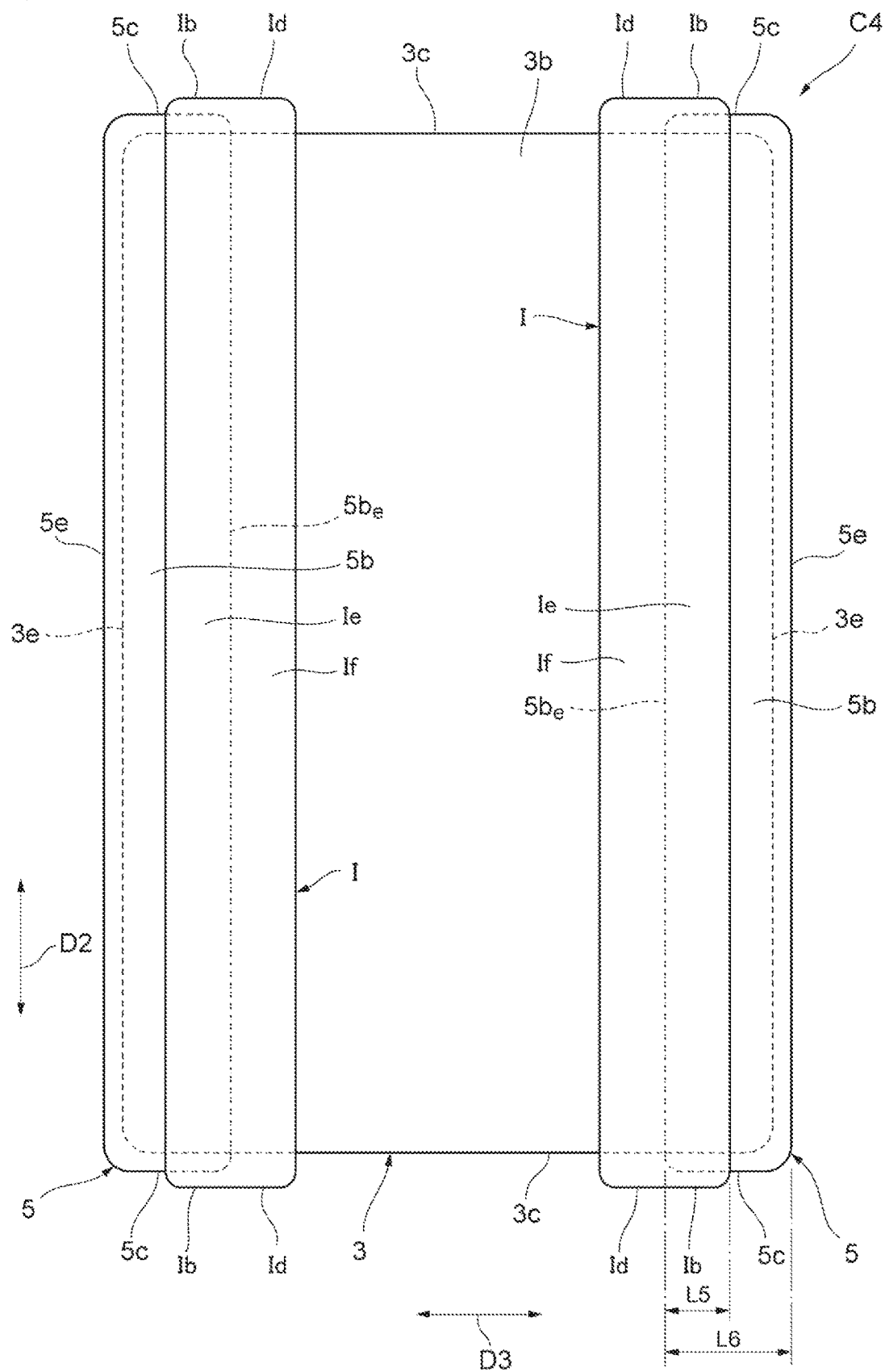
FIG. 12 is a plan view of the multilayer capacitor according to the modification.
Figure 13:
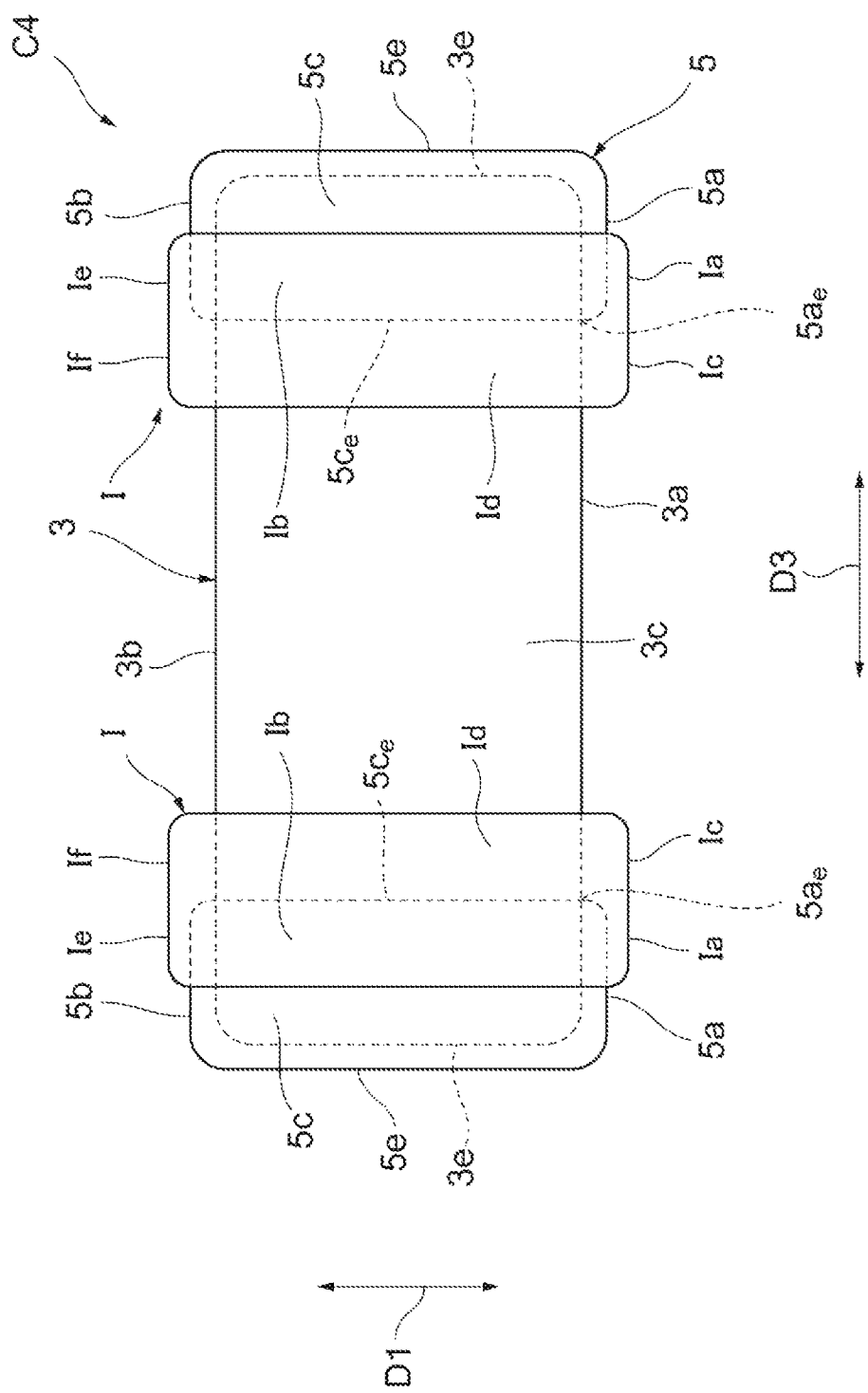
FIG. 13 is a side view of the multilayer capacitor according to the modification.

Next, a configuration of multilayer capacitors C3 and C4 according to another modification of the first embodiment will be described with reference to FIGS. 9 to 13. FIGS. 9, 11, and 12 are plan views of the multilayer capacitor according to the modification. FIGS. 10 and 13 are side views of the multilayer capacitor according to the modification.

As with the multilayer capacitors C1 and C2, each of the multilayer capacitor C3 and C4 includes an element body 3, a pair of external electrodes 5, a plurality of internal electrodes 7 (not illustrated), and a plurality of internal electrodes 9 (not illustrated). In the multilayer capacitor C3, a shape of an element body 3 is different from that of the multilayer capacitor C1. In the multilayer capacitor C4, a shape of an element body 3 is different from that of the multilayer capacitor C2.

In the multilayer capacitors C3 and C4, a length of the element body 3 in a second direction D2 is longer than a length of the element body 3 in the first direction D1, and longer than a length of the element body 3 in the third direction D3. The second direction D2 is a longitudinal direction of the element body 3.

Also in each of the modifications, occurrence of cracks in the element body 3 is suppressed. In the multilayer capacitor C3, since an end edge $5a_e$ and a part of an end edge $5c_e$ are surely covered with an insulating film I, the end edges $5a_e$ and $5c_e$ further tend not to become a starting point of cracks in the multilayer capacitor C3. In the multilayer capacitor C4, since all of an end edge $5a_e$, an end edge $5b_e$, and an end edge $5c_e$ are surely covered with an insulating film I, the end edges $5a_e$ and $5c_e$ further tend not to become a starting point of cracks. In the multilayer capacitor C4, when the principal surface 3b is the mounting surface, the end edges $5b_e$ and $5c_e$ tend not to become a starting point of cracks.

Second Embodiment

Figure 14:
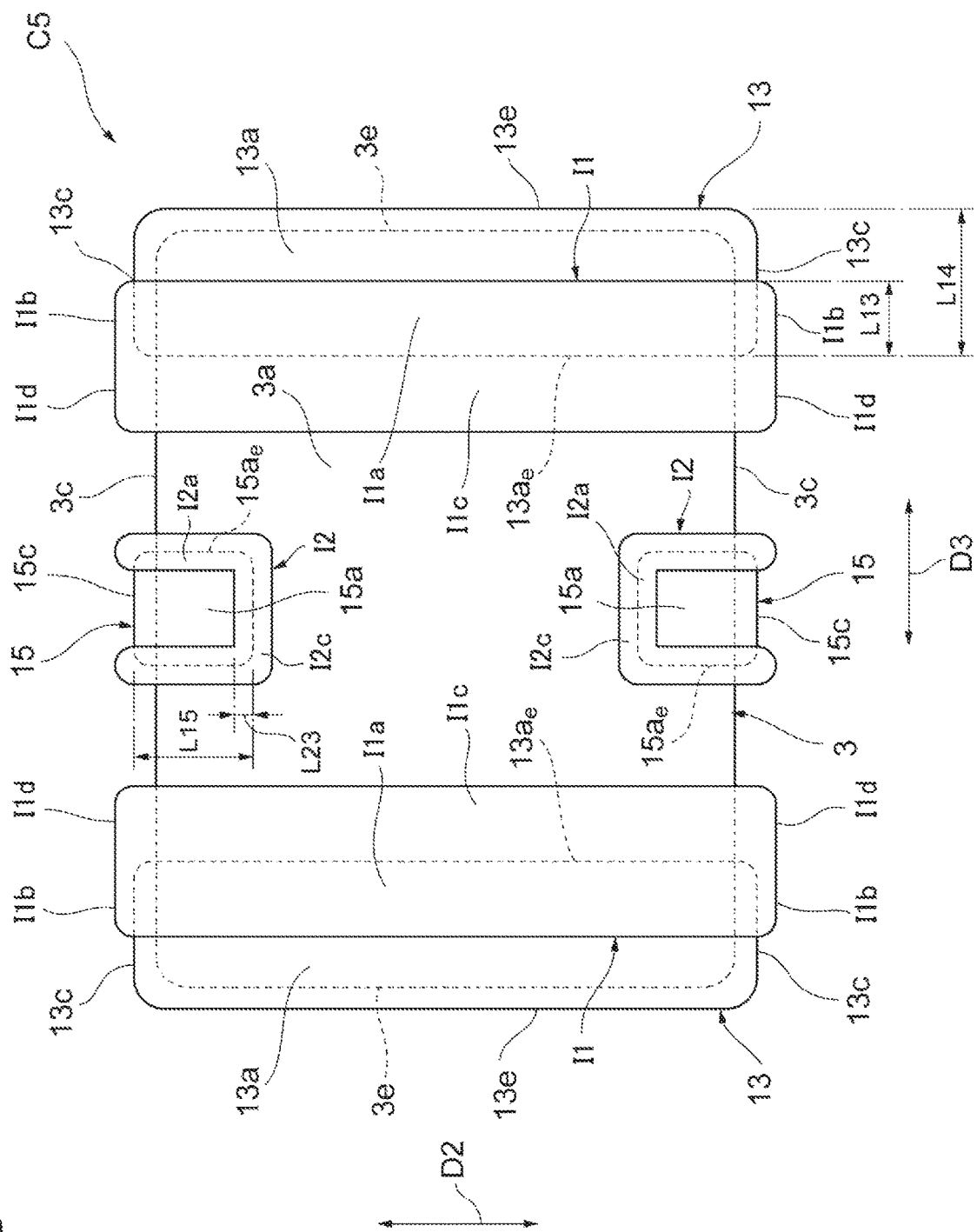
FIG. 14 is a plan view of a multilayer feedthrough capacitor according to a second embodiment.
Figure 15:
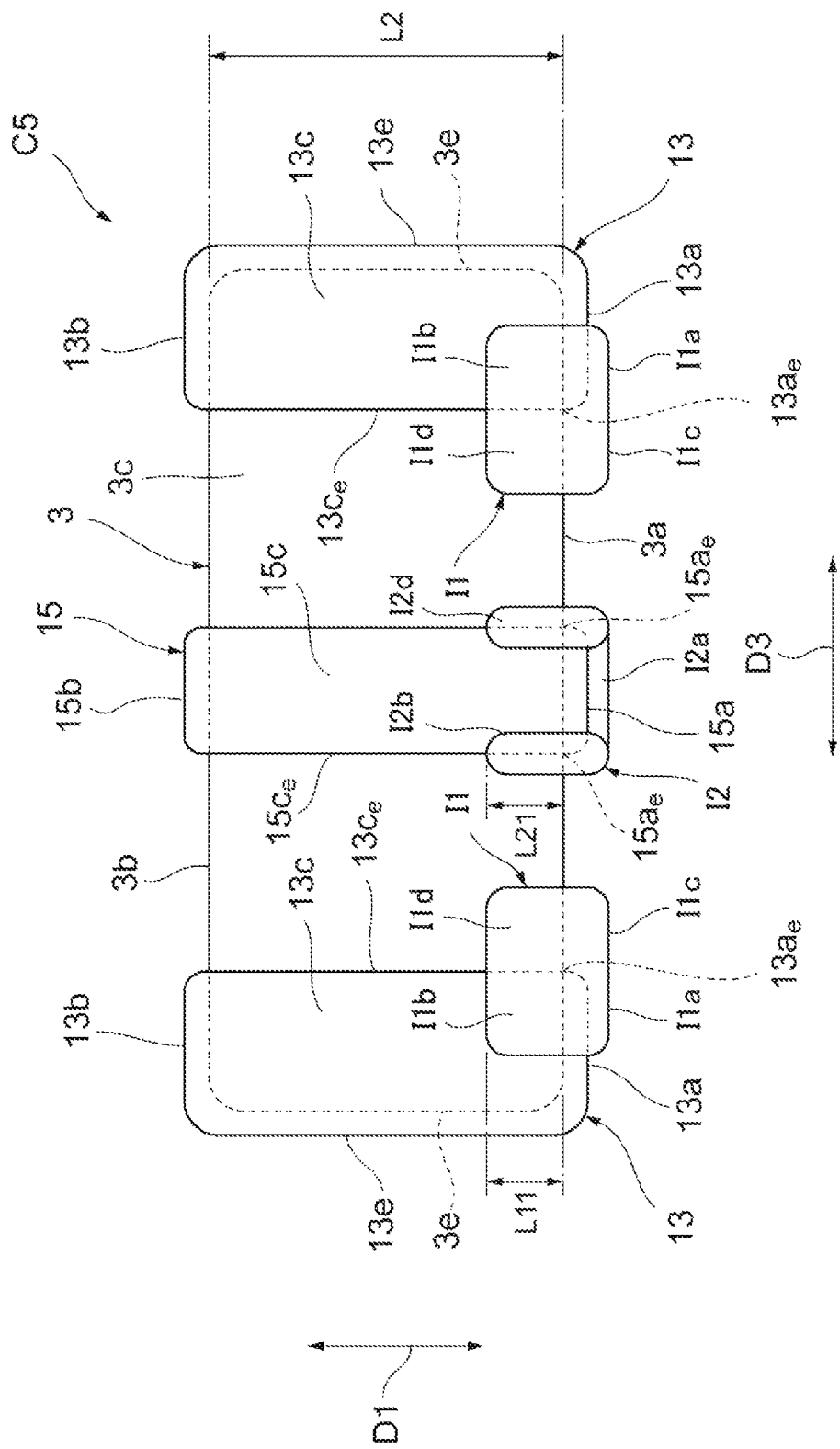
FIG. 15 is a side view of the multilayer feedthrough capacitor according to the second embodiment.
Figure 16:
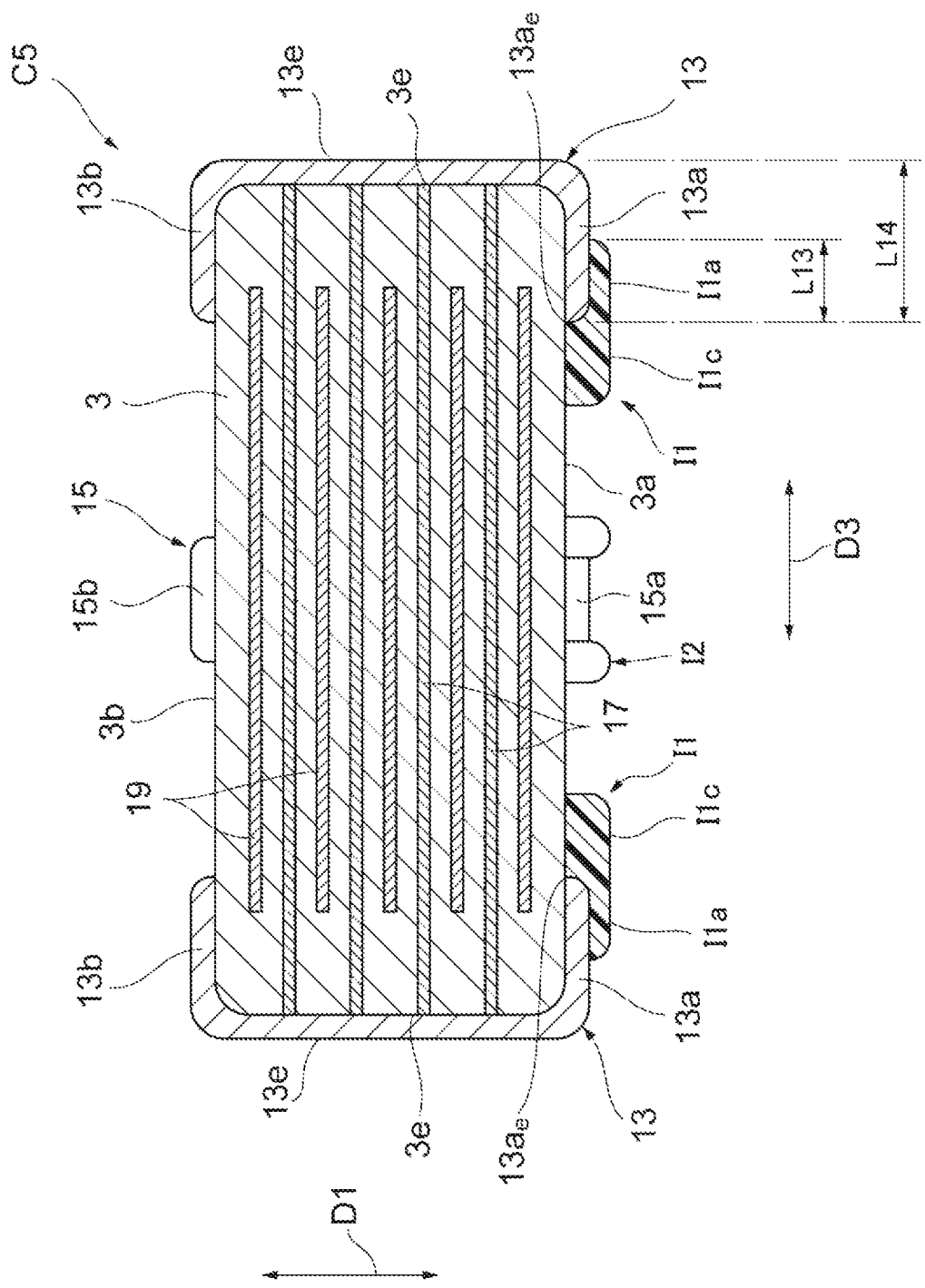
FIG. 16 is a view illustrating a cross-sectional configuration of the multilayer feedthrough capacitor according to the second embodiment.
Figure 17:
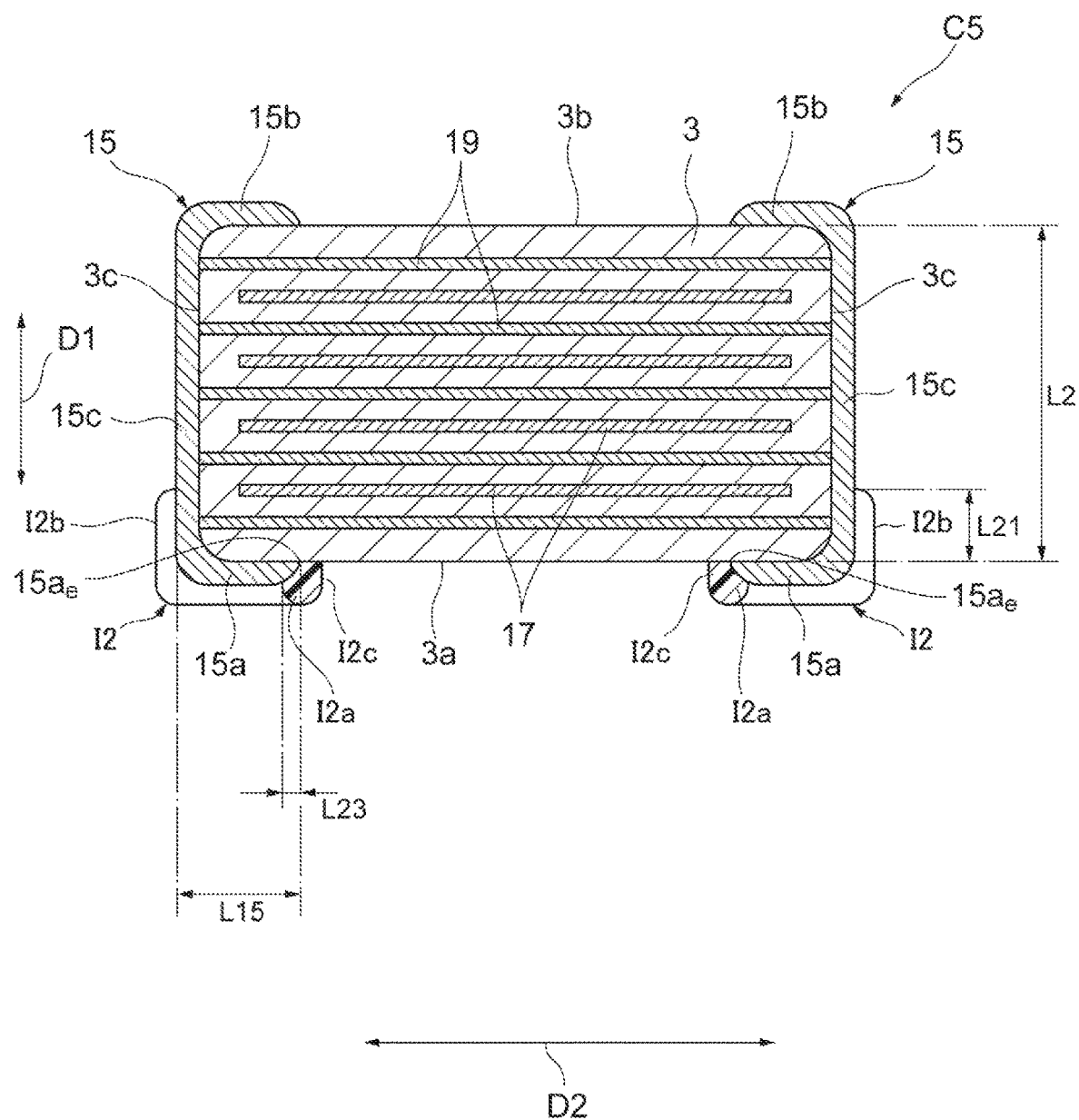
FIG. 17 is a view illustrating a cross-sectional configuration of the multilayer feedthrough capacitor according to the second embodiment.

With reference to FIGS. 14 to 17, a configuration of a multilayer feedthrough capacitor C5 according to a second embodiment will be described. FIG. 14 is a plan view of the multilayer feedthrough capacitor according to the second embodiment. FIG. 15 is a side view of the multilayer feedthrough capacitor according to the second embodiment. FIGS. 16 and 17 are views illustrating a cross-sectional configuration of the multilayer feedthrough capacitor according to the second embodiment. In the second embodiment, the multilayer feedthrough capacitor C5 is exemplified as an electronic component.

As illustrated in FIGS. 14 and 15, the multilayer feedthrough capacitor C5 includes an element body 3, a pair of external electrodes 13, and a pair of external electrodes 15. The pair of external electrodes 13 and the pair of external electrodes 15 are disposed on an outer surface of the element body 3. The pair of external electrodes 13 and the pair of external electrodes 15 are separated from each other. The pair of external electrodes 13 function as, for example, signal terminal electrodes, and the pair of external electrodes 15 function as, for example, ground terminal electrodes.

As illustrated in FIGS. 16 and 17, the multilayer feedthrough capacitor C5 includes a plurality of internal electrodes 17 and a plurality of internal electrodes 19. As with the internal electrodes 7 and 9, each of the internal electrodes 17 and 19 is made of a conductive material that is usually used as an internal electrode of a multilayer electronic component. Also in the second embodiment, each of the internal electrodes 17 and 19 is made of Ni.

The internal electrode 17 and the internal electrode 19 are disposed at different positions (layers) in a first direction D1. The internal electrode 17 and the internal electrode 19 are disposed alternately in the element body 3 to oppose each other in the first direction D1 with an interval therebetween. Polarities of the internal electrode 17 and the internal electrode 19 are different from each other. When a lamination direction of a plurality of dielectric layers is a second direction D2, the internal electrode 17 and the internal electrode 19 are disposed at different positions (layers) in the second direction D2. An end of the internal electrode 17 is exposed at a pair of end surfaces 3e. An end of the internal electrode 19 is exposed at a pair of side surfaces 3c.

The external electrode 13 is disposed at an end portion of the element body 3 in a third direction D3. The external electrode 13 includes an electrode part 13a disposed on a principal surface 3a, an electrode part 13b disposed on a principal surface 3b, an electrode part 13c disposed on the pair of side surfaces 3c, and an electrode part 13e disposed on a corresponding end surface 3e. The external electrode 13 is formed on five surfaces of the pair of principal surfaces 3a and 3b, the pair of side surfaces 3c, and one end surface 3e. The electrode parts 13a, 13b, 13c, and 13e adjacent to each other are connected to each other at a ridge of the element body 3, and are electrically connected to each other.

The electrode part 13e covers all the ends exposed on the end surface 3e, of the internal electrode 17. The internal electrodes 17 are directly connected to each electrode part 13e. The internal electrodes 17 are electrically connected to the pair of external electrodes 13.

The external electrode 15 is disposed at a central portion of the element body 3 in the third direction D3. The external electrode 15 includes an electrode part 15a disposed on the principal surface 3a, an electrode part 15b disposed on the principal surface 3b, and an electrode part 15c disposed on the side surface 3c. The external electrode 15 is formed on three faces of the pair of principal surfaces 3a and 3b, and one side surface 3c. The electrode parts 15a, 15b, and 15c adjacent to each other are connected to each other at a ridge of the element body 3, and are electrically connected to each other.

The electrode part 15c covers all the ends exposed at the side surface 3c, of the internal electrode 19. The internal electrodes 19 are directly connected to each electrode part 15c. The internal electrodes 19 are electrically connected to the pair of external electrodes 15.

As with the external electrodes 5, each of the external electrodes 13 and 15 includes a sintered metal layer. Each of the external electrodes 13 and 15 may include a plating layer formed on the sintered metal layer.

The multilayer feedthrough capacitor C5 is also soldered to an electronic device. In the multilayer feedthrough capacitor C5, the principal surface 3a is a mounting surface opposing the electronic device.

As illustrated in FIGS. 14 to 17, the multilayer feedthrough capacitor C5 includes a pair of insulating films I1 and a pair of insulating films I2. As with the insulating film I, the insulating film I1 and the insulating film I2 are made of a material having electrical insulation properties (e.g., an insulating resin or glass). In this embodiment, as with the insulating film I, the insulating film I1 and the insulating film I2 are made of an insulating resin (e.g., an epoxy resin).

The insulating film I1 covers a part of the external electrode 13 and a part of the element body 3, along an end edge $13a_e$ of the electrode part 13a and an end edge $13c_e$ of the electrode part 13c. The electrode part 13b, the electrode part 13e, and the principal surface 3b are not covered with the insulating film I1.

Along the end edge $13a_e$ and only a part of the end edge $13c_e$ (a portion close to the principal surface 3a in the first direction D1), the insulating film I1 continuously covers the end edge $13a_e$ and only the part of the end edge $13c_e$ and continuously covers the principal surface 3a and the side surface 3c. The insulating film I1 includes a film portion I1a located on the electrode part 13a, a film portion I1b located on the electrode part 13c, a film portion I1c located on the principal surface 3a, and a film portion I1d located on the side surface 3c. The film portions I1a, I1b, I1c, and I1d each are integrally formed.

A surface of the electrode part 13a includes a region covered with the insulating film I1 (film portion I1a) along the end edge $13a_e$, and a region exposed from the insulating film I1. The region exposed from the insulating film I1 is located closer to the end surface 3e than the region covered with the film portion I1a. A surface of the electrode part 13c includes a region covered with the insulating film I1 (film portion I1b) along the end edge $13c_e$, and a region exposed from the insulating film I1.

The principal surface 3a includes a region covered with the insulating film I1 (film portion I1c) along the end edge $13a_e$, and a region exposed from the insulating film I1. The side surface 3c includes a region covered with the insulating film I1 (film portion I1d) along the end edge $13c_e$, and a region exposed from the insulating film I1.

In the second embodiment, a ratio (L11/L2) of each length L11 of the film portion I1b and the film portion I1d in the first direction D1, to length L2 of the element body 3 is 0.1 or more to 0.4 or less. A ratio (L13/L14) of length L13 of the film portion I1a in the third direction D3 to length L14 of the electrode part 13a in the third direction D3 is 0.3 or more.

The insulating film I2 covers a part of the external electrode 15 and a part of the element body 3, along an end edge $15a_e$ of the electrode part 15a and an end edge $15c_e$ of the electrode part 15c. The electrode part 15b and the principal surface 3b are not covered with the insulating film I2.

Along the end edge $15a_e$ and only a part of the end edge $15c_e$ (a portion close to the principal surface 3a in the first direction D1), the insulating film I2 continuously covers the end edge $15a_e$ and only the part of the end edge $15c_e$, and continuously covers the principal surface 3a and the side surface 3c. The insulating film I2 includes a film portion I2a located on the electrode part 15a, a film portion I2b located on the electrode part 15c, a film portion I2c located on the principal surface 3a, and a film portion I2d located on the side surface 3c. The film portions I2a, I2b, I2c and I2d each are integrally formed.

A surface of the electrode part 15a includes a region covered with the insulating film I2 (film portion I2a) along the end edge $15a_e$, and a region exposed from the insulating film I2. A surface of the electrode part 15c includes a region covered with the insulating film I2 (film portion I2b) along the end edge $15c_e$, and a region exposed from the insulating film I2.

The principal surface 3a includes a region covered with the insulating film I2 (film portion I2c) along the end edge $15a_e$, and a region exposed from the insulating film I2. The side surface 3c includes a region covered with the insulating film I2 (film portion I2d) along the end edge $15c_e$, and a region exposed from the insulating film I2.

In the second embodiment, a ratio (L21/L2) of each length L21 of the film portion I2b and the film portion I2d in the first direction D1, to length L2 is 0.1 or more to 0.4 or less. A ratio (L23/L15) of length L23 of the film portion I2a in the second direction D2 to length L15 of the electrode part 15a in the second direction D2 is 0.3 or more.

Since the insulating film I1 continuously covers the end edge $13a_e$ and only the part of the end edge $13c_e$, a solder fillet does not reach the end edge $13a_e$ and the part of the end edge $13c_e$ (an end edge of a portion located near the principal surface 3a, in the electrode part 13c). Since the insulating film I2 continuously covers the end edge $15a_e$ and only the part of the end edge $15c_e$, a solder fillet does not reach the end edge $15a_e$ and the part of the end edge $15c_e$ (an end edge of a portion located near the principal surface 3a, in the electrode part 15c). Therefore, even when an external force acts on the multilayer feedthrough capacitor C5 through the solder fillet, a stress tends not to concentrate on the end edges $13a_e$, $13c_e$, $15a_e$, and $15c_e$, and the end edges $13a_e$, $13c_e$, $15a_e$, and $15c_e$ tend not to become a starting point of cracks. This suppresses occurrence of cracks in the element body 3 in the multilayer feedthrough capacitor C5.

In the second embodiment, since the insulating film I1 continuously covers the principal surface 3a and the side surface 3c along the end edge $13a_e$ and only a part of the end edge $13c_e$, the end edge $13a_e$ and the part of the end edge $13c_e$ are surely covered with the insulating film I1. Since the insulating film I2 continuously covers the principal surface 3a and the side surface 3c along the end edge $15a_e$ and only a part of the end edge $15c_e$, the end edge $15a_e$ and the part of the end edge $15c_e$ are surely covered with the insulating film I2. Therefore, in the multilayer feedthrough capacitor C5, the end edges $13a_e$, $13c_e$, $15a_e$, and $15c_e$ further tend not to become the starting point of cracks.

In the second embodiment, since the entire electrode part 13b is exposed from the insulating film I1, a solder fillet is formed on the electrode part 13b. Since the surface of the electrode part 15c includes the region exposed from the insulating film I2, a solder fillet is formed on the region exposed from the insulating film I2. Therefore, a mounting strength of the multilayer feedthrough capacitor C5 is secured.

In the second embodiment, the ratio (L11/L2) of length L11 to length L2 of the element body 3 is 0.1 or more to 0.4 or less. The ratio (L21/L2) of length L21 to length L2 of the element body 3 is 0.1 or more to 0.4 or less. In which cases, the effect of suppressing occurrence of cracks is secured, and sizes of the insulating films I1 and I2 are reduced. Therefore, a cost of the multilayer feedthrough capacitor C5 is reduced.

In the second embodiment, the ratio (L13/L14) of length L13 of the film portion I1a to length L14 of the electrode part 13a is 0.3 or more. The ratio (L23/L15) of length L23 of the film portion I2a to length L15 of the electrode part 15a is 0.3 or more. In which cases, the stress further tends not to concentrate on the end edges $13a_e$ and $15a_e$, further suppressing occurrence of cracks in the element body 3.

Figure 18:
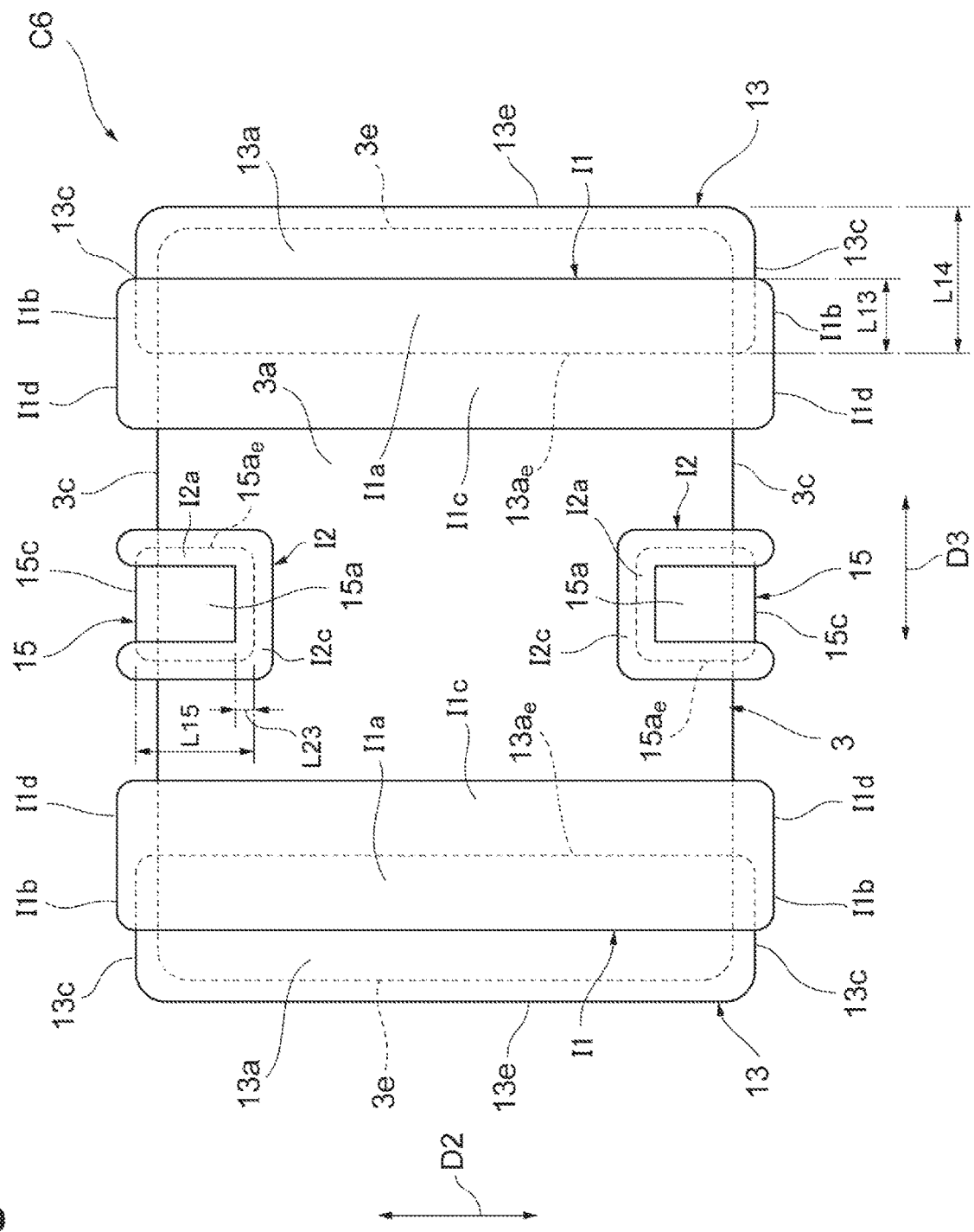
FIG. 18 is a plan view of a multilayer feedthrough capacitor according to a modification of the second embodiment.
Figure 19:
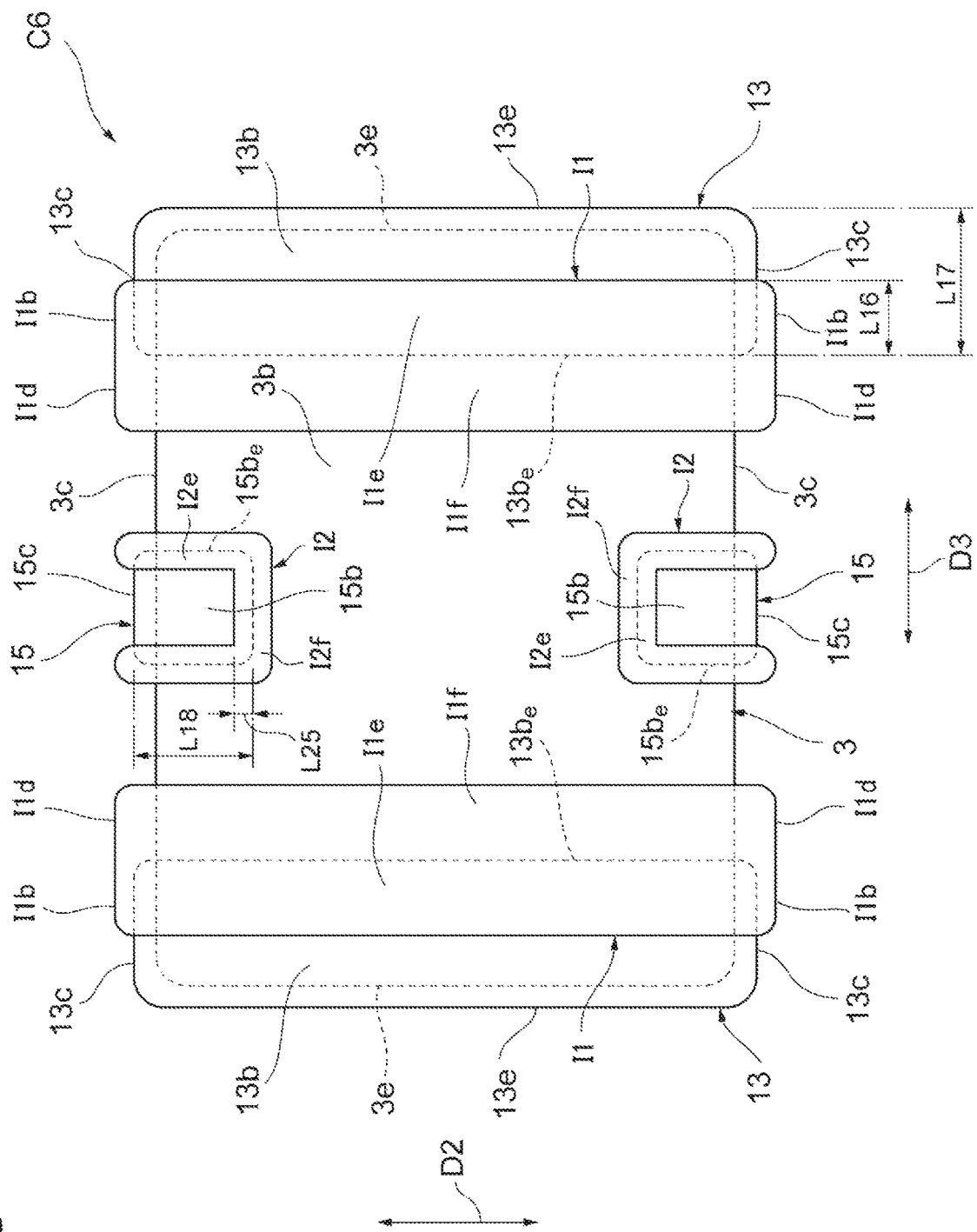
FIG. 19 is a plan view of the multilayer feedthrough capacitor according to the modification.
Figure 20:
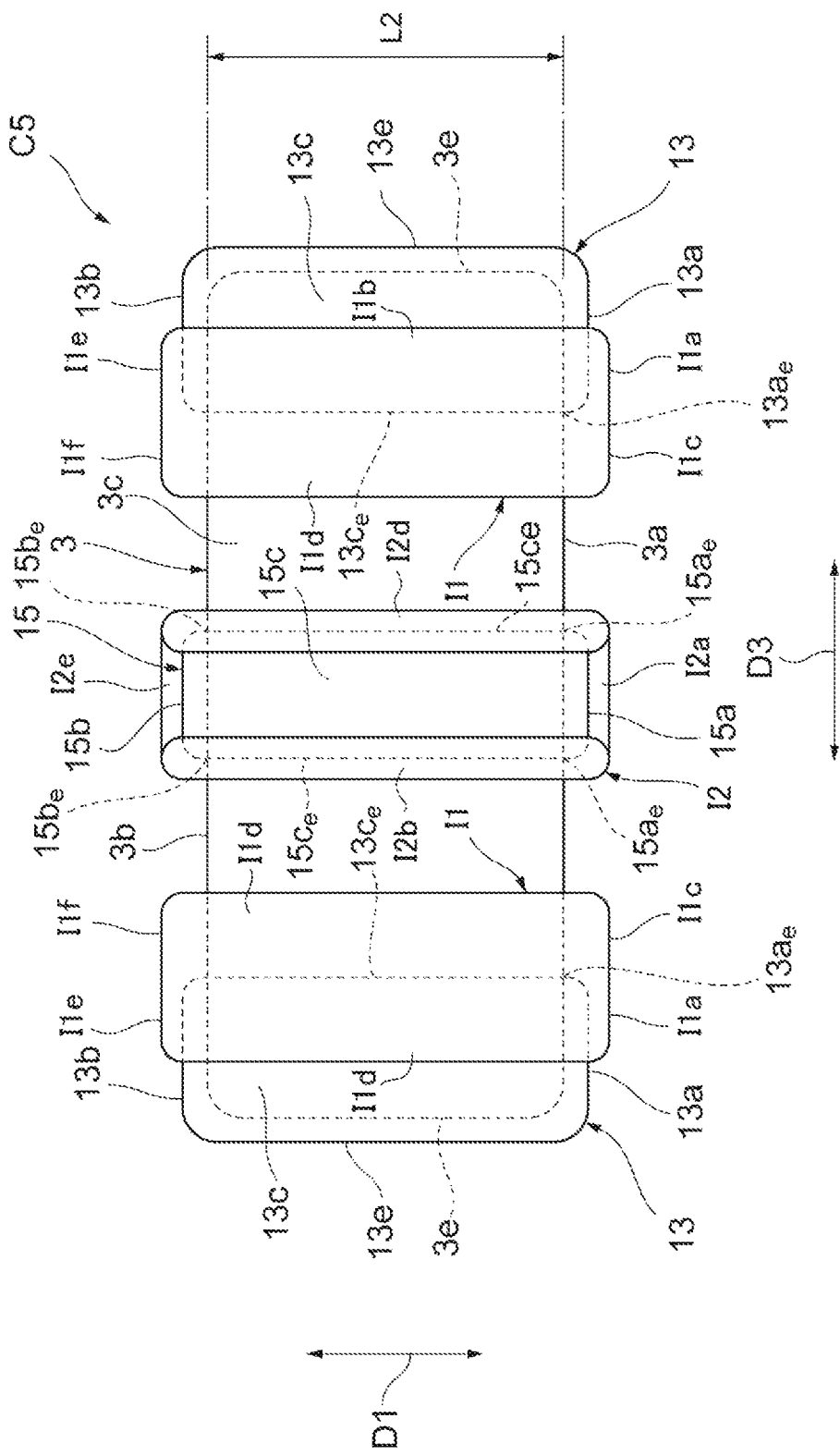
FIG. 20 is a side view of the multilayer feedthrough capacitor according to the modification.

Next, with reference to FIGS. 18 to 20, a configuration of a multilayer feedthrough capacitor C6 according to a modification of the second embodiment will be described. FIGS. 18 and 19 are plan views of the multilayer feedthrough capacitor according to the modification. FIG. 20 is a side view of the multilayer feedthrough capacitor according to the modification.

As with the multilayer feedthrough capacitor C5, the multilayer feedthrough capacitor C6 includes an element body 3, a pair of external electrodes 13, a pair of external electrodes 15, a plurality of internal electrodes 17 (not illustrated), and a plurality of internal electrodes 19 (not illustrated). In the multilayer feedthrough capacitor C6, shapes of insulating films I1 and I2 are different from that of the multilayer feedthrough capacitor C5.

As illustrated in FIGS. 18 to 20, the multilayer feedthrough capacitor C6 includes a pair of insulating films I1. The insulating film I1 covers a part of the external electrode 13 and a part of the element body 3, along an end edge $13a_e$ of an electrode part 13a, an end edge $13b_e$ of an electrode part 13b, and an end edge $13c_e$ of an electrode part 13c. The electrode part 13e is not covered with the insulating film I1.

Along, all of the end edge $13a_e$, the end edge $13b_e$, and the end edge $13c_e$, the insulating film I1 continuously covers the end edge $13a_e$, the end edge $13b_e$, and the end edge $13c_e$, and continuously covers a principal surface 3a, a principal surface 3b, and a side surface 3c. The insulating film I1 includes a film portion I1a located on the electrode part 13a, a film portion I1b located on the electrode part 13c, a film portion I1c located on the principal surface 3a, a film portion I1d located on the side surface 3c, a film portion I1e located on the electrode part 13b, and a film portion I1f located on the principal surface 3b. The film portions I1a, I1b, I1c, I1d, I1e, and I1f each are integrally formed.

A surface of the electrode part 13a includes a region covered with the insulating film I1 (film portion I1a) along the end edge $13a_e$, and a region exposed from the insulating film I1. The region exposed from the insulating film I1, on the surface of the electrode part 13a, is located closer to an end surface 3e than the region covered with the film portion I1a. A surface of the electrode part 13c includes a region covered with the insulating film I1 (film portion I1b) along the end edge $13c_e$, and a region exposed from the insulating film I1. The region exposed from the insulating film I1, on the surface of the electrode part 13c, is located closer to the end surface 3e than the region covered with the film portion I1b. A surface of the electrode part 13b includes a region covered with the insulating film I1 (film portion I1e) along the end edge $13b_e$, and a region exposed from the insulating film I1. The region exposed from the insulating film I1, on the surface of the electrode part 13b, is located closer to the end surface 3e than the region covered with the film portion I1e.

The principal surface 3a includes a region covered with the insulating film I1 (film portion I1c) along the end edge $13a_e$, and a region exposed from the insulating film I1. The side surface 3c includes a region covered with the insulating film I (film portion I1d) along the end edge $13c_e$, and a region exposed from the insulating film I1. The principal surface 3b includes a region covered with the insulating film I1 (film portion I1f) along the end edge $13b_e$, and a region exposed from the insulating film I1.

As illustrated in FIGS. 18 to 20, the multilayer feedthrough capacitor C6 includes a pair of insulating films I2. The insulating film I2 covers a part of the external electrode 15 and a part of the element body 3, along an end edge $15a_e$ of an electrode part 15a, an end edge $15b_e$ of an electrode part 15b, and an end edge $15c_e$ of an electrode part 15c.

Along all of the end edge $15a_e$, the end edge $15b_e$, and the end edge $15c_e$, the insulating film I2 continuously covers the end edge $15a_e$, the end edge $15b_e$, and the end edge $15c_e$, and continuously covers the principal surface 3a, the principal surface 3b, and the side surface 3c. The insulating film I2 includes a film portion I2a located on the electrode part 15a, a film portion I2b located on the electrode part 15c, a film portion I2c located on the principal surface 3a, a film portion I2d located on the side surface 3c, a film portion I2e located on the electrode part 15b, and a film portion I2f located on the principal surface 3b. The film portions I2a, I2b, I2c, I2d, I2e, and I2f each are integrally formed.

A surface of the electrode part 15a includes a region covered with the insulating film I2 (film portion I2a) along the end edge $15a_e$, and a region exposed from the insulating film I2. A surface of the electrode part 15c includes a region covered with the insulating film I2 (film portion I2b) along the end edge $15c_e$, and a region exposed from the insulating film I2. A surface of the electrode part 15b includes a region covered with the insulating film I2 (film portion I2e) along the end edge $15b_e$, and a region exposed from the insulating film I2.

The principal surface 3a includes a region covered with the insulating film I2 (film portion I2c) along the end edge $15a_e$, and a region exposed from the insulating film I2. The side surface 3c includes a region covered with the insulating film I2 (film portion I2d) along the end edge $15c_e$, and a region exposed from the insulating film I2. The principal surface 3b includes a region covered with the insulating film I2 (film portion I2f) along the end edge $15b_e$, and a region exposed from the insulating film I2.

A ratio (L16/L17) of length L16 of the film portion I2e in a third direction D3 to length L17 of the electrode part 13b in the third direction D3 is 0.3 or more. In this modification, length L16 is equal to length L13, and length L17 is equal to length L14.

A ratio (L25/L18) of length L25 of the film portion I2a in a second direction D2 to length L18 of the electrode part 15b in the second direction D2 is 0.3 or more. In this modification, length L18 is equal to length L15, and length L25 is equal to length L23.

In this modification, the insulating film I1 continuously covers all of the end edge $13a_e$, the end edge $13b_e$, and the end edge $13c_e$, while the insulating film I2 continuously covers all of the end edge $15a_e$, the end edge $15b_e$, and the end edge $15c_e$. Therefore, occurrence of cracks in the element body 3 is surely suppressed.

Since the insulating film I1 continuously covers the principal surface 3a, the principal surface 3b, and the side surface 3c along all of the end edge $13a_e$, the end edge $13b_e$, and the end edge $13c_e$, all of the end edge $13a_e$, the end edge $13b_e$, and the end edge $13c_e$ are surely covered with the insulating film I1. Since the insulating film I2 continuously covers the principal surface 3a, the principal surface 3b, and the side surface 3c along all of the end edge $15a_e$, the end edge $15b_e$, and the end edge $15c_e$, all of the end edge $15a_e$, the end edge $15b_e$, and the end edge $15c_e$ are surely covered with the insulating film I2. Therefore, the end edges $13a_e$, $13c_e$, $15a_e$, and $15c_e$ further tend not to become a starting point of cracks.

The multilayer feedthrough capacitor C6 can be mounted with the principal surface 3a as a mounting surface, or mounted with the principal surface 3b as a mounting surface. Therefore, in the multilayer feedthrough capacitor C6, there is no directionality in mounting the multilayer feedthrough capacitor C6, improving workability. Even when the principal surface 3b is the mounting surface, the end edges $13b_e$, $13c_e$, $15b_e$, and $15c_e$ tend not to become a starting point of cracks.

Third Embodiment

Figure 21:
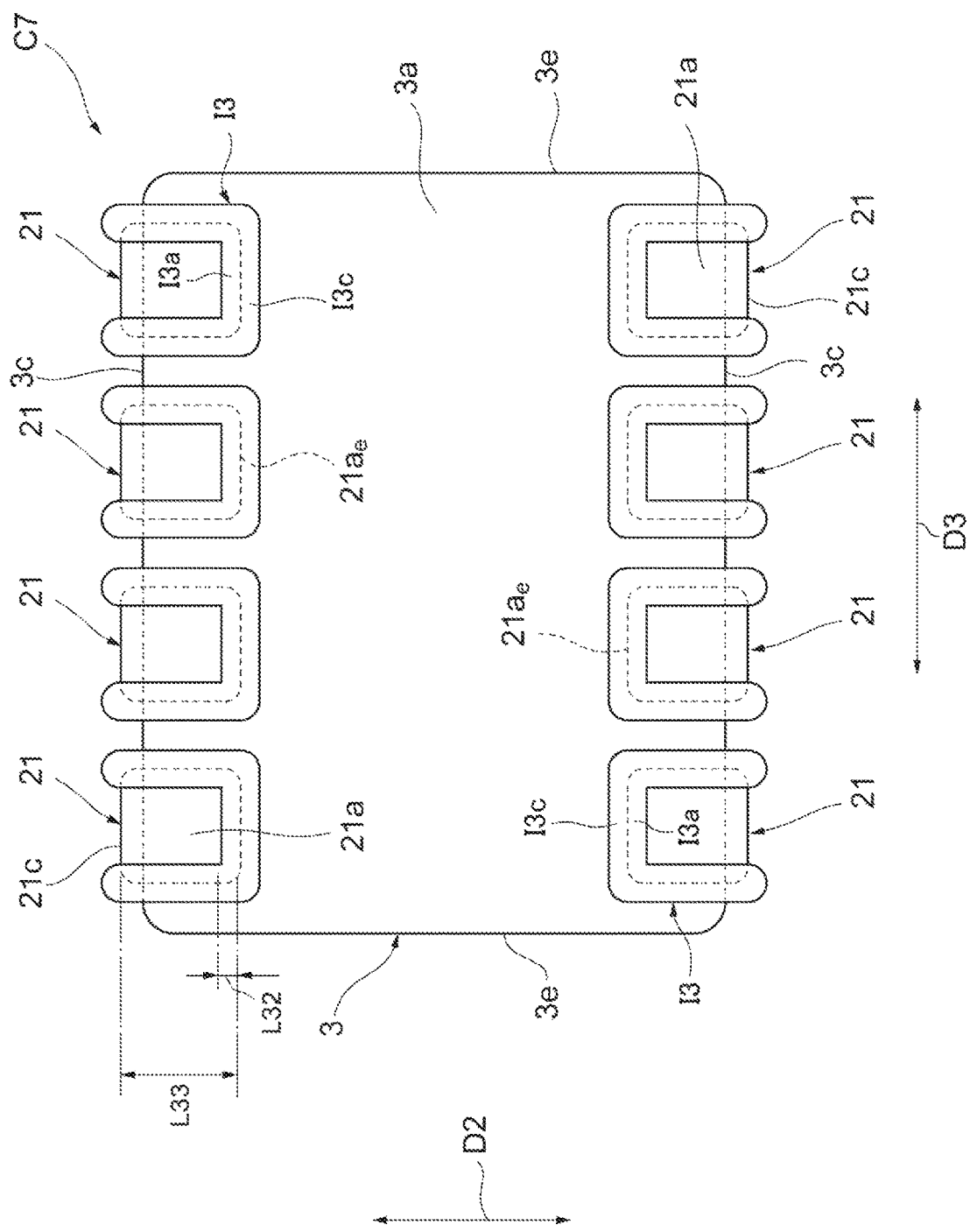
FIG. 21 is a plan view of a multilayer capacitor according to a third embodiment.
Figure 22:
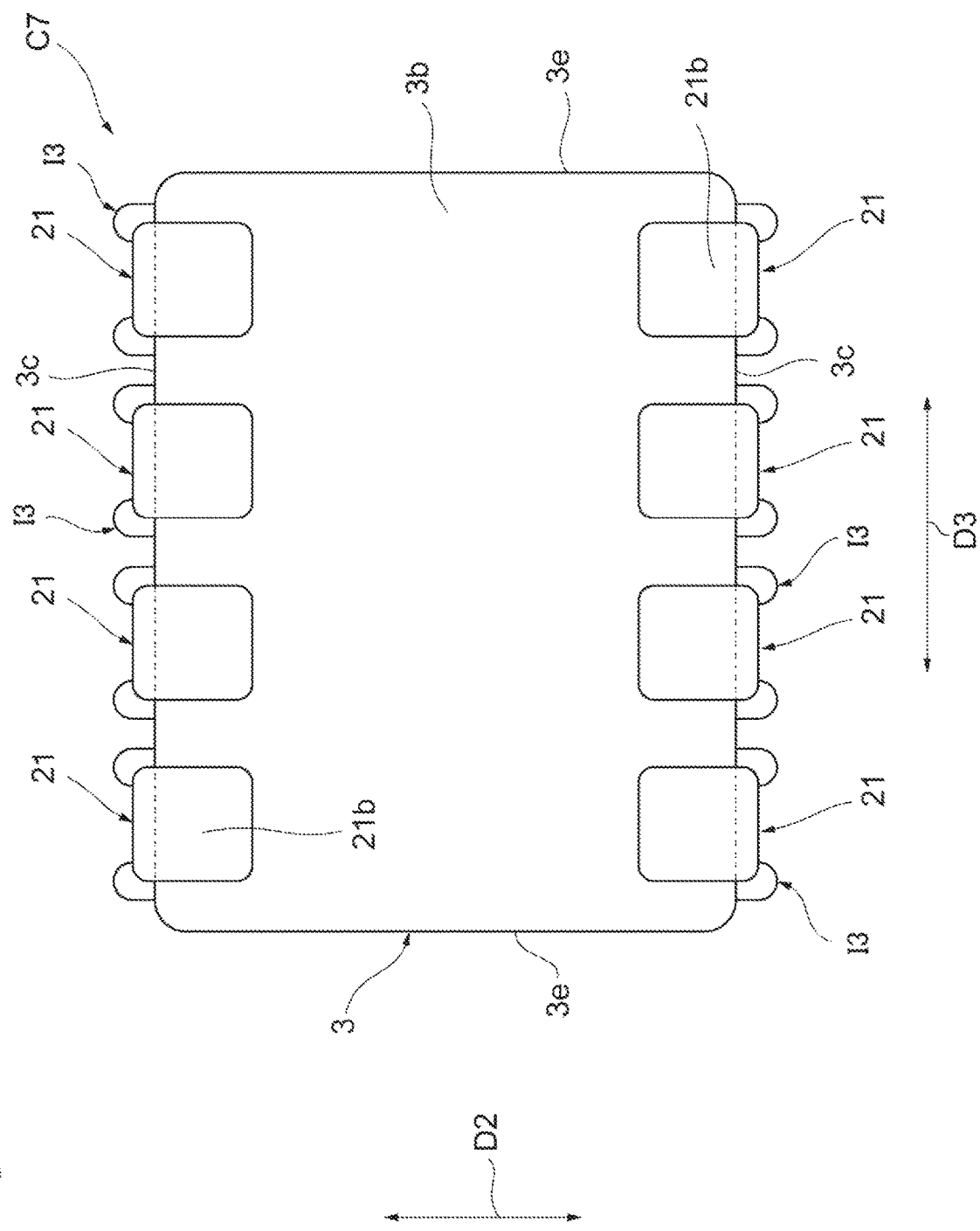
FIG. 22 is a plan view of a multilayer capacitor according to the third embodiment.
Figure 23:
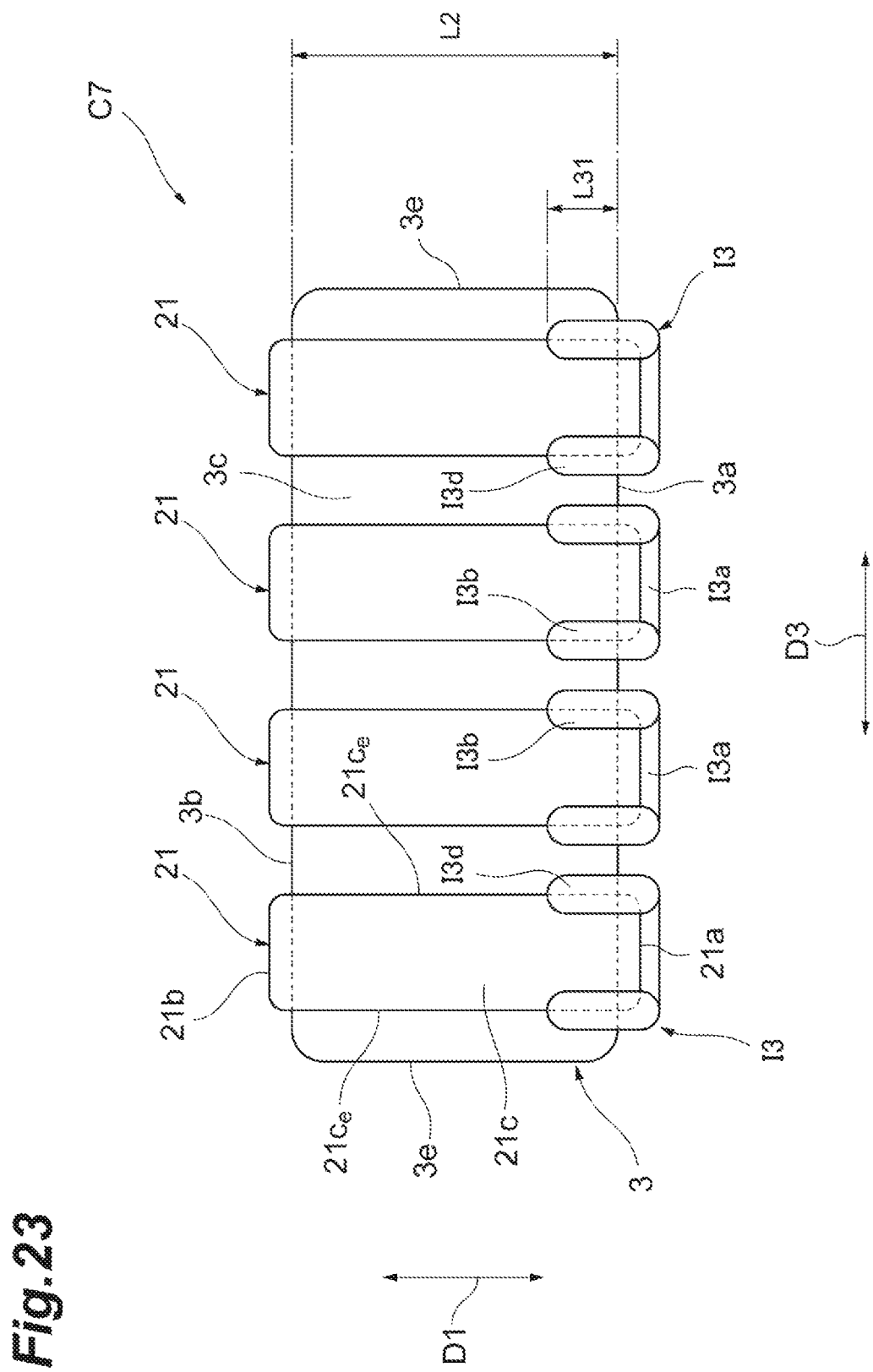
FIG. 23 is a side view of the multilayer capacitor according to the third embodiment.

With reference to FIGS. 21 to 23, a configuration of a multilayer capacitor C7 according to a third embodiment will be described. FIGS. 21 and 22 are a plan views of the multilayer capacitor according to the third embodiment. FIG. 23 is a side view of the multilayer capacitor according to the third embodiment. In the third embodiment, the multilayer capacitor C7 is exemplified as an electronic component.

The multilayer capacitor C7 includes an element body 3, a plurality of external electrodes 21, and a plurality of internal electrodes (not illustrated). The plurality of external electrodes 21 are disposed on an outer surface of the element body 3, and are separated from each other. In this embodiment, the multilayer capacitor C7 includes eight external electrodes 21. The number of the external electrodes 21 is not limited to eight.

Each of the external electrodes 21 includes an electrode part 21a disposed on a principal surface 3a, an electrode part 21b disposed on a principal surface 3b, and an electrode part 21c disposed on a side surface 3c. The external electrode 21 is formed on three faces of the pair of principal surfaces 3a and 3b, and one side surface 3c. The electrode parts 21a, 21b, and 21c adjacent to each other are connected to each other at a ridge of the element body 3, and are electrically connected to each other.

The electrode part 21c covers all the ends exposed at the side surface 3c, of the respective internal electrodes. The electrode part 21c is directly connected to the respective internal electrodes. The external electrode 21 is electrically connected to the respective internal electrodes.

As with the external electrodes 5, 13, and 15, the external electrodes 21 include a sintered metal layer. The external electrodes 21 may also include a plating layer formed on the sintered metal layer.

The multilayer capacitor C7 is also soldered to an electronic device. In the multilayer capacitor C7, the principal surface 3a is a mounting surface opposing the electronic device.

As illustrated in FIGS. 21 to 23, the multilayer capacitor C7 includes a plurality of insulating films I3. As with the insulating films I, I1, and I2, the insulating film I3 is made of a material having electrical insulation properties (e.g., an insulating resin or glass). In this embodiment, as with the insulating films I, I1 and I2, the insulating film I3 is made of an insulating resin (e.g., an epoxy resin).

The insulating film I3 covers a part of the external electrode 21 and a part of the element body 3, along an end edge $21a_e$ of the electrode part 21a and an end edge $21c_e$ of the electrode part 21c. The electrode part 21b, the principal surface 3b, and a pair of end surfaces 3e are not covered with the insulating film I3.

Along the end edge $21a_e$ and only a part of the end edge $21c_e$ (a portion close to the principal surface 3a in a first direction D1), the insulating film I3 continuously covers the end edge $21a_e$ and only the part of the end edge $21c_e$, and continuously covers the principal surface 3a and the side surface 3c. The insulating film I3 includes a film portion I3a located on the electrode part 21a, a film portion I3b located on the electrode part 21c, a film portion I3c located on the principal surface 3a, and a film portion I3d located on the side surface 3c. The film portions I3a, I3b, I3c, and I3d each are integrally formed.

A surface of the electrode part 21a includes a region covered with the insulating film I3 (film portion I3a) along the end edge $21a_e$, and a region exposed from the insulating film I3. A surface of the electrode part 21c includes a region covered with the insulating film I3 (film portion I3b) along the end edge $21c_e$, and a region exposed from the insulating film I3.

The principal surface 3a includes a region covered with the insulating film I3 (film portion I3c) along the end edge $21a_e$, and a region exposed from the insulating film I3. The side surface 3c includes a region covered with the insulating film I3 (film portion I3d) along the end edge $21c_e$, and a region exposed from the insulating film I3.

In the third embodiment, a ratio (L31/L2) of each length L31 of the film portion I3b in a first direction D1, to length L2 of the element body 3 is 0.1 or more to 0.4 or less. A ratio (L32/L33) of length L32 of the film portion I3a in a second direction D2 to length L33 of the electrode part 21a in the second direction D2 is 0.3 or more.

Since the insulating film I3 continuously covers the end edge $21a_e$ and only the part of the end edge $21c_e$, a solder fillet does not reach the end edge $21a_e$ and the part of the end edge $21c_e$ (an end edge of a portion located near the principal surface 3a, in the electrode part 21c). Therefore, even when an external force acts on the multilayer capacitor C7 through the solder fillet, a stress tends not to concentrate on the end edges $21a_e$ and $21c_e$, and the end edges $21a_e$ and $21c_e$ tend not to become a starting point of cracks. This suppresses occurrence of cracks in the element body 3 in the multilayer capacitor C7.

In the third embodiment, since the insulating film I3 continuously covers the principal surface 3a and the side surface 3c along the end edge $21a_e$ and only the part of the end edge $21c_e$, the end edge $21a_e$ and the part of the end edge $21c_e$ are surely covered with the insulating film I3. Therefore, in the multilayer capacitor C7, the end edges $21a_e$ and $21c_e$ further tend not to become the starting point of cracks.

In the third embodiment, since the surface of the electrode part 21c includes the region exposed from the insulating film I3, a solder fillet is formed on the region exposed from the insulating film I3. Therefore, a mounting strength of the multilayer capacitor C7 is secured.

In the third embodiment, the ratio (L31/L2) of length L31 of the film portion I3b to length L2 of the element body 3 is 0.1 or more to 0.4 or less. In this case, while securing the effect of suppressing occurrence of cracks, a size of the insulating film I3 is reduced. Therefore, a cost of the multilayer capacitor C7 is reduced.

In the third embodiment, the ratio (L32/L33) of length L32 of the film portion I3a to length L33 of the electrode part 21a is 0.3 or more. In which case, the stress further tends not to concentrate on the end edge $21a_e$, further suppressing occurrence of cracks in the element body 3.

Figure 24:
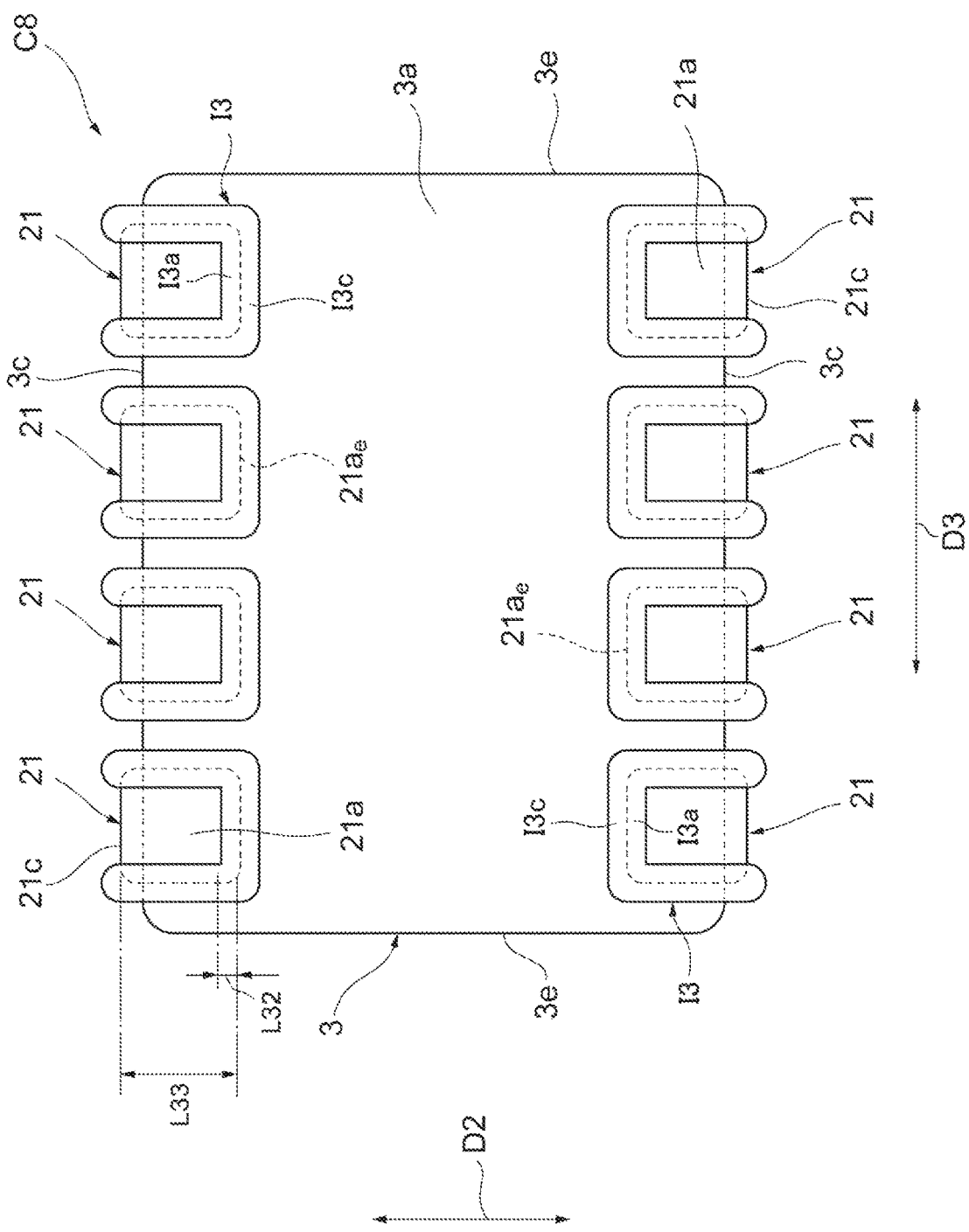
FIG. 24 is a plan view of a multilayer capacitor according to a modification of the third embodiment.
Figure 25:
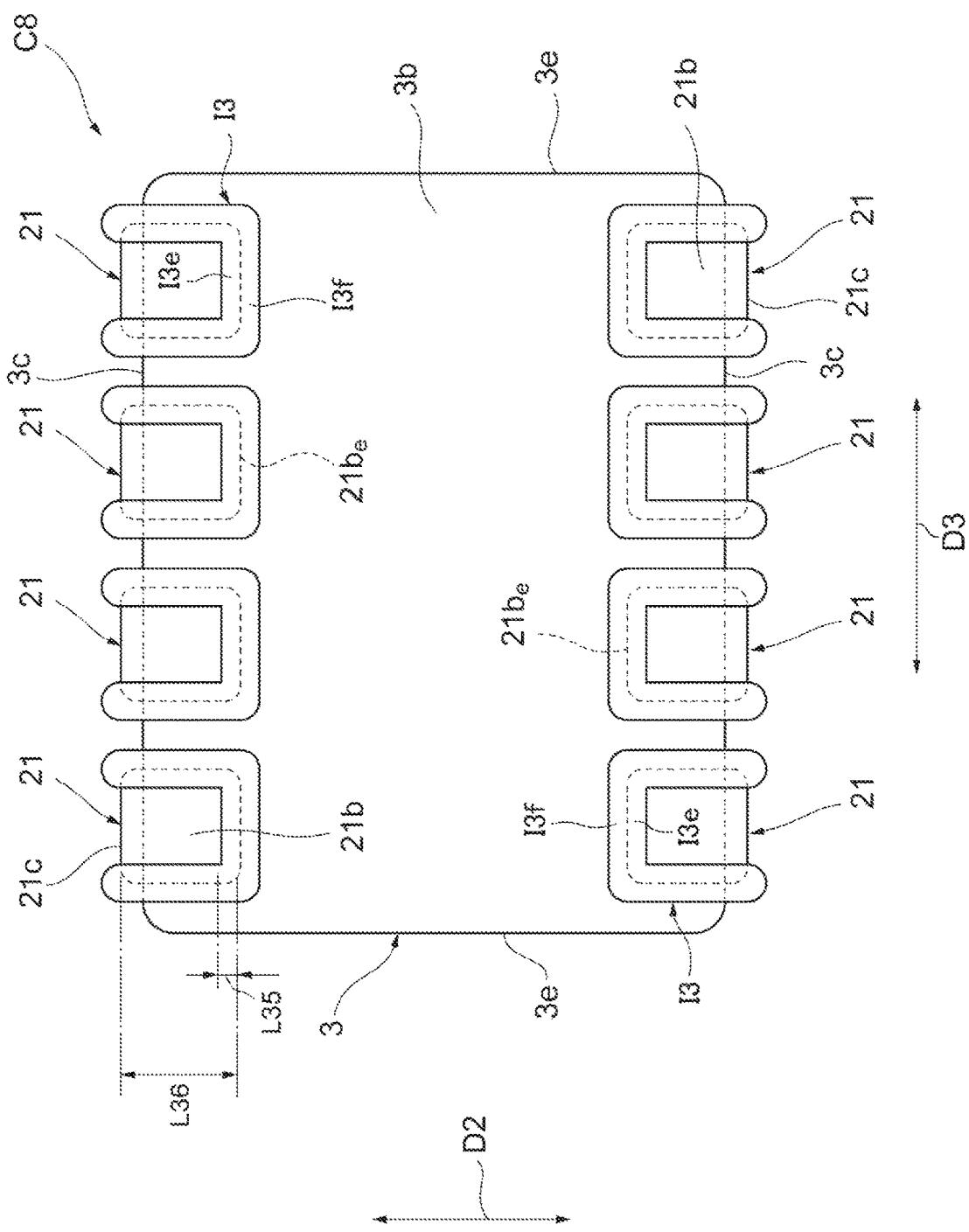
FIG. 25 is a plan view of the multilayer capacitor according to the modification.
Figure 26:
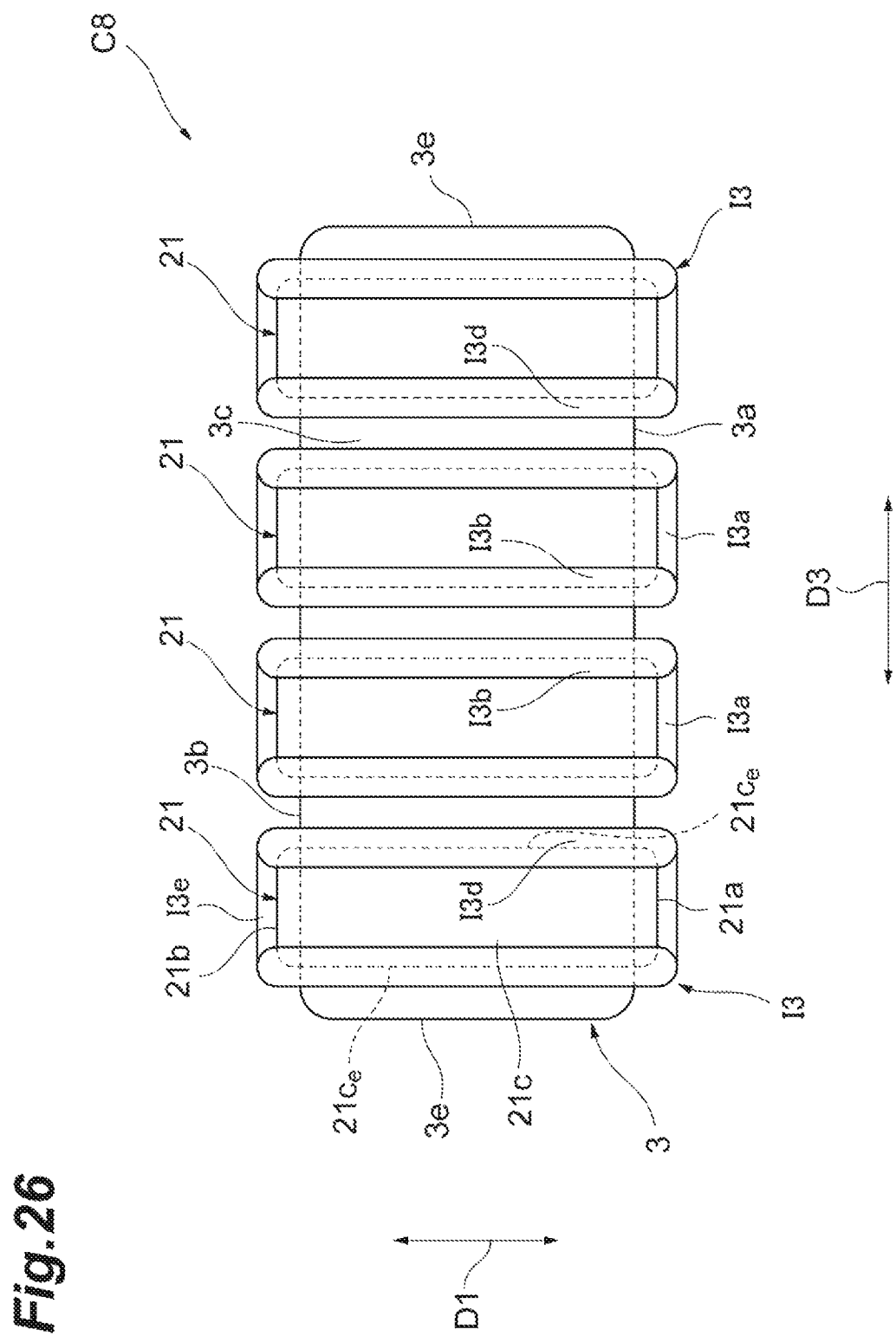
FIG. 26 is a side view of the multilayer capacitor according to the modification.

Next, with reference to FIGS. 24 to 26, a configuration of a multilayer capacitor C8 according to a modification of the third embodiment will be described. FIGS. 24 and 25 are plan views of the multilayer capacitor according to the modification. FIG. 26 is a side view of the multilayer capacitor according to the modification.

As with the multilayer capacitor C7, the multilayer capacitor C8 includes an element body 3, a plurality of external electrodes 21, and a plurality of internal electrodes (not illustrated). In the multilayer capacitor C8, a shape of an insulating film I3 is different from that of the multilayer capacitor C7.

As illustrated in FIGS. 24 to 26, the multilayer capacitor C8 includes a plurality of insulating films I3. The insulating film I3 covers a part of the external electrode 21 and a part of the element body 3, along an end edge $21a_e$ of an electrode part 21a, an end edge $21b_e$ of an electrode part 21b, and an end edge $21c_e$, of an electrode part 21c.

Along all of the end edge $21a_e$, the end edge $21b_e$, and the end edge $21c_e$, the insulating film I3 continuously covers the end edge $21a_e$, the end edge $21b_e$, and the end edge $21c_e$, and continuously covers a principal surface 3a, a principal surface 3b, and the side surface 3c. The insulating film I3 includes a film portion I3a located on the electrode part 21a, a film portion I3b located on the electrode part 21c, a film portion I3c located on the principal surface 3a, a film portion I3d located on a side surface 3c, a film portion I3e located on the electrode part 21b, and a film portion I3f located on the principal surface 3b. The film portions I3a, I3b, I3c, I3d, I3e, and I3f each are integrally formed.

A surface of the electrode part 21a includes a region covered with the insulating film I3 (film portion I3a) along the end edge $21a_e$, and a region exposed from the insulating film I3. A surface of the electrode part 21c includes a region covered with the insulating film I3 (film portion I3b) along the end edge $21c_e$, and a region exposed from the insulating film I3. A surface of the electrode part 21b includes a region covered with the insulating film I3 (film portion I3e) along the end edge $21b_e$, and a region exposed from the insulating film I3.

The principal surface 3a includes a region covered with the insulating film I3 (film portion I3c) along the end edge $21a_e$, and a region exposed from the insulating film I3. The side surface 3c includes a region covered with the insulating film I3 (film portion I3d) along the end edge $21c_e$, and a region exposed from the insulating film I3. The principal surface 3b includes a region covered with the insulating film I3 (film portion I3f) along the end edge $21b_e$, and a region exposed from the insulating film I3.

A ratio (L35/L36) of length L35 of the film portion I3a in a second direction D2 to length L36 of the electrode part 21b in the second direction D2 is 0.3 or more. In this modification, length L35 is equal to length L32, and length L36 is equal to length L33.

In this modification, since the insulating film I3 continuously covers all of the end edge $21a_e$, the end edge $21b_e$, and the end edge $21c_e$, occurrence of cracks in the element body 3 is surely suppressed. Since the insulating film I3 continuously covers the principal surface 3a, the principal surface 3b, and the side surface 3c along all of the end edge $21a_e$, the end edge $21b_e$, and the end edge $21c_e$, all of the end edge $21a_e$, the end edge $21b_e$, and the end edge $21c_e$ are surely covered with the insulating film I3. Therefore, the end edges $21a_e$ and $21c_e$ tend not to become a starting point of cracks.

The multilayer capacitor C8 can be mounted with the principal surface 3a as a mounting surface, or mounted with the principal surface 3b as a mounting surface. Therefore, in the multilayer capacitor C8, there is no directionality in mounting the multilayer capacitor C8, improving workability. When the principal surface 3b is the mounting surface, the end edges $21b_e$ and $21c_e$ tend not to become a starting point of cracks.

Figure 27:
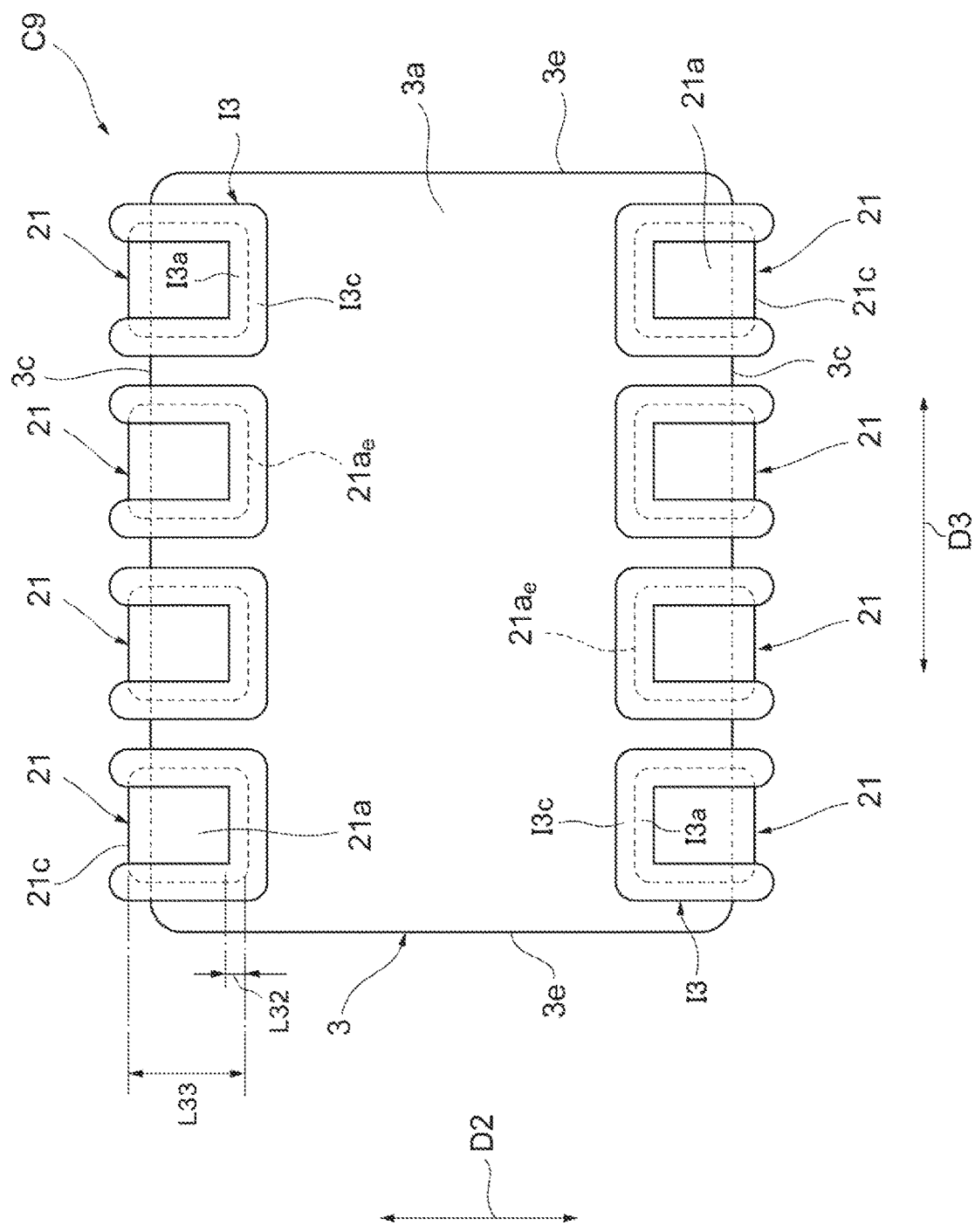
FIG. 27 is a plan view of a multilayer capacitor according to a modification of the third embodiment.
Figure 28:
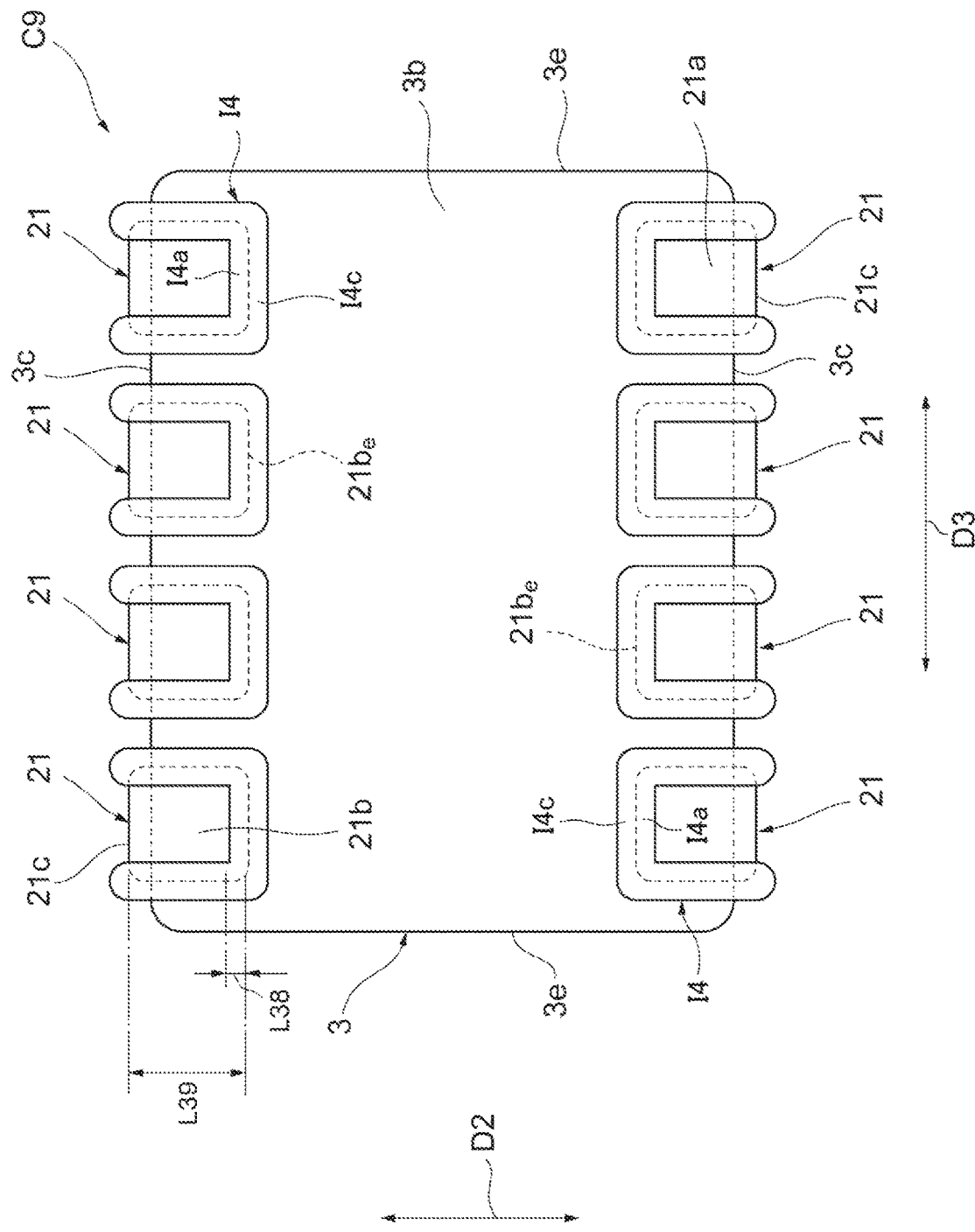
FIG. 28 is a plan view of the multilayer capacitor according to the modification.
Figure 29:
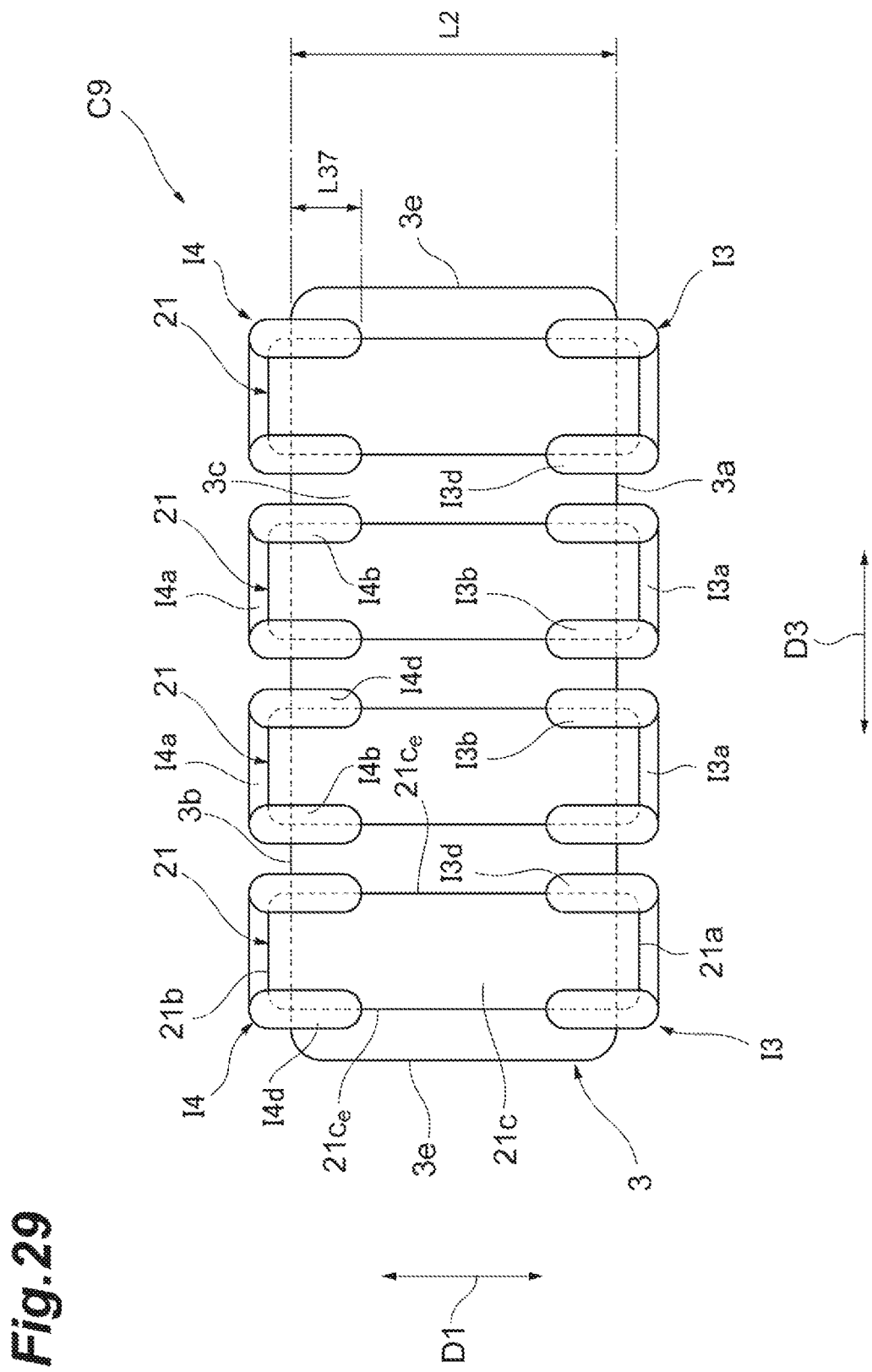
FIG. 29 is a side view of the multilayer capacitor according to the modification.

Next, with reference to FIGS. 27 to 29, a configuration of a multilayer capacitor C9 according to a modification of the third embodiment will be described. FIGS. 27 and 28 are plan views of the multilayer capacitor according to the modification. FIG. 29 is a side view of the multilayer capacitor according to the modification.

As with the multilayer capacitors C7 and C8, the multilayer capacitor C9 includes an element body 3, a plurality of external electrodes 21, and a plurality of internal electrodes (not illustrated). The multilayer capacitor C9 differs from the multilayer capacitor C7 in that an insulating film I4 is further provided.

As illustrated in FIGS. 28 and 29, the multilayer capacitor C9 includes a plurality of insulating films I4. As with the insulating films I, I1, I2, and I3, the insulating film I4 is made of a material having electrical insulation properties (e.g., an insulating resin or glass). In this modification, as with the insulating films I, I1, I2, and I3, the insulating film I4 is made of an insulating resin (e.g., an epoxy resin).

The insulating film I4 covers a part of the external electrode 21 and a part of the element body 3, along an end edge $21b_e$ of an electrode part 21b and an end edge $21c_e$ of an electrode part 21c. An electrode part 21a, a principal surface 3a, and a pair of end surfaces 3e are not covered with the insulating film I4.

Along the end edge 21be and only a part of the end edge $21c_e$ (a portion close to a principal surface 3b in a first direction D1), the insulating film I4 continuously covers the end edge $21b_e$ and only the part of the end edge $21c_e$, and continuously covers the principal surface 3b and a side surface 3c. The insulating film I4 includes a film portion I4a located on the electrode part 21b, a film portion I4b located on the electrode part 21c, a film portion I4c located on the principal surface 3b, and a film portion I4d located on the side surface 3c. The film portions I4a, I4b, I4c and I4d each are integrally formed.

A surface of the electrode part 21b includes a region covered with the insulating film I4 (film portion I4a) along the end edge $21b_e$, and a region exposed from the insulating film I4. The surface of the electrode part 21c includes a region covered with the insulating film I4 (film portion I4b) along the end edge $21c_e$, and a region exposed from the insulating film I4.

The principal surface 3b includes a region covered with the insulating film I4 (film portion I4c) along the end edge $21b_e$, and a region exposed from the insulating film I4. The side surface 3c includes a region covered with the insulating film I4 (film portion I4d) along the end edge $21c_e$, and a region exposed from the insulating film I4.

In this modification, a ratio (L37/L2) of each length L37 of the film portion I4b in the first direction D1, to length L2 of the element body 3 is 0.1 or more to 0.4 or less. A ratio (L38/L39) of length L38 of the film portion I4a in a second direction D2 to length L39 of the electrode part 21b in the second direction D2 is 0.3 or more.

The multilayer capacitor C9 can also be mounted with the principal surface 3a as a mounting surface, or mounted with the principal surface 3b as a mounting surface. Therefore, in the multilayer capacitor C9, there is no directionality in mounting the multilayer capacitor C9, improving workability.

Even when the principal surface 3b is the mounting surface, since the insulating film I4 continuously covers the end edge $21b_e$ and only the part of the end edge $21c_e$, a solder fillet does not reach the end edge $21b_e$ and the part of the end edge $21c_e$ (an end edge of a portion located near the principal surface $3b_e$ in the electrode part 21c). Therefore, even when an external force acts on the multilayer capacitor C9 through the solder fillet, a stress tends not to concentrate on the end edges $21b_e$ and $21c_e$, and the end edges $21b_e$ and $21c_e$ tend not to become a starting point of cracks. This suppresses occurrence of cracks in the element body 3 in the multilayer capacitor C9.

In this modification, since the insulating film I4 continuously covers the principal surface 3b and the side surface 3c along the end edge $21b_e$ and only the part of the end edge $21c_e$, the end edge $21b_e$ and the part of the end edge $21c_e$ are surely covered with the insulating film I4. Therefore, in the multilayer capacitor C9, the end edges $21b_e$ and $21c_e$ further tend not to become the starting point of cracks.

In this modification, since the surface of the electrode part 21c includes the region exposed from the insulating film I4, a solder fillet is formed on the region exposed from the insulating film I4. Therefore, a mounting strength of the multilayer capacitor C9 is secured.

In this modification, the ratio (L37/L2) of length L37 of the film portion I4b to length L2 of the element body 3 is 0.1 or more to 0.4 or less. In which case, the effect of suppressing occurrence of cracks is secured, and a size of the insulating film I4 is reduced. Therefore, a cost of the multilayer capacitor C9 is reduced.

In this modification, the ratio (L38/L39) of length L38 of the film portion I4a to length L39 of the electrode part 21b is 0.3 or more. In this case, the stress further tends not to concentrate on the end edge $21b_e$, further suppressing occurrence of cracks in the element body 3.

Next, with reference to FIG. 30 to 38, a configuration of a modification of multilayer capacitors C7, C8, and C9 will be described. FIGS. 30, 31, 33, 34, 36, and 37 are plan views of the multilayer capacitor according to the modification. FIGS. 32, 35, and 38 are side views of the multilayer capacitor according to the modification.

Figure 30:
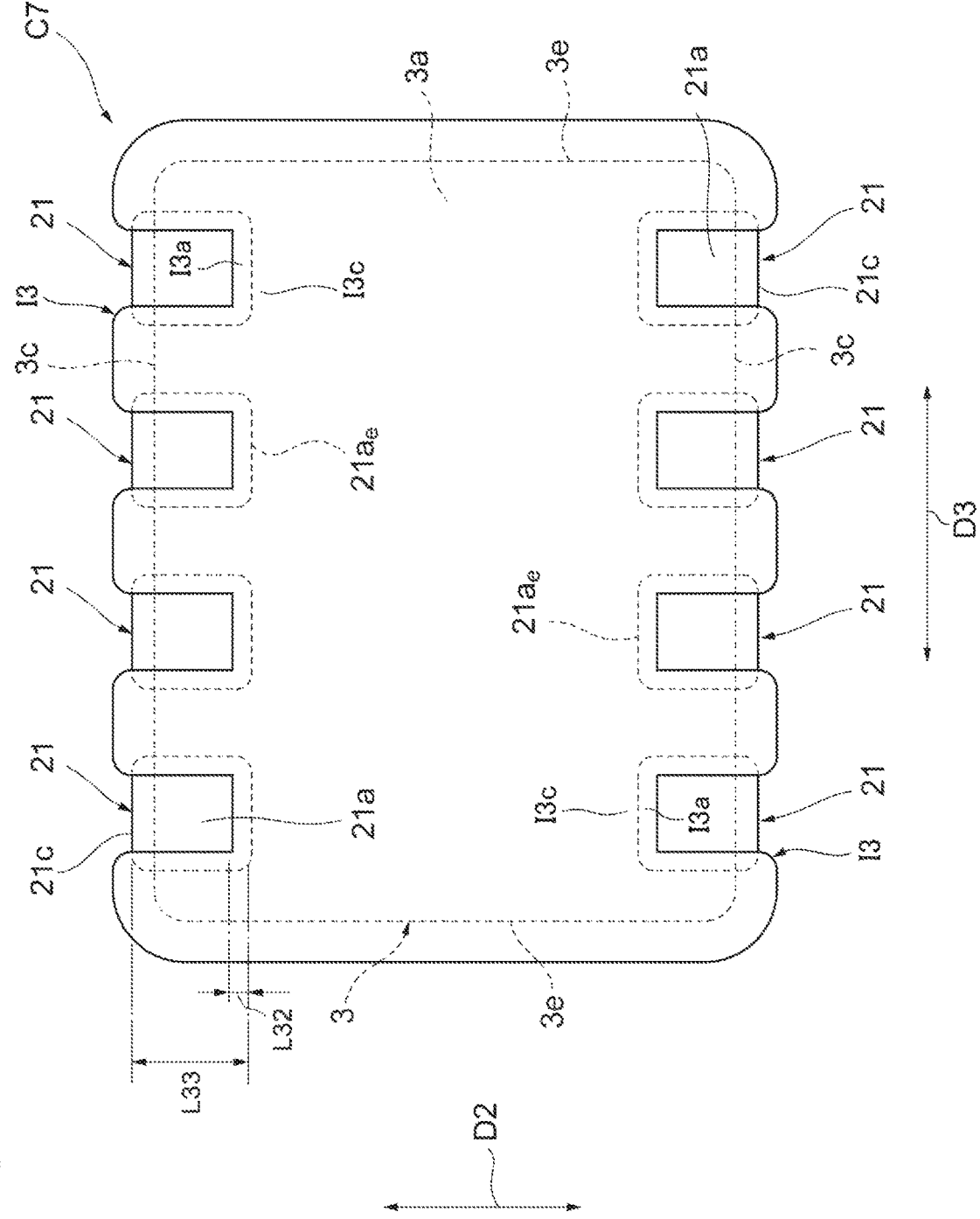
FIG. 30 is a plan view of a multilayer capacitor according to a modification of the third embodiment.
Figure 31:
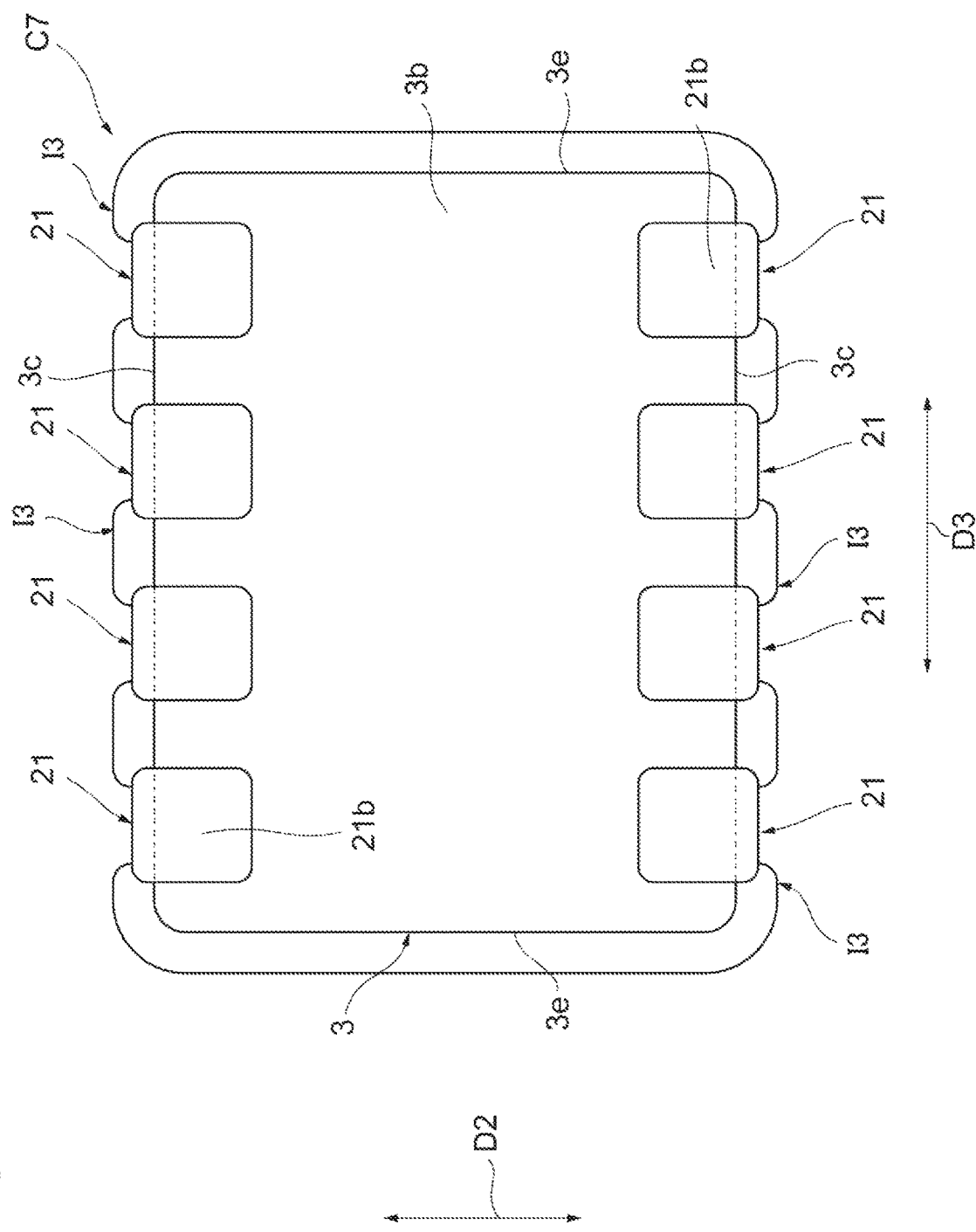
FIG. 31 is a plan view of the multilayer capacitor according to the modification.
Figure 32:
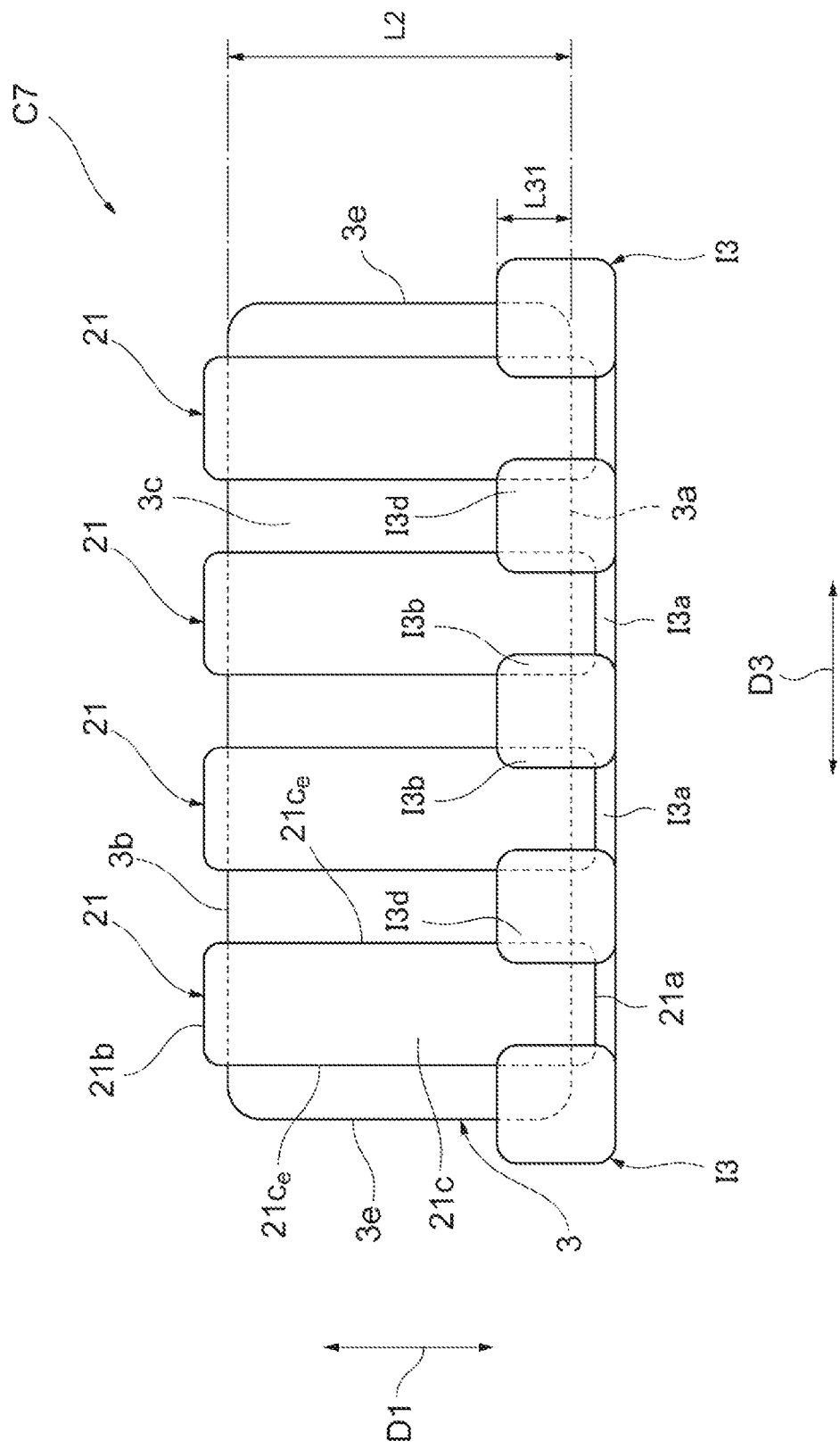
FIG. 32 is a side view of the multilayer capacitor according to the modification.
Figure 33:
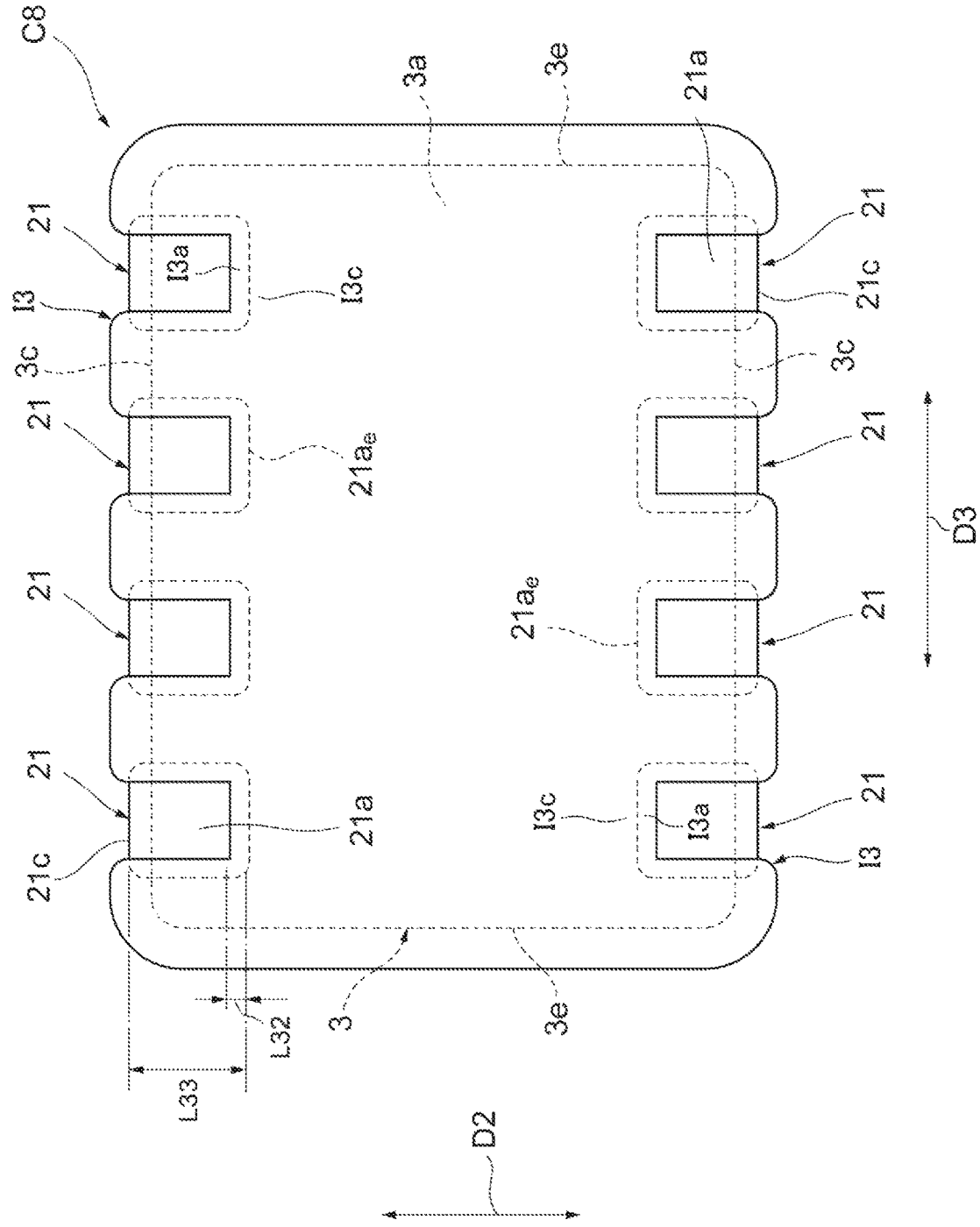
FIG. 33 is a plan view of a multilayer capacitor according to a modification of the third embodiment.
Figure 34:
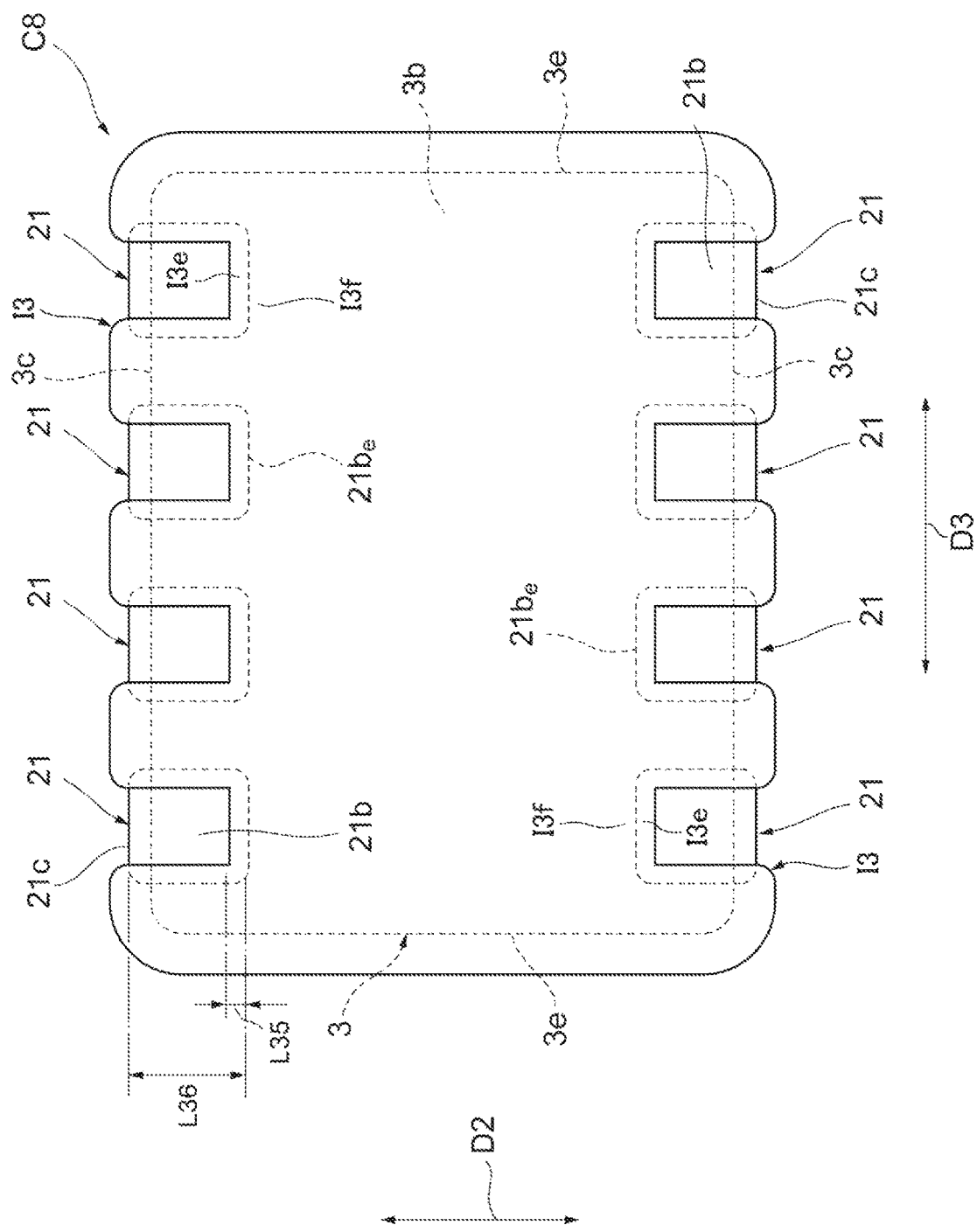
FIG. 34 is a plan view of the multilayer capacitor according to the modification.
Figure 35:
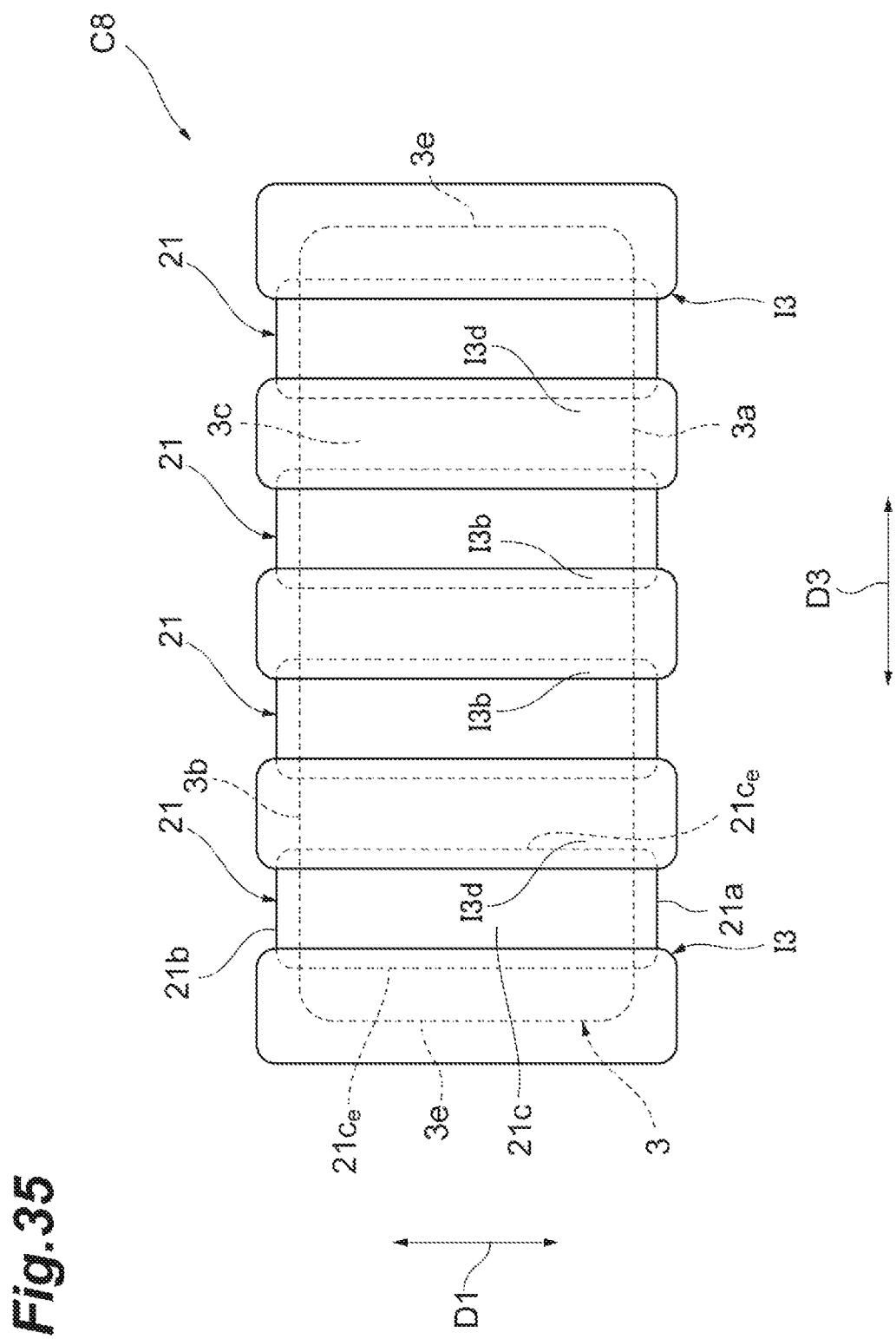
FIG. 35 is a side view of the multilayer capacitor according to the modification.
Figure 36:
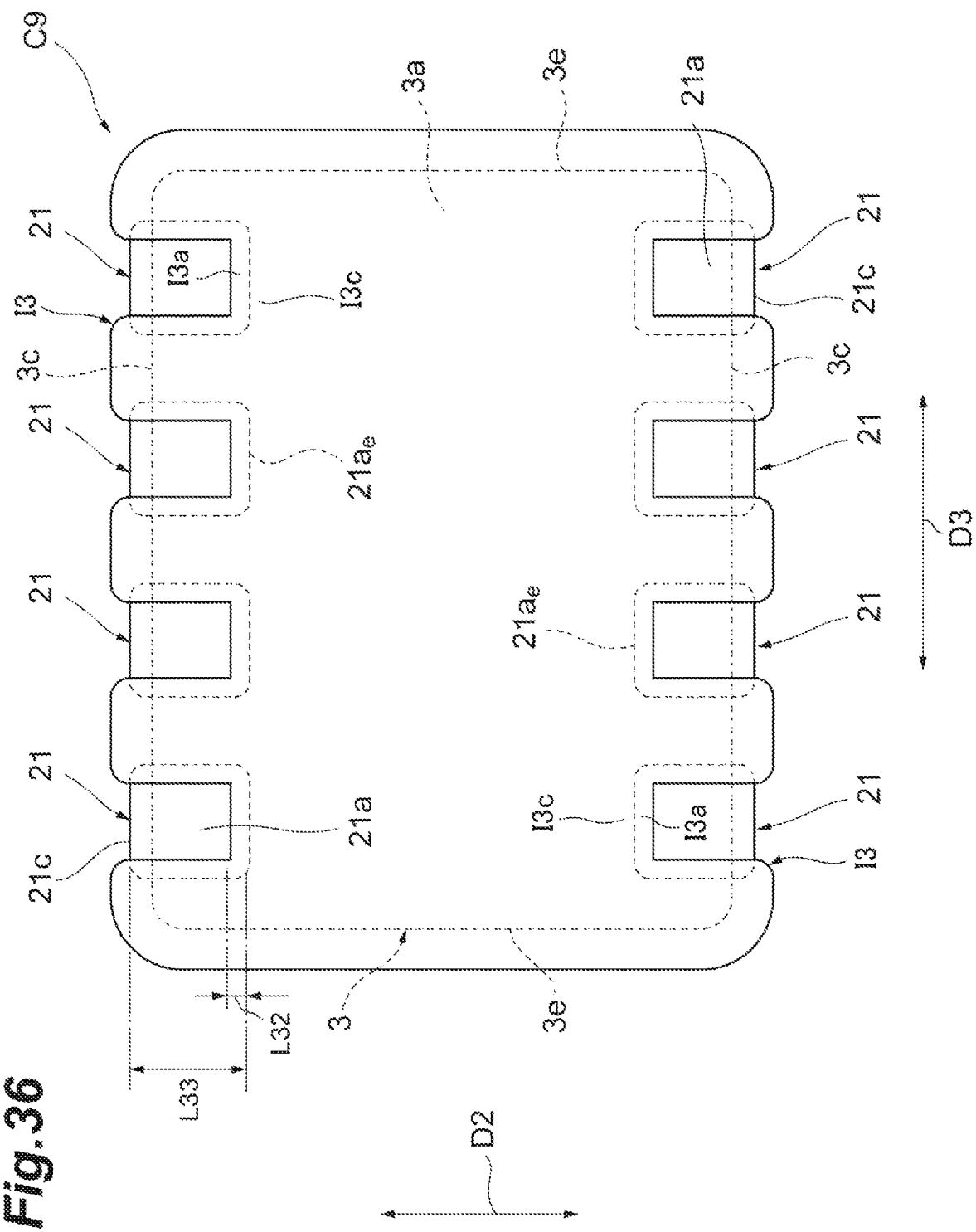
FIG. 36 is a plan view of a multilayer capacitor according to a modification of the third embodiment.
Figure 37:
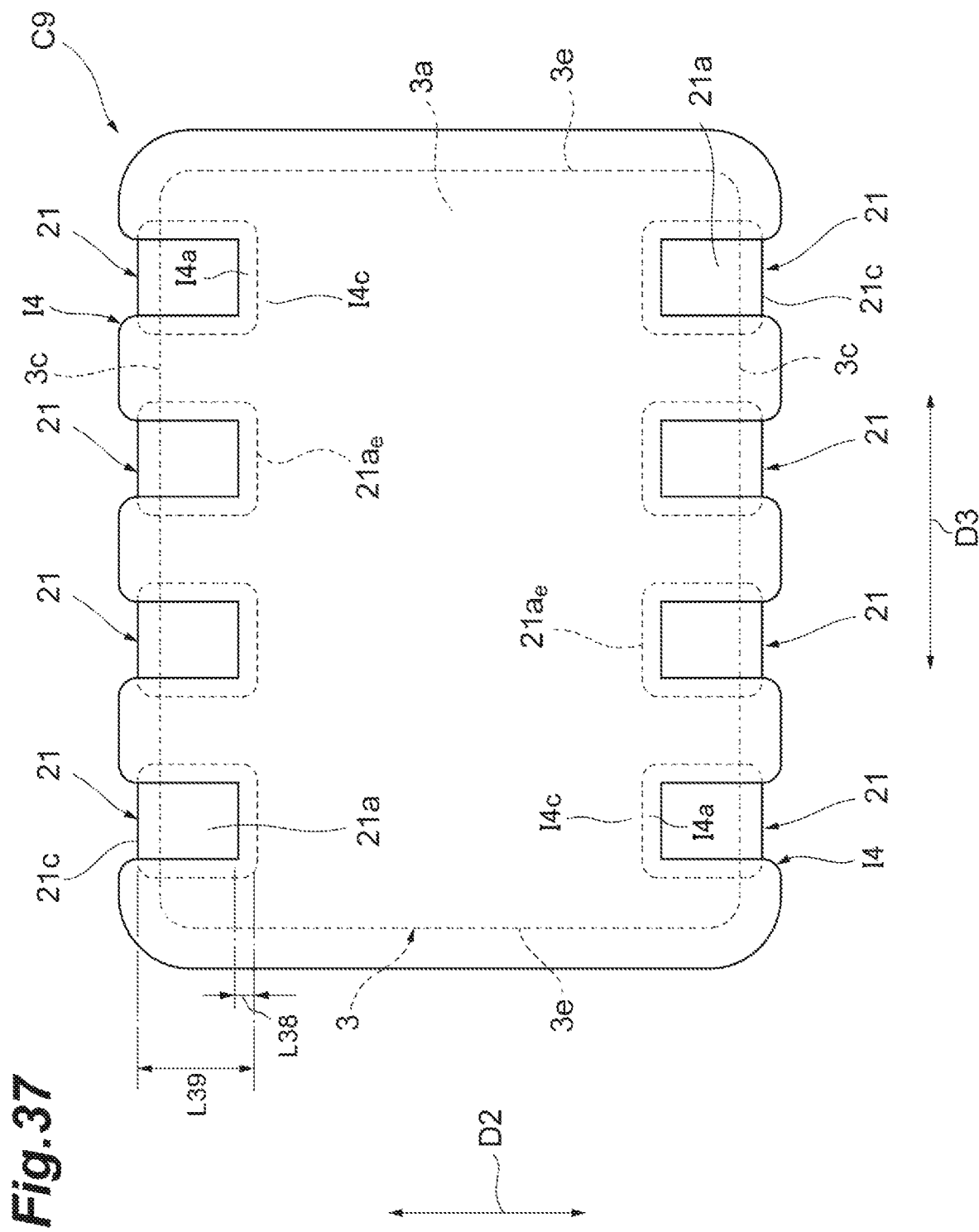
FIG. 37 is a plan view of the multilayer capacitor according to the modification.
Figure 38:
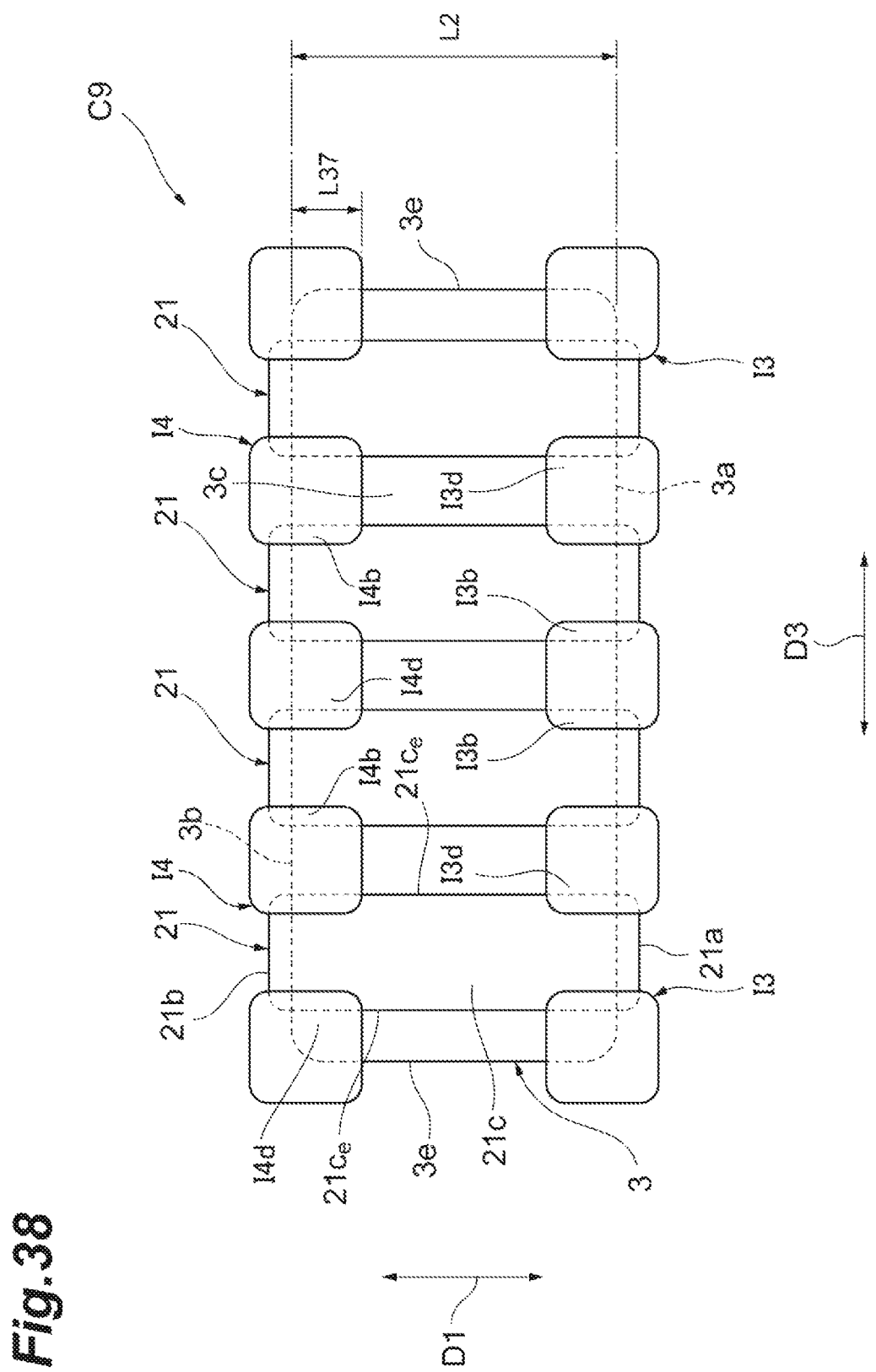
FIG. 38 is a side view of the multilayer capacitor according to the modification.

As illustrated in FIGS. 30 to 38, in the multilayer capacitors C7, C8 and C9, a region between insulating films I3 and I4 may be covered with the same material having electrical insulating properties as the insulating films I3 and I4 (an insulating resin, in this modification). As illustrated in FIGS. 30 to 32, in the modification of the multilayer capacitor C7, an entire principal surface 3a is covered with a material having electrical insulating properties. As illustrated in FIGS. 33 to 35, in the modification of the multilayer capacitor C8, an entire region exposed from an external electrode 21, of an outer surface of an element body 3, is covered with a material having electrical insulating properties. As illustrated in FIGS. 36 to 38, in the modification of the multilayer capacitor C9, an entire principal surface 3a and an entire principal surface 3b are covered with a material having electrical insulation properties.

Fourth Embodiment

Figure 39:
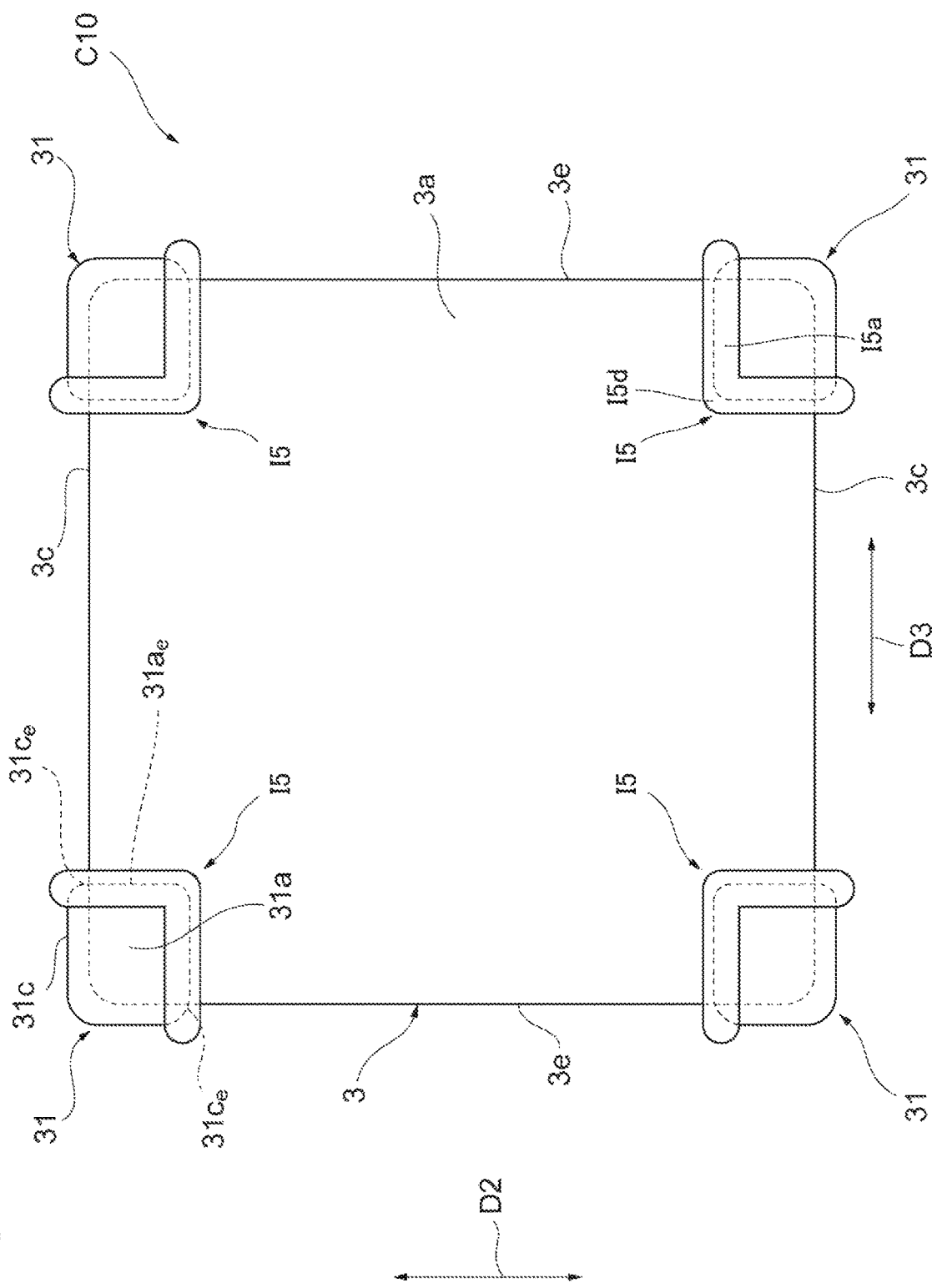
FIG. 39 is a plan view of a multilayer capacitor according to a fourth embodiment.
Figure 40:
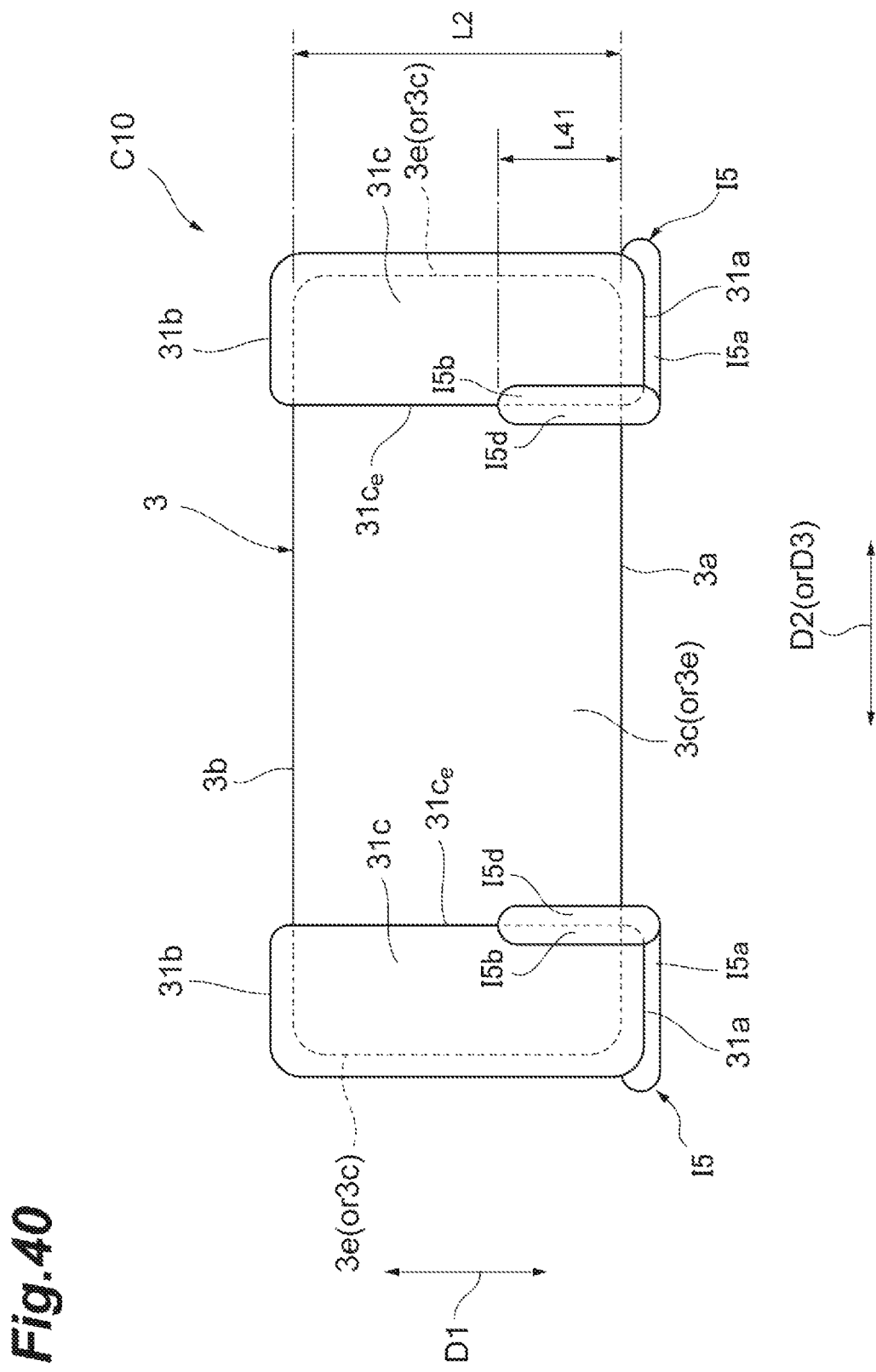
FIG. 40 is a side view of the multilayer capacitor according to the fourth embodiment.

With reference to FIGS. 39 and 40, a configuration of a multilayer capacitor C10 according to a fourth embodiment will be described. FIG. 39 is a plan view of the multilayer capacitor according to the fourth embodiment. FIG. 40 is a side view of the multilayer capacitor according to the fourth embodiment. Also in the fourth embodiment, the multilayer capacitor C10 is exemplified as an electronic component.

The multilayer capacitor C10 includes an element body 3, a plurality of external electrodes 31, and a plurality of internal electrodes (not illustrated). The plurality of external electrodes 31 are disposed on an outer surface of the element body 3, and are separated from each other. In this embodiment, the multilayer capacitor C10 includes four external electrodes 31.

A length of the element body 3 in a first direction D1 is shorter than a length of the element body 3 in a second direction D2, and shorter than a length of the element body 3 in a third direction D3. The length of the element body 3 in the second direction D2 is equal to the length of the element body 3 in the third direction D3.

Each of the external electrodes 31 is disposed at each corner part of the element body 3. Each of the external electrodes 31 includes an electrode part 31a disposed on a principal surface 3a, an electrode part 31b disposed on a principal surface 3b, and an electrode part 31c disposed on a side surfaces 3c and on an end surface 3e. The external electrode 31 is formed on four surfaces of the pair of principal surfaces 3a and 3b, one side surface 3c, and one end surface 3e. The electrode parts 31a, 31b, and 31c adjacent to each other are connected to each other at a ridge of the element body 3, and are electrically connected to each other.

The electrode part 31c covers all the ends exposed on the side surface 3c and on the end surface 3e, of the respective internal electrodes. The electrode part 31c is directly connected to the respective internal electrodes. The external electrode 31 is electrically connected to the respective internal electrodes.

As with the external electrodes 5, 13, 15, and 21, the external electrodes 31 include a sintered metal layer. The external electrodes 31 may also include a plating layer formed on the sintered metal layer.

The multilayer capacitor C10 is also soldered to an electronic device. In the multilayer capacitor C10, the principal surface 3a is a mounting surface opposing the electronic device.

As illustrated in FIGS. 39 and 40, the multilayer capacitor C10 includes a plurality of insulating films I5. As with the insulating films I, I1, I2, I3, and I4, the insulating film I5 is made of a material having electrical insulation properties (e.g., an insulating resin or glass). In this embodiment, as with the insulating films I, I1, I2, I3, and I4, the insulating film I5 is made of an insulating resin (e.g., an epoxy resin).

The insulating film I5 covers a part of the external electrode 31 and a part of the element body 3, along an end edge $31a_e$ of the electrode part 31a and an end edge $31c_e$ of the electrode part 31c. The electrode part 31b and the principal surface 3b are not covered with the insulating film I5.

Along the end edge $31a_e$ and only a part of the end edge $31c_e$ (a portion close to the principal surface 3a in the first direction D1), the insulating film I5 continuously covers the end edge $31a_e$ and only the part of the end edge $31c_e$, and continuously covers the principal surface 3a, the side surface 3c, and the end surface 3e. The insulating film I5 includes a film portion I5a located on the electrode part 31a, a film portion I5b located on the electrode part 31c, a film portion I5c located on the principal surface 3a, and a film portion I5d located on the side surface 3c and on the end surface 3e. The film portions I5a, I5b, I5c, and I5d each are integrally formed.

A surface of the electrode part 31a includes a region covered with the insulating film I5 (film portion I5a) along the end edge $31a_e$, and a region exposed from the insulating film I5. A surface of the electrode part 31c includes a region covered with the insulating film I5 (film portion I5b) along the end edge $31c_e$, and a region exposed from the insulating film I5.

The principal surface 3a includes a region covered with the insulating film I5 (film portion I5d) along the end edge $31a_e$, and a region exposed from the insulating film I5. The side surface 3c and the end surface 3e include a region covered with the insulating film I5 (film portion I5e) along the end edge $31c_e$, and a region exposed from the insulating film I5.

Since the insulating film I5 continuously covers the end edge $31a_e$ and only the part of the end edge $31c_e$, a solder fillet does not reach the end edge $31a_e$ and the part of the end edge $31c_e$ (an end edge of a portion located near the principal surface 3a, in the electrode part 31c). Therefore, even when an external force acts on the multilayer capacitor C10 through the solder fillet, a stress tends not to concentrate on the end edges $31a_e$ and $31c_e$, and the end edges $31a_e$ and $31c_e$ tend not to become a starting point of cracks. This suppresses occurrence of cracks in the element body 3 in the multilayer capacitor C10.

In the fourth embodiment, since the insulating film I5 continuously covers the principal surface 3a, the side surface 3c, and the end surface 3e along the end edge $31a_e$ and only the part of the end edge $31c_e$, the end edge $31a_e$ and the part of the end edge $31c_e$ are surely covered with the insulating film I5. Therefore, in the multilayer capacitor C10, the end edges $31a_e$ and $31c_e$ further tend not to become the starting point of cracks.

In the fourth embodiment, since the surface of the electrode part 31c includes the region exposed from the insulating film I5, a solder fillet is formed on the region exposed from the insulating film I5. Therefore, a mounting strength of the multilayer capacitor C10 is secured.

In the fourth embodiment, a ratio (L41/L2) of each length L41 of the film portion I5b and I5d in the first direction D1, to length L2 of the element body 3 is 0.1 or more to 0.4 or less. In which case, the effect of suppressing occurrence of cracks is secured, and a size of the insulating film I5 is reduced. Therefore, a cost of the multilayer capacitor C10 is reduced.

Next, with reference to FIGS. 41 to 43, a configuration of a multilayer capacitor C11 according to a modification of the fourth embodiment will be described. FIGS. 41 and 42 are plan views of the multilayer capacitor according to the modification. FIG. 43 is a side view of the multilayer capacitor according to the modification.

As with the multilayer capacitor C10, the multilayer capacitor C11 includes an element body 3, a plurality of external electrodes 31, and a plurality of internal electrodes (not illustrated). In the multilayer capacitor C11, a shape of an insulating film I5 is different from that of the multilayer capacitor C10.

As illustrated in FIGS. 41 to 43, the multilayer capacitor C11 includes a plurality of insulating films I5. The insulating film I5 covers a part of the external electrode 31 and a part of the element body 3, along an end edge $31a_e$ of the electrode part 31a, an end edge $31c_e$ of the electrode part 31c, and an end edge $31b_e$ of the electrode part 31b.

Along all of the end edge $31a_e$, the end edge $31b_e$, and the end edge $31c_e$, the insulating film I5 continuously covers the end edge $31a_e$, the end edge $31b_e$, and the end edge $31c_e$, and continuously covers a principal surface 3a, a principal surface 3b, a side surface 3c, and an end surface 3e. The insulating film I5 includes a film portion I5a located on the electrode part 31a, a film portion I5b located on the electrode part 31c, a film portion I5c located on the principal surface 3a, a film portion I5d located on the side surface 3c and the end surface 3e, a film portion I5e located on the electrode part 31b, and a film portion I5f located on the principal surface 3b. The film portions I5a, I5b, I5c, I5d, I5e, and I5f each are integrally formed.

A surface of the electrode part 31a includes a region covered with the insulating film I5 (film portion I5a) along the end edge 31$a_e$, and a region exposed from the insulating film I5. A surface of the electrode part 31c includes a region covered with the insulating film I5 (film portion I5b) along the end edge 31$c_e$, and a region exposed from the insulating film I5. A surface of the electrode part 31b includes a region covered with the insulating film I5 (film portion I5e) along the end edge 31$b_e$, and a region exposed from the insulating film I5.

The principal surface 3a includes a region covered with the insulating film I5 (film portion I5c) along the end edge 31$a_e$, and a region exposed from the insulating film I5. The side surface 3c and the end surface 3e include a region covered with the insulating film I5 (film portion I5d) along the end edge 31$c_e$, and a region exposed from the insulating film I5. The principal surface 3b includes a region covered with the insulating film I5 (film portion I5f) along the end edge 31$b_e$, and a region exposed from the insulating film I5.

In this modification, since the insulating film I5 continuously covers all of the end edge 31$a_e$, the end edge 31$b_e$, and the end edge 31$c_e$, occurrence of cracks in the element body 3 is surely suppressed. Since the insulating film I5 continuously covers the principal surface 3a, the principal surface 3b, the side surface 3c, and the end surface 3e along all of the end edge 31$a_e$, the end edge 31$b_e$, and the end edge 31$c_e$, all of the end edge 31$a_e$, the end edge 31$b_e$, and the end edge 31$c_e$, are surely covered with the insulating film I5. Therefore, the end edges 31$a_e$ and 31$c_e$ further tend not to become a starting point of cracks.

The multilayer capacitor C11 can be mounted with the principal surface 3a as a mounting surface, or mounted with the principal surface 3b as a mounting surface. Therefore, there is no directionality in mounting the multilayer capacitor C11, improving workability. When the principal surface 3b is the mounting surface, the end edges 31$b_e$ and 31$c_e$ tend not to become a starting point of cracks.

The various embodiments and modifications of the present invention have been described. However, the present invention is not limited to the above-described embodiments and modifications, and various changes, modifications, and applications can be made without departing from the gist of the present invention.

In the multilayer capacitors C2, C4, and C11, and the multilayer feedthrough capacitor C6, the insulating films I, I1, I2 and I5 may be divided into two parts in the first direction D1, as in the multilayer capacitor C9 illustrated in FIGS. 27 to 29. In other words, the insulating films I, I1, I2, and I5 may be divided into a portion located closer to the principal surface 3a and a portion located closer to the principal surface 3b.

In the multilayer capacitors C1 to C4, C10, and C11, and the multilayer feedthrough capacitors C5 and C6, as in multilayer capacitors C7 to C9 illustrated in FIGS. 30 to 38, a region between the insulating films I, I1, I2, and I5 may be covered with the same material (e.g., an insulating resin) having electrical insulating properties as the insulating films I, I1, I2, and I5.

In the multilayer capacitors C7, C8 and C9 illustrated in FIGS. 30 to 38, the end surface 3e may not be covered with the insulating films I3 and I4. That is, the entire end surface 3e may be exposed from the insulating films I3 and I4.

In the embodiments and the modifications described above, the multilayer capacitors C1 to C4, and C7 to C11, and the multilayer feedthrough capacitors C5 and C6 are exemplified as electronic components, but applicable electronic components are not limited to multilayer capacitors and multilayer feedthrough capacitors.

Applicable electronic components are, for example, multilayer electronic components such as multilayer inductors, multilayer varistors, multilayer piezoelectric actuators, multilayer thermistors, multilayer composite components, or the like, or electronic components other than multilayer electronic components.

What is claimed is:

1. An electronic component comprising:
   an element body of a rectangular parallelepiped shape including a first principal surface as a mounting surface and a first side surface adjacent to the first principal surface;
   an external electrode including a first electrode part disposed on the first principal surface and a second electrode part disposed on the first side surface and connected to the first electrode part; and
   an insulating film continuously covering: an end edge of the first electrode part where a portion of the first principal surface covered by the first electrode part borders a portion of the first principal surface not covered by the first electrode part, and only a part of an end edge of the second electrode part where a portion of the first side surface covered by the second electrode part borders a portion of the first side surface not covered by the second electrode part and not the entire end edge of the second electrode part.

2. The electronic component according to claim 1, wherein
   the insulating film further continuously covers the first principal surface and the first side surface, along the end edge of the first electrode part and only the part of the end edge of the second electrode part.

3. The electronic component according to claim 1, wherein the part of the end edge of the second electrode part is located closer to the first principal surface than another part of the end edge of the second electrode part that is not covered by the insulating film.

4. The electronic component according to claim 1, wherein
   the element body further includes a second side surface opposing the first side surface;
   the external electrode further includes a third electrode part disposed on the second side surface and connected to the first electrode part; and
   the insulating film continuously covers the end edge of the first electrode part, and only a part of each of the end edges of the second electrode part and the third electrode part.

5. The electronic component according to claim 4, wherein
   the insulating film further continuously covers the first principal surface, the first side surface, and the second side surface, along the end edge of the first electrode part, and only the part of each of the end edges of the second electrode part and the third electrode part.

6. The electronic component according to claim 4, wherein
   a ratio of a length, in a direction orthogonal to the first principal surface, of the insulating film that covers each of the end edges of the second electrode part and the third electrode part, to a length of the element body in the direction orthogonal to the first principal surface is 0.1 or more to 0.4 or less.

7. The electronic component according to claim 1, wherein
the element body further includes a first end surface adjacent to the first principal surface and the first side surface; and
the external electrode further includes an electrode part disposed on the first end surface and exposed from the insulating film.

8. The electronic component according to claim 1, wherein
a ratio of a length of a portion located on the first electrode part, in the insulating film, in a direction parallel to the first principal surface and the first side surface, to a length of the first electrode part in the direction parallel to the first principal surface and the first side surface is 0.3 or more.

9. An electronic component comprising:
an element body of a rectangular parallelepiped shape including a first principal surface arranged to constitute a mounting surface and a first side surface adjacent to the first principal surface;
an external electrode disposed on the first principal surface and the first side surface; and
an insulating film continuously covering an end edge on the first principal surface of the external electrode and only a part of an end edge on the first side surface of the external electrode that is less than the entire end edge on the first side surface, wherein
the insulating film further continuously covers the first principal surface and the first side surface, along the end edge on the first principal surface and only the part of the end edge on the first side surface.

10. The electronic component according to claim 9, wherein
the element body further includes an end surface adjacent to the first principal surface and the first side surface, and
the external electrode is further disposed on the end surface, and on the end surface, the external electrode is exposed from the insulating film.

11. An electronic component comprising:
an element body of a rectangular parallelepiped shape including a first principal surface arranged to constitute a mounting surface and a first side surface adjacent to the first principal surface;
an external electrode disposed on the first principal surface and the first side surface; and
an insulating film continuously covering an end edge on the first principal surface of the external electrode and only a part of an end edge on the first side surface of the external electrode that is less than the entire end edge on the first side surface,
wherein the part of the end edge on the first side surface is located closer to the first principal surface than another part of the end edge of the first side surface that is not covered by the insulating film.

12. The electronic component according to claim 11, wherein
the element body further includes an end surface adjacent to the first principal surface and the first side surface, and
the external electrode is further disposed on the end surface, and on the end surface, the external electrode is exposed from the insulating film.

13. An electronic component comprising:
an element body of a rectangular parallelepiped shape including a first principal surface arranged to constitute a mounting surface and a first side surface adjacent to the first principal surface;
an external electrode disposed on the first principal surface and the first side surface; and
an insulating film continuously covering an end edge on the first principal surface of the external electrode and only a part of an end edge on the first side surface of the external electrode that is less than the entire end edge on the first side surface, wherein
the element body further includes a second side surface opposing the first side surface,
the external electrode is further disposed on the second side surface, and
the insulating film continuously covers the end edge on the first principal surface, only the part of the end edge on the first side surface, and only a part of an end edge on the second side surface of the external electrode.

14. The electronic component according to claim 13, wherein
the insulating film further continuously covers the first principal surface, the first side surface, and the second side surface, along the end edge on the first principal surface and only the part of each of the end edges on the first and second side surface.

15. The electronic component according to claim 13, wherein
the element body further includes an end surface adjacent to the first principal surface and the first side surface, and
the external electrode is further disposed on the end surface, and on the end surface, the external electrode is exposed from the insulating film.

16. An electronic component comprising:
an element body of a rectangular parallelepiped shape including a principal surface arranged to constitute a mounting surface;
a plurality of external electrodes disposed on the principal surface; and
a plurality of insulating films covering (1) end edges of the plurality of external electrodes on the principal surface and (2) outermost surfaces of the plurality of external electrodes,
wherein the plurality of insulating films is separated from each other,
the principal surface is exposed from the plurality of insulating films between the plurality of insulating films, and
each of the outermost surfaces of the plurality of external electrodes includes a region exposed from the insulating film on the principal surface, wherein
the element body includes a side surface adjacent to the principal surface,
each of the plurality of external electrodes is further disposed on the side surface,
each of the plurality of insulating films further covers an end edge on the side surface of the each of the plurality of external electrodes,
the side surface is exposed from the plurality of insulating films between the plurality of insulating films, and
the each of the plurality of external electrodes includes a region exposed from the plurality of insulating films on the side surface.

17. The electronic component according to claim 16, wherein
- the each of the plurality of insulating films covers the end edge on the principal surface of the each of the plurality of external electrodes and only a part of the end edge on the side surface of the each of the plurality of external electrodes, and
- the part of the end edge on the side surface is located closer to the principal surface than another part of the end edge of the side surface that is not covered by the insulating film.

18. An electronic component comprising:
- an element body of a rectangular parallelepiped shape including a principal surface arranged to constitute a mounting surface;
- a plurality of external electrodes disposed on the principal surface; and
- a plurality of insulating films covering (1) end edges of the plurality of external electrodes on the principal surface and (2) outermost surfaces of the plurality of external electrodes,
- wherein the plurality of insulating films is separated from each other,
- the principal surface is exposed from the plurality of insulating films between the plurality of insulating films, and
- each of the outermost surfaces of the plurality of external electrodes includes a region exposed from the insulating film on the principal surface, wherein
- the element body includes first and second side surfaces adjacent to the principal surface, the first and second side surfaces opposing each other,
- each of the plurality of external electrodes is further disposed on the first and second side surface;
- each of the plurality of insulating films further covers end edges on the first and second side surfaces of the each of the plurality of external electrodes,
- the first and second side surfaces are exposed from the plurality of insulating films between the plurality of insulating films, and
- the each of the plurality of external electrodes includes regions exposed from the plurality of insulating films on the first and second side surfaces.

19. An electronic component comprising:
- an element body of a rectangular parallelepiped shape including a principal surface arranged to constitute a mounting surface;
- a plurality of external electrodes disposed on the principal surface; and
- a plurality of insulating films covering (1) end edges of the plurality of external electrodes on the principal surface and (2) outermost surfaces of the plurality of external electrodes,
- wherein the plurality of insulating films is separated from each other,
- the principal surface is exposed from the plurality of insulating films between the plurality of insulating films, and
- each of the outermost surfaces of the plurality of external electrodes includes a region exposed from the insulating film on the principal surface, wherein
- each of the plurality of insulating films covers the entire end edge where a portion of the principal surface of the plurality of external electrodes borders a portion of the principal surface not covered by the plurality of external electrodes.

\* \* \* \* \*